United States Patent
Okinaka et al.

[11] Patent Number: 5,968,226
[45] Date of Patent: *Oct. 19, 1999

[54] PROCESS OF MAKING GOETHITE OR IRON-BASED ALLOY PARTICLES

[75] Inventors: Kenji Okinaka; Yasutaka Ota, both of Hiroshima, Japan

[73] Assignee: Toda Kogyo Corporation, Japan

[*] Notice: This patent is subject to a terminal disclaimer.

[21] Appl. No.: 08/777,905

[22] Filed: Dec. 31, 1996

Related U.S. Application Data

[62] Division of application No. 08/433,871, May 1, 1995, Pat. No. 5,645,652.

[30] Foreign Application Priority Data

Dec. 13, 1994 [JP] Japan ................................. 6-332611
Dec. 13, 1994 [JP] Japan ................................. 6-332612

[51] Int. Cl.⁶ ............................. H01F 1/11; H01F 1/36
[52] U.S. Cl. ............................. 75/348; 75/349; 75/350; 423/594; 423/632
[58] Field of Search ..................... 75/348, 349, 350; 423/151, 594, 632

[56] References Cited

U.S. PATENT DOCUMENTS

| | | | |
|---|---|---|---|
| 4,970,124 | 11/1990 | Oltean et al. | 428/570 |
| 5,076,836 | 12/1991 | Hisaoko et al. | 75/349 |
| 5,260,132 | 11/1993 | Nakazuni et al. | 148/311 |
| 5,378,380 | 1/1995 | Isoai et al. | 252/62.56 |
| 5,466,306 | 11/1995 | Mishima et al. | 148/306 |
| 5,480,571 | 1/1996 | Isoai et al. | 252/62.56 |
| 5,599,378 | 2/1997 | Mishima et al. | 423/594 |

FOREIGN PATENT DOCUMENTS

| | | | |
|---|---|---|---|
| 401000 | 12/1990 | European Pat. Off. | 423/151 |
| 0 466 338 A1 | 1/1992 | European Pat. Off. | |
| 0 515 748 A2 | 12/1992 | European Pat. Off. | |
| 55-29577 | 8/1980 | Japan. | |
| 63-222404 | 9/1988 | Japan. | |
| 1-18961 | 4/1989 | Japan. | |
| 2-57122 | 12/1990 | Japan. | |
| 3-43323 | 7/1991 | Japan. | |
| 4-63208 | 2/1992 | Japan | 75/348 |
| 4-63210 | 2/1992 | Japan. | |
| 5-62166 | 3/1993 | Japan. | |
| 5-98321 | 4/1993 | Japan. | |
| 6-25702 | 2/1994 | Japan. | |
| 6-140222 | 5/1994 | Japan. | |

Primary Examiner—George Wyszomierski
Attorney, Agent, or Firm—Nixon & Vanderhye

[57] ABSTRACT

The disclosure describes spindle-shaped magnetic iron-based alloy particles containing cobalt and iron as the main ingredients in which the Co content is 1.0 to 50.0 atm % (calculated as Co) based on the total Fe in the spindle-shaped magnetic iron-based alloy particles, and which the spindle-shaped magnetic iron-based alloy particles have an average major axis diameter of 0.05 to 0.18 μm, a size distribution (standard deviation/major axis diameter) of not more than 0.25, an average minor axis diameter of 0.010 to 0.020 μm, an aspect ratio (major axis diameter/minor axis diameter) of 4 to 15, an X-ray crystallite size $D_{110}$ of 120 to 180 Å, a coercive force of 1720 to 2500 Oe, a saturation magnetization of not less than 110 emu/g, and a saturation magnetization decrement percentage of not more than 17%.

14 Claims, 10 Drawing Sheets

(×30000)

(×30000)

(×30000)

(×30000)

(×30000)

(×30000)

(×30000)

(×30000)

(×30000)

(×30000)

(×30000)

(×30000)

(×30000)

(×30000)

(×30000)

(×30000)

(×30000)

(×30000)

PROCESS OF MAKING GOETHITE OR IRON-BASED ALLOY PARTICLES

This is a division of application Ser. No. 08/433,871, filed May 1, 1995, now U.S. Pat. No. 5,645,652.

BACKGROUND OF THE INVENTION

The present invention relates to spindle-shaped magnetic iron-based alloy particles containing cobalt and iron as the main ingredients, spindle-shaped goethite particles containing cobalt, and a process for producing the same. Particularly, the present invention relates to spindle-shaped fine magnetic iron-based alloy particles containing cobalt and iron as the main ingredient which have a uniform particle size, especially the size distribution (standard deviation/major axis diameter) of not more than 0.25, no inclusion of dendrites, a high coercive force, especially a coercive force (Hc) of 1720 to 2500 Oe and an excellent stability against oxidation, especially a saturation magnetization decrement percentage of not more than 17%, and a process for producing the spindle-shaped fine magnetic iron-based alloy particles containing cobalt and iron as the main ingredient, spindle-shaped goethite fine particles containing cobalt which have an average major axis diameter of 0.05 to 0.20 $\mu$m, an aspect ratio (major axis diameter/minor axis diameter, hereinunder referred to simply as "aspect ratio") of 4 to 15, an X-ray crystallite size ratio ($D_{020}/D_{110}$) of 1.5 to 3.5, a uniform particle size, especially the size distribution (standard deviation/major axis diameter) of not more than 0.30 and no inclusion of dendrites, and a process for producing the spindle-shaped goethite fine particles containing cobalt.

The spindle-shaped magnetic iron-based alloy particles containing cobalt and iron as the main ingredients according to the present invention are fine particles which have a uniform particle size, no inclusion of dendrites, a high coercive force, an excellent coercive force distribution, a large saturation magnetization, and in addition, an excellent stability against oxidation. In addition, the spindle-shaped magnetic iron-based alloy particles containing cobalt and iron as the main ingredients according to the present invention are excellent in dispersibility and packing property as a material for a magnetic recording medium. The spindle-shaped goethite particles containing cobalt according to the present invention are suitable for use as a starting material for magnetic particles, especially as a starting material which produces the spindle-shaped fine magnetic iron-based alloy particles containing cobalt and iron as the main ingredients.

Miniaturized and lightweight video or audio magnetic recording and reproducing apparatuses for long-time recording have recently shown a remarkable progress. Especially, video tape recorders (VTR) have rapidly spread wide and the development of miniaturized and lighter-weight VTR's for longer-time recording have been rapid. With this development, magnetic recording media such as a magnetic tape have been strongly required to have a higher performance and a higher recording density.

In other words, magnetic recording media are required to have a higher picture quality and higher output characteristics, in particular, to improve the frequency characteristics and lower the noise level. For this purpose, it is necessary to improve the residual flux density (Br), the coercive force, the dispersibility, the packing property, the surface smoothness of the magnetic recording media such as a magnetic tape and the S/N ratio.

These properties of magnetic recording media have close relation to the magnetic particles used for the magnetic recording media. In recent years, magnetic iron-based alloy particles have attracted attention due to their coercive force and saturation magnetization which are superior to those of conventional iron oxide magnetic particles, and have been put to practical use as magnetic recording media such as digital audio tapes (DAT), 8-mm video tapes, Hi-8 tapes and video floppies. Such magnetic iron-based alloy particles, however, are also strongly demanded to improve the properties.

The relationship between various properties of magnetic recording media and magnetic particles used therefor is described in the following.

In order to obtain a high picture quality, magnetic recording media for VTR's are required to improve (i) the video S/N ratio, (ii) the chroma S/N ratio and (iii) the video frequency characteristics, as is obvious from the description in *NIKKEI ELECTRONICS*, No. 133, pp. 82 to 105 (1976).

In order to improve the video S/N ratio and the chroma S/N ratio, it is important to improve the dispersibility of the magnetic particles in a vehicle, the orientation property and the packing property of the magnetic particles in a coating film and the surface smoothness of the magnetic recording media. As such magnetic particles, fine particles which have a uniform particle size, no inclusion of dendrites and an appropriate aspect ratio are demanded.

In order to improve the video S/N ratio, it is important to lower the level of the noise caused by a magnetic recording medium. As to the noise of magnetic iron-based alloy particles, it is known that it has a relationship with the X-ray crystallite size of the magnetic iron-based alloy particles.

This phenomenon is shown in, for example, in FIG. 38 on page 123 of the *COLLECTED DATA ON MAGNETIC RECORDING MEDIA*, Aug. 15 (1985), published by Synthetic Electronics Research. FIG. 38 shows the relationship between the X-ray crystallite size ($D_{110}$) of the magnetic iron-based alloy particles and the noise level of the magnetic tape produced therefrom. It is observed from FIG. 38 that the more the X-ray crystallite size lessens, the more the noise level of the magnetic tape lowers.

It is, therefore, effective for lowering the level of the noise caused by a magnetic recording medium to reduce the X-ray crystallite size of the magnetic iron-based alloy particles as much as possible. As described above, in order to improve the video S/N ratio and lower the noise level, magnetic particles are required to have as small an X-ray crystallite size as possible.

In order to improve the video frequency characteristics, it is necessary that the magnetic recording medium has high coercive force (Hc) and residual flux density (Br). In order to enhance the coercive force (Hc) of the magnetic recording medium, magnetic particles having a higher coercive force (Hc) are required.

Since the coercive force of magnetic particles are generally dependent upon the shape anisotropy, a high coercive force is obtained by making the particles as fine as possible or increasing the aspect ratio. This is described in, for example, Japanese Patent Publication (KOKOKU) No. 1-18961 (1989), " . . . The coercive force becomes larger with an increase in the aspect ratio. On the other hand, the coercive force is influenced by the particle size, and in particles having a particle size more than the particle size which produces the superparamagnetism, the coercive force increases in proportion to a reduction in the particle size. It is, therefore, possible to obtain an intended coercive force by appropriately selecting the particle size and the aspect ratio. . . . "

Hi-vision VTRs for home use have recently been developed, and finer particles are demanded as the magnetic iron-based alloy particles which are used for W-VHS tapes of Hi-vision VTRs.

This fact is described in, for example, on pp. 14 to 15 of *NIKKEI MATERIAL & TECHNOLOGY* No. 128 (1993), "A VTR tape up to the W-VHS standard of a home Hi-vision VTR system has been developed. . . . The VTR tape has a two-layer structure comprising an upper layer composed of a metal (iron) magnetic material and having 0.2 to 0.4 $\mu$m in thickness and a lower layer composed of a nonmagnetic material and having 2 to 3 $\mu$m in thickness. . . . In a Hi-vision VTR for recording and reproducing a high-definition picture, it is necessary for the purpose of high-density recording to record and reproduce a recording signal at a low noise level. . . . The magnetic iron-based alloy particles in the magnetic layer have also been improved. The particles have been made finer so as to improve the coercive force and the saturation magnetic flux density. . . . Acicular magnetic particles are used but . . . the major axis diameter thereof is 0.1 $\mu$m, which is about half of the major axis diameter of the magnetic material for S-VHS. . . . "

It is also required to an excellent switching field distribution (S.F.D.).

This fact is described in Japanese Patent Application Laid-Open (KOKAI) No. 63-26821 (1988), "FIG. 1 is a graph showing the relationship between the S.F.D of the above-described magnetic disk and the recording and reproducing output. . . . As is clear from FIG. 1, the relationship between the S.F.D. and the recording and reproducing output is linear. It indicates that the recording and reproducing output is enhanced by using ferromagnetic powder having a small S.F.D. That is, in order to obtain an output larger than the ordinary output, an S.F.D of not more than 0.6 is required."

There is no end to the demand on these magnetic iron-based alloy particles, and they are required to have a large saturation magnetization in addition to a very small particle size and a high coercive force. This fact is described in Japanese Patent Application Laid-Open (KOKAI) No. 5-98321 (1993), " . . . In order to obtain a high-density magnetic recording medium, it is necessary that the magnetic iron-based alloy particles used are fine particles which have a high coercive force, a large saturation magnetic flux density, an excellent dispersibility and an excellent stability against oxidation. . . . The saturation magnetic flux density changes with the composition of the magnetic iron-based alloy particles, the particle size and the thickness of the oxide film. With respect to the composition, when the magnetic particles are an iron-based alloy particles, addition of cobalt is effective. As to the particle size, the larger the particles, . . . the larger the saturation magnetic flux density naturally becomes. . . . However, since the aspect ratio largely influences the coercive force, it is impossible to make it extremely small. . . . "

Accordingly, a magnetic material for a high-density magnetic recording medium is required to be fine particles which have a uniform particle size, no inclusion of dendrites, a high coercive force, an excellent coercive force distribution, a large saturation magnetization and an excellent stability against oxidation.

Generally, magnetic iron-based alloy particles are obtained by heat-treating in a reducing gas, goethite particles as the starting material, hematite particles obtained by heating and dehydrating the goethite particles, or goethite particles or hematite particles containing metals other than iron, after the heat-treatment, if necessary.

As a method of producing goethite particles as the starting material, there are known (i) a method of producing acicular goethite particles by oxidizing a suspension containing ferrous hydroxide colloid obtained by adding not less than an equivalent of an alkali hydroxide solution to an aqueous ferrous salt solution, introducing an oxygen-containing gas-thereinto at a pH of not less than 11 and at a temperature of not higher than 80° C. (described in, for example, Japanese Patent Publication (KOKOKU) No. 39-5610 (1964), these particles obtained are referred hereinunder as "iron hydroxide-based goethite particles"), (ii) a method of producing spindle-shaped goethite particles by oxidizing a suspension containing $FeCO_3$ obtained by reacting an aqueous ferrous salt solution with an aqueous alkali carbonate solution, introducing an oxygen-containing gas thereinto (described in, for example, Japanese Patent Application Laid-Open (KOKAI) No. 50-80999 (1975), these particles obtained are referred hereinunder as "iron carbonate-based goethite particles"), and (iii) a method of producing spindle-shaped goethite particles by oxidizing a suspension containing an Fe-containing precipitate obtained by reacting an aqueous ferrous salt solution with a mixed aqueous solution of alkali carbonate and alkali hydroxide, introducing an oxygen-containing gas thereinto (described in, for example, Japanese Patent Application Laid-Open (KOKAI) No. 2-51429 (1990), these particles obtained are referred hereinunder as "mixed alkalis-based goethite particles").

Prior arts for producing these iron hydroxide-based goethite particles, iron carbonate-based goethite particles, mixed alkalis-based goethite particles are disclosed in, for example, Japanese Patent Publication (KOKOKU) Nos. 55-29577 (1970), 1-18961 (1989), 2-57122 (1990) and 3-43323 (1991), Japanese Patent Application Laid-Open (KOKAI) Nos. 63-222404 (1988), 3-49026 (1991), 4-56709 (1992), 4-63210 (1992), 5-62166 (1993), 5-98321 (1993), 6-25702 (1994), 6-36265 (1994), 6-139553 (1994), 6-140222 (1994) and 6-215360 (1994), and EP 0 466 338 A1.

The iron hydroxide-based goethite particles have an aspect ratio as large as 10 but contains dendrites and cannot be uniform particle size. This fact is described in, for example, Japanese Patent Application Laid-Open (KOKAI) No. 5-62166 (1993), " . . . are produced by air-oxidizing the hydrolyzate of a ferrous salt by an alkali hydroxide. According to this method, in order to make the goethite particles finer, for example, a water-soluble silicate -is added to a reaction system. . . . There is a tendency of producing dendrites in particles . . . , the particle size distribution of the magnetic iron-based alloy particles becomes wide. . . . If it is intended that the goethite particles are made extremely fine and that the particle size distribution is made uniform, the hydroxide alkali method has its limitation." When from the iron hydroxide-based goethite particles are produced magnetic iron-based alloy particles, although it is easy to obtain a high coercive force, especially not less than 1720 Oe, it is difficult to reduce the particle size and to obtain a uniform particle size, which makes it difficult to obtain an excellent switching field distribution.

The iron carbonate-based goethite particles are spindle-shaped particles which have a uniform particle size and which do not contain any dendrites, but the aspect ratio is at most about 7 and it is difficult to produce spindle-shaped goethite particles having a large aspect ratio. This fact is described in, for example, Japanese Patent Application Laid-Open (KOKAI) No. 5-62166 (1993), " . . . The spindle-shaped goethite particles obtained by the air-oxidization after hydrolyzing a ferrous salt by an alkali carbonate, are fine particles and have a uniform particle size. . . . It is considered that these goethite particles generally have a small aspect ratio and it is difficult to enhance the coercive force due to the shape anisotropy. . . . " When from the iron carbonate-based goethite particles are produced magnetic iron-based alloy particles, although the produced magnetic iron-based alloy particles show a excellent distribution, it is difficult to have a high coercive force, especially not less than 1720 Oe.

The mixed alkalis-based goethite particles are spindle-shaped particles having a uniform particle size and a large aspect ratio. This fact is described in, for example, Japanese Patent Application Laid-Open (KOKAI) No. 2-51429 (1990), " . . . It is possible to obtain spindle-shaped goethite particle having a large aspect ratio (major axis diameter/minor axis diameter). . . . " The mixed alkalis-based goethite particles have a tendency of producing magnetic fine iron-based alloy particles having a good size distribution and a higher coercive force than the magnetic iron-based alloy particles produced from the iron carbonate-based goethite particles.

The present inventors investigated in detail the magnetic iron-based alloy particles produced from the iron hydroxide-based goethite particles as the starting material in comparison with the magnetic iron-based alloy particles produced from the iron carbonate-based goethite particles as the starting material in accordance with the prior art.

The method disclosed in Japanese Patent Publication (KOKOKU) No. 55-29577 (1970) is a method of producing acicular Fe-Co alloy particles by producing acicular goethite particles uniformly containing Co (which is equivalent to the iron hydroxide-based goethite particles in this specification) and reducing the goethite particles with hydrogen. In Examples 3 and 4 of Japanese Patent Publication (KOKOKU) No. 55-29577 (1970), when 20 mol % and 25 mol % of Co is respectively added, fine particles having a major axis diameter of 0.2 μm and 0.1 μm, respectively, are obtained. However, the coercive force thereof is at most as low as 1120 Oe and 1000 Oe, respectively. In addition, even if the amount of Co added is increased, the coercive force lowers.

The method disclosed in Japanese Patent Publication (KOKOKU) No. 1-18961 (1989) is a method of producing magnetic iron-based alloy particles having a major axis diameter of 0.05 to 0.2 μm, an aspect ratio of 4 to 8 and a coercive force Hc of not less than 1300 Oe from spindle-shaped goethite particles having a major axis diameter of 0.05 to 0.3 μm, a minor axis diameter of 0.015 to 0.04 μm, and an aspect ratio of 3 to 15 (which is equivalent to the iron carbonate-based goethite particles in this specification). All the magnetic iron-based alloy particles obtained in Examples of Japanese Patent Publication (KOKOKU) No. 1-18961 (1989) have a coercive force of not more than 1700 Oe.

The method disclosed in Japanese Patent Publication (KOKOKU) No. 2-57122 (1990) is a method of producing iron magnetic particles or magnetic iron-based alloy particles by depositing a water-soluble salt of Al, Cr, Ce or Nd and an water-soluble borate compound or perborate compound on the surface of an oxide or hydroxide oxide of ferric oxide hydroxide of hematite containing another element such as Ni and Co, and heat-treating the particles in a reducing gas. In Examples 1 to 3 of Japanese Patent Publication (KOKOKU) No. 2-57122 (1990), a maximum coercive force (Hc) of the magnetic iron-based alloy particles is 1840 Oe, and all of these particles are produced from iron hydroxide-based goethite particles. The magnetic iron-based alloy particles in Examples 4 and 5 of Japanese Patent Publication (KOKOKU) No. 2-57122 (1990) are produced from iron carbonate-based goethite particles and have a coercive force (Hc) of 1430 to 1600 Oe.

The method disclosed in Japanese Patent Publication (KOKOKU) No. 3-43323 (1991) is a method of producing magnetic iron-based alloy particles by mixing an aqueous solution containing sodium carbonate and at least one compound selected from the group consisting of water-soluble Co compounds, Ni compounds and Cu compounds with an aqueous solution of a ferrous salt, blowing air into the obtained mixture to produce α-FeOOH (which is equivalent to the iron carbonate-based goethite particles in this specification), and thereafter reducing the resultant mixture. The coercive force (Hc) of the magnetic iron-based alloy particles obtained is 700 to 1200 Oe.

In the invention described in Japanese Patent Application Laid-Open (KOKAI) No. 63-222404 (1988), although the magnetic iron-based alloy particles having a coercive force (Hc) of not less than 1900 Oe are obtained, since the magnetic iron-based alloy particles is acicular, it is apparent that the iron hydroxide-based goethite particles is used as a raw material and as seen from the Comparative Examples described later, the size distribution of the obtained magnetic iron-based alloy particles is extremely inferior.

The magnetic iron-based alloy particles produced from mixed alkalis-based goethite particles in accordance with the prior art were also investigated.

According to the method described in Japanese Patent Application Laid-Open (KOKAI) No. 4-63210 (1992), when a zinc compound is existent in a suspension containing $FeCO_3$ or an Fe-containing precipitate obtained by reacting an aqueous ferrous salt solution with a mixed aqueous solution of an alkali carbonate and an alkali hydroxide, it is possible to obtain goethite particles (which is equivalent to the iron carbonate-based goethite particles in this specification) having an improved axis ratio, especially having an aspect ratio of more than 15, and it is possible to increase the coercive force of the magnetic iron-based alloy particles produced. In Examples 11 to 17 of Japanese Patent Application Laid-Open (KOKAI) No. 4-63210 (1992), the magnetic iron-based alloy particles having a coercive force (Hc) of more than 1700 Oe are obtained, but the axis diameter thereof is as large as 0.23 to 0.33 μm.

Japanese Patent Application Laid-Open (KOKAI) No. 5-62166 (1993) discloses spindle-shaped magnetic iron-based alloy particles produced from a starting material of spindle-shaped added metal-containing goethite particles (which is equivalent to the iron carbonate-based goethite particles in this specification) which are produced by air-oxidizing a precipitate slurry obtained by hydrolyzing a ferrous sulfate and a metal salt selected from the group consisting of Ni, Co, Zn and Mn with an alkali carbonate. In the Examples of Japanese Patent Application Laid-Open (KOKAI) No. 5-62166 (1993), the added metal is only Ni, and although the major axis diameter of the magnetic iron-based alloy particles obtained is as small as 0.10 to 0.20 μm, the coercive force thereof is not more than 1700 Oe.

Japanese Patent Application Laid-Open (KOKAI) No. 5-98321 (1993) discloses magnetic iron-based alloy particles produced by growing the crystals of iron hydroxide oxide (iron oxyhydroxide) on the surfaces of particles of the seed crystals mainly containing iron hydroxide oxide which is obtained by blowing an oxidizing gas into a suspension of a mixture of a ferrous salt and an alkali, by adding an aqueous solution of a rare earth compound and/or a silicon compound to the suspension in a nonoxidizing atmosphere in process of the oxidation, aging the suspension at a temperature higher than the oxidation temperature and blowing an oxidizing gas again into the suspension; coating the crystals with a shape-retaining agent, heat-treating the obtained particles and heat-treating the treated particles in a reducing gas. All of the goethite particles described in Examples 1 to 8 of Japanese Patent Application Laid-Open (KOKAI) No. 5-98321 (1993) are iron hydroxide-based goethite particles. The goethite particles described in Example 9 of Japanese Patent Application Laid-Open (KOKAI) No. 5-98321 (1993) are iron carbonate-based goethite particles, but in this case, compounds of a ferrous salt, Nd and Si are not added in the oxidation process to grow crystals, but the surfaces of spindle-shaped goethite particles are coated with a ferrous salt, Nd and Si. The coercive force (Hc) of the magnetic iron-based alloy particles obtained is 1602 Oe.

Japanese Patent Application Laid-Open (KOKAI) No. 6-140222 (1994) discloses magnetic iron-based alloy particles containing a rare earth element, an alkaline earth metal and Al and/or Si at around surface of each particle, and having an average major axis diameter of 0.05 to 0.3 μm, a coercive force of 1600 to 2000 Oe, a saturation magnetization of 100 to 150 emu/g, a specific surface area of 45 to 70 m²/g and a X-ray crystallite size as determined by X-ray diffraction of 120 to 170 Å.

Japanese Patent Application Laid-Open (KOKAI) No. 6-25702 (1994) discloses magnetic iron-based alloy particles and further containing Ni, Co, one or more rare earth element and Al and/or Si compound, and having a major axis diameter of 0.05 to 0.3 μm, a crystallite size of 130 to 170 Å, a specific surface area of 40 to 70 m²/g, a coercive force of 1600 to 2000 Oe and a saturation magnetization of not less than 100 emu/g after allowing to stand at 60° C. and 90% RH for 7 days.

In Example 9 of Japanese Patent Application Laid-Open (KOKAI) No. 6-25702 (1994), the stability against oxidation of the magnetic iron-based alloy particles is inferior and further the squareness ($\sigma_r/\sigma_s$) thereof is not satisfactory. In Example 6 of Japanese Patent Application Laid-Open (KOKAI) No. 6-140222 (1994), the coercive force (Hc) of the magnetic iron-based alloy particles is low, and in Example 7 thereof, although the saturation magnetization of the magnetic iron-based alloy particles is appropriate, the stability against oxidation thereof is inferior and further the squareness ($\sigma_r/\sigma_s$) thereof is not satisfactory.

From the result of the above-described investigation, it can be said that magnetic iron-based alloy particles produced from iron hydroxide-based goethite particles as a starting material have a coercive force (Hc) of more than 1700 Oe, while it is impossible to obtain fine magnetic iron-based alloy particles which have a coercive force (Hc) of more than 1700 Oe when iron carbonate-based goethite particles are used as a starting material.

That is, no fine magnetic iron-based alloy particles which have balanced properties such as a uniform particle size, no inclusion of dendrites, an appropriate aspect ratio, a high coercive force, an excellent coercive force distribution, a large saturation magnetization and an excellent and balanced stability against oxidation, are produced from iron carbonate-based goethite particles or mixed alkalis-based goethite particles as a starting material.

Accordingly, the technical problem of the present invention is to provide spindle-shaped fine magnetic iron-based alloy particles containing cobalt and iron as main ingredients which have a uniform particle size, especially size distribution (standard deviation/major axis diameter) of not more than 0.25, no inclusion of dendrites, a high coercive force, especially a coercive force (Hc) of 1720 to 2500 Oe and an excellent stability against oxidation, especially a saturation magnetization decrement percentage of not more than 17%.

Further, the technical problem of the present invention is to provide spindle-shaped magnetic iron-based alloy particles containing cobalt and iron as main ingredients which have a uniform particle size, especially a size distribution (standard deviation/major axis diameter) of not more than 0.25, no inclusion of dendrites, an average major axis diameter of 0.05 to 0.12 μm, a coercive force (Hc) of 1850 to 2500 Oe, a saturation magnetization of not less than 130 emu/g and an excellent stability against oxidation, especially a saturation magnetization decrement percentage of not more than 17%, by using mixed alkalis-based goethite particles as a starting material.

Also, the technical problem of the present invention is to provide spindle-shaped magnetic iron-based alloy particles containing cobalt and iron as main ingredients which have a uniform particle size, especially a size distribution (standard deviation/major axis diameter) of not more than 0.25, no inclusion of dendrites, an average major axis diameter of 0.05 to 0.18 μm, a coercive force (Hc) of 1720 to 2200 Oe, a saturation magnetization of not less than 110 emu/g and an excellent stability against oxidation, especially a saturation magnetization decrement percentage of not more than 14%, by using mixed alkalis-based goethite particles as a starting material.

As a result of studies undertaken by the present inventors so as to achieve the technical problem, it has been found that spindle-shaped magnetic iron-based alloy particles containing cobalt and iron as the main ingredients which are produced by so controlling that an average major axis diameter is 0.05 to 0.18 μm, an average minor axis diameter is 0.010 to 0.020 μm, an aspect ratio (major axis diameter/minor axis diameter) is 4 to 15 and X-ray crystallite size $D_{110}$ is 120 to 180 Å, a size distribution (standard deviation/ major axis diameter) of not more than 0.25 and the Co content in the spindle-shaped magnetic iron-based alloy particles is 1.0 to 50.0 atm % of Co (calculated as Co) based on the total Fe, have a high coercive force, especially a coercive force of 1720 to 2500, an excellent coercive force distribution, a saturation magnetization of not less than 110 emu/g and an excellent stability against oxidation, especially a saturation magnetization decrement percentage of not more than 17%. The present invention has been achieved on the basis of this finding.

SUMMARY OF THE INVENTION

In a first aspect of the present invention, there are provided spindle-shaped magnetic iron-based alloy particles containing cobalt and iron as the main ingredients in which the Co content is 1.0 to 50.0 atm % (calculated as Co) based on the total Fe in the spindle-shaped magnetic iron-based alloy particles, and which have an average major axis diameter of 0.05 to 0.18 μm, a size distribution (standard deviation/major axis diameter) of not more than 0.25, an average minor axis diameter of 0.010 to 0.020 μm, an aspect ratio (major axis diameter/minor axis diameter) of 4 to 15, an X-ray crystallite size $D_{110}$ of 120 to 180 Å, a coercive force of 1720 to 2500 Oe, a saturation magnetization of not less than 110 emu/g, a saturation magnetization decrement percentage of not more than 17% and squareness ($\sigma_r/\sigma_s$) of not less than 0.500.

In a second aspect of the present invention, there are provided spindle-shaped magnetic iron-based alloy particles containing cobalt and iron as the main ingredients in which the Co content is 8.0 to 50.0 atm % (calculated as Co) based on the total Fe in the spindle-shaped magnetic iron-based alloy particles, and which have an average major axis diameter of 0.05 to 0.12 μm, a size distribution (standard deviation/major axis diameter) of not more than 0.25, an average minor axis diameter of 0.010 to 0.020 μm, an aspect ratio (major axis diameter/minor axis diameter) of 4 to 7, an X-ray crystallite size $D_{110}$ of 125 to 180 Å, a coercive force of 1850 to 2500 Oe, a saturation magnetization of not less than 130 emu/g, a saturation magnetization decrement percentage of not more than 17% and squareness ($\sigma_r/\sigma_s$) of not less than 0.500.

In a third aspect of the present invention, there are provided spindle-shaped magnetic iron-based alloy particles containing cobalt and iron as the main ingredients in which the Co content is not less than 1.0 atm % and less than 8.0 atm % (calculated as Co) based on the total Fe in the spindle-shaped magnetic iron-based alloy particles, and which have an average major axis diameter of 0.05 to 0.18 μm, a size distribution (standard deviation/major axis diameter) of not more than 0.25, an average minor axis diameter of 0.010 to 0.018 μm, an aspect ratio (major axis diameter/minor axis diameter) of 4 to 15, an X-ray crystallite size $D_{110}$ of 120 to 160 Å, a coercive force of 1720 to 2200 Oe, a saturation magnetization of not less than 110 emu/g, a saturation magnetization decrement percentage of not more than 14% and squareness ($\sigma_r/\sigma_s$) of not less than 0.505.

In a fourth aspect of the present invention, there are provided spindle-shaped magnetic iron-based alloy particles containing cobalt and iron as the main ingredients in which Co is 8.0 to 50.0 atm % (calculated as Co) based on the total Fe in the spindle-shaped magnetic iron-based alloy particles, and which have an average major axis diameter of 0.05 to 0.12 μm, a size distribution (standard deviation/major axis diameter) of not more than 0.25, an average minor axis diameter of 0.010 to 0.020 μm, an aspect ratio of 4 to 7, an X-ray crystallite size $D_{110}$ of 125 to 180 Å, a relationship between the X-ray crystallite size $D_{110}$ (Å) and average major axis diameter (L, μm) being represented by the following formula, a coercive force Hc of 1850 to 2500 Oe, a saturation magnetization of not less than 130 emu/g, and a saturation magnetization decrement percentage of not more than 17%:

$$[(L \times 500)+100] \leq D_{110} \leq [(L \times 500)+120]$$

In a fifth aspect of the present invention, there are provided spindle-shaped magnetic iron-based alloy particles containing cobalt, at least one element selected from the group consisting of Al, Si, Nd, Y, La, Ce, Pr and Tb and iron as the main ingredients in which the Co content is 8.0 to 50 atm % (calculated as Co) based on the total Fe in the spindle-shaped magnetic iron-based alloy particles and the content of said at least one element selected from the group consisting of Al, Si, Nd, Y, La, Ce, Pr and Tb is 0.1 to 10.0 atm % (calculated as the element) based on the total Fe in the spindle-shaped magnetic iron-based alloy particles, and which have an average major axis diameter of 0.05 to 0.12 μm, a size distribution (standard deviation/major axis diameter) of not more than 0.25, an average minor axis diameter of 0.010 to 0.020 μm, an aspect ratio (major axis diameter/minor axis diameter) of 4 to 7, an X-ray crystallite size $D_{110}$ of 125 to 180 Å, a coercive force of 1850 to 2500 Oe, a saturation magnetization of not less than 130 emu/g, and a saturation magnetization decrement percentage of not more than 17%.

In a sixth aspect of the present invention, there are provided spindle-shaped magnetic iron-based alloy particles containing cobalt, at least one element selected from the group consisting of Al, Si, Ca, Mg, Ba, Sr, Nd, Y, La, Ce, Pr and Tb and iron as the main ingredients in which the Co content is not less than 1.0 atm % and less than 8.0 atm % (calculated as Co) based on the total Fe in the spindle-shaped magnetic iron-based alloy particles and the content of said at least one element selected from the group consisting of Al, Si, Ca, Mg, Ba, Sr, Nd, Y, La, Ce, Pr and Tb is 0.1 to 5.0 atm % (calculated as the element) based on the total Fe in the spindle-shaped magnetic iron-based alloy particles, and which have an average major axis diameter of 0.05 to 0.18 μm, a size distribution (standard deviation/major axis diameter) of not more than 0.25, an average minor axis diameter of 0.010 to 0.018 μm, an aspect ratio (major axis diameter/minor axis diameter) of 4 to 15, an X-ray crystallite size $D_{110}$ of 120 to 160 Å, a coercive force of 1720 to 2200 Oe, a saturation magnetization of not less than 110 emu/g, and a saturation magnetization decrement percentage of not more than 14%.

In a seventh aspect of the present invention, there are provided spindle-shaped magnetic iron-based alloy particles containing cobalt, at least one element selected from the group consisting of Al, Si, Nd, Y, La, Ce, Pr and Tb and iron as the main ingredients, and coated with a compound containing at least one element selected from the group consisting of Ni, Al, Si, P, Co, Ca, Mg, Ba, Sr, Bi, B, Zn, Nd, Y, La, Ce, Pr and Tb, in which the Co content is 8.0 to 50.0 atm % (calculated as Co) based on the total Fe in the spindle-shaped magnetic iron-based alloy particles, the content of said at least one element selected from the group consisting of Al, Si, Nd, Y, La, Ce, Pr and Tb is 0.1 to 10.0 atm % (calculated as the element) based on the total Fe in the spindle-shaped magnetic iron-based alloy particles and the amount of said at least one element selected from the group consisting of Ni, Al, Si, P, Co, Ca, Mg, Ba, Sr, Bi, B, Zn, Nd, Y, La, Ce, Pr and Tb for coating is preferably not more than 25.0 atm % (calculated as the element) based on the spindle-shaped magnetic iron-based alloy particles, and which have an average major axis diameter of 0.05 to 0.12 μm, a size distribution (standard deviation/major axis diameter) of not more than 0.25, an average minor axis diameter of 0.010 to 0.020 μm, an aspect ratio (major axis diameter/minor axis diameter) of 4 to 7, an X-ray crystallite size $D_{110}$ of 125 to 180 Å, a coercive force of 1850 to 2500 Oe, a saturation magnetization of not less than 130 emu/g, and a saturation magnetization decrement percentage of not more than 17%.

In an eighth aspect of the present invention, there are provided spindle-shaped magnetic iron-based alloy particles containing cobalt, at least one element selected from the group consisting of Al, Si, Ca, Mg, Ba, Sr, Nd, Y, La, Ce, Pr and Tb and iron as main ingredients, and coated with a compound containing at least one element selected from the group consisting of Ni, Al, Si, P, Co, Ca, Mg, Ba, Sr, Bi, B, Zn, Nd, Y, La, Ce, Pr and Tb, in which the Co content is not less than 1.0 atm % and less than 8.0 atm % (calculated as Co) based on the total Fe in the spindle-shaped magnetic iron-based alloy particles and the content of said at least one element selected from the group consisting of Al, Si, Ca, Mg, Ba, Sr and Nd is 0.1 to 5.0 atm % (calculated as the element) based on the total Fe in the spindle-shaped magnetic iron-based alloy particles and the amount of said at least one element selected from the group consisting of Ni, Al, Si, P, Co, Ca, Mg, Ba, Sr, Bi, B, Zn, Nd, Y, La, Ce, Pr and Tb for coating is preferably not more than 25.0 atm % (calculated as the element) based on the spindle-shaped magnetic iron-based alloy particles, and which have an average major axis diameter of 0.05 to 0.18 μm, a size distribution (standard deviation/major axis diameter) of not more than 0.25, an average minor axis diameter of 0.010 to 0.018 μm, an aspect ratio (major axis diameter/minor axis diameter) of 4 to 15, an X-ray crystallite size $D_{110}$ of 120 to 160 Å, a coercive force of 1720 to 2200 Oe, a saturation magnetization of not less than 110 emu/g, and a saturation magnetization decrement percentage of not more than 14%.

In a ninth aspect of the present invention, there are provided spindle-shaped goethite particles containing cobalt in which Co is 1.0 to 50.0 atm % (calculated as Co) based on the total Fe in the spindle-shaped goethite particles and which have an average major axis diameter of 0.05 to 0.20 μm, a size distribution (standard deviation/major axis diameter) of not more than 0.30, an average minor axis diameter of 0.010 to 0.025 μm, an aspect ratio of 4 to 15 and an X-ray crystallite size ratio ($D_{020}/D_{110}$) of 1.5 to 3.5.

In a tenth aspect of the present invention, there are provided spindle-shaped goethite particles containing cobalt in which Co is 8.0 to 50.0 atm % (calculated as Co) based on the total Fe in the spindle-shaped goethite particles and which have an average major axis diameter of 0.05 to 0.15 μm, a size distribution (standard deviation/major axis diameter) of not more than 0.30, an average minor axis diameter of 0.010 to 0.025 μm, an aspect ratio of 4 to 8, an X-ray crystallite size $D_{110}$ of 70 to 200 Å, an X-ray crystallite size $D_{020}$ of 160 to 300 Å and an X-ray crystallite size ratio ($D_{020}/D_{110}$) of 2.0 to 3.5.

In an eleventh aspect of the present invention, there is provided a process for producing spindle-shaped magnetic iron-based alloy particles containing cobalt and iron as the main ingredients comprising producing spindle-shaped goethite particles by aging a suspension containing an Fe-containing precipitate, which is obtained by reacting an aqueous alkali carbonate solution and an aqueous alkali hydroxide solution with an aqueous ferrous salt solution stirring said suspension in a nonoxidizing atmosphere, introducing an oxygen-containing gas into said suspension to complete an oxidation, and heat-treating said goethite particles or hematite particles which are produced by heat-dehydrating said spindle-shaped goethite particles in a reducing gas, wherein said aqueous alkali hydroxide solution is added at 0.2 to 1.2 of molar ratio (alkali hydroxide/alkali carbonate) to said aqueous alkali carbonate solution or said suspension containing an Fe-containing precipitate before aging so that the equi-molar ratio [(1/2×alkali hydroxide+alkali carbonate)/iron] is 1.3 to 2.5, said suspension is aged at a temperature of 40 to 60° C. for 2 to 7 hours in a nonoxidizing atmosphere, a Co compound of 1.0 to 50.0 atm %, calculated as Co, based on the total Fe in said aqueous ferrous salt solution is added to said aqueous ferrous salt solution, said suspension containing an Fe-containing precipitate before aging, or said suspension in the process of aging, and a compound of at least one element selected from the group consisting of Al, Si, Ca, Mg, Ba, Sr, Nd, Y, La, Ce, Pr and Tb of 0.1 to 10.0 atm %, calculated as an element, based on the total Fe in said aqueous ferrous salt solution is added to said aqueous ferrous salt solution in process of said oxidation under the same condition as the condition for said oxidation when the oxidation fraction (ferric/total iron) is 20 to 90%.

In a twelfth aspect of the present invention, there is provided a process for producing spindle-shaped magnetic iron-based alloy particles containing cobalt and iron as the main ingredients comprising producing spindle-shaped goethite particles by aging a suspension containing an Fe-containing precipitate, which is obtained by reacting an aqueous alkali carbonate solution and an aqueous alkali hydroxide solution with an aqueous ferrous salt solution stirring said suspension in a nonoxidizing atmosphere, introducing an oxygen-containing gas into said suspension to complete an oxidation, and heat-treating said goethite particles or hematite particles which are produced by heat-dehydrating said spindle-shaped goethite particles in a reducing gas, wherein said aqueous alkali hydroxide solution is added at 0.2 to 1.2 of molar ratio (alkali hydroxide/alkali carbonate) to said aqueous alkali carbonate solution or said suspension containing an Fe-containing precipitate before aging so that the equi-molar ratio [(1/2×alkali hydroxide+alkali carbonate)/iron] is 1.3 to 2.5, a compound of at least one element selected from the group consisting of Si, Nd, Y, La, Ce, Pr and Tb of 0.1 to 1.0 atm %, calculated as said element, based on the total Fe in said aqueous ferrous salt solution is added to said aqueous ferrous salt solution, said aqueous alkali carbonate solution, said aqueous alkali hydroxide solution, or said suspension containing an Fe-containing precipitate after aging, a Co compound of 8.0 to 50.0 atm %, calculated as Co, based on the total Fe in said aqueous ferrous salt solution is added to said aqueous ferrous salt solution, said suspension containing an Fe-containing precipitate before aging, or said suspension in the process of aging, and a compound of at least one element selected from the group consisting of Al, Si, Nd, Y, La, Ce, Pr and Tb of 0.1 to 10.0 atm %, calculated as an element, based on the total Fe in said aqueous ferrous salt solution is added to said aqueous ferrous salt solution in process of said oxidation under the same condition as the condition for said oxidation when the oxidation fraction (ferric/total iron) is 20 to 50%.

In a thirteenth aspect of the present invention, there is provided a process for producing spindle-shaped magnetic iron-based alloy particles comprising producing spindle-shaped goethite particles by aging a suspension containing an Fe-containing precipitate, which is obtained by reacting an aqueous alkali carbonate solution and an aqueous alkali hydroxide solution with an aqueous ferrous salt solution, and by introducing an oxygen-containing gas into said suspension to complete an oxidation, wherein said aqueous alkali hydroxide solution is added at 0.2 to 1.0 of molar ratio (alkali hydroxide/alkali carbonate) to said aqueous said aqueous alkali carbonate solution, or said suspension containing an Fe-containing precipitate before aging so that the equi-molar ratio [(1/2×alkali hydroxide+alkali carbonate)/iron] is 1.3 to 1.8, said suspension is aged at a temperature of 40 to 60° C. for 2 to 7 hours in a nonoxidizing atmosphere, a Co compound of not less than 1.0 and less than 8.0 atm %, calculated as Co, based on the total Fe in said aqueous ferrous salt solution is added to said aqueous ferrous salt solution, said suspension containing an Fe-containing precipitate before aging, or the aged suspension containing an Fe-containing precipitate, said suspension is oxidized at a temperature of 40 to 60° C., and said spindle-shaped goethite particles or spindle-shaped hematite particles which are produced by heat-dehydrating said spindle-shaped goethite particles are heat-treated in a reducing gas.

In a fourteenth aspect of the present invention, there is provided a process for producing spindle-shaped goethite particles containing cobalt comprising aging a suspension containing an Fe-containing precipitate, which is obtained by reacting an aqueous alkali carbonate solution and an aqueous alkali hydroxide solution with an aqueous ferrous salt solution stirring said suspension in a nonoxidizing atmosphere, and introducing an oxygen-containing gas into said suspension to complete an oxidation, wherein said aqueous alkali hydroxide solution is added at 0.2 to 1.2 molar ratio (alkali hydroxide/alkali carbonate) to said aqueous alkali carbonate solution, or said suspension containing an Fe-containing precipitate before aging so that the equi-molar ratio [(1/2×alkali hydroxide+alkali carbonate)/iron] is 1.3 to 2.5, said suspension is aged at a temperature of 40 to 60° C. for 2 to 7 hours in a nonoxidizing atmosphere, a Co compound of 1.0 to 50.0 atm %, calculated as Co based on the total Fe in said aqueous ferrous salt solution is added to said aqueous ferrous salt solution, said suspension containing an Fe-containing precipitate before aging, or said suspension in process of aging, and a compound of at least one element selected from the group consisting of Al, Si, Ca, Mg, Ba, Sr, Nd, Y, La, Ce, Pr and Tb of 0.1 to 10.0 atm %, calculated as an element, based on the total Fe in said aqueous ferrous salt solution is added to said aqueous ferrous salt solution in process of said oxidation under the same condition as the condition for said oxidation when the oxidation fraction (ferric/total iron) is 20 to 90%.

In a fifteenth aspect of the present invention, there is provided a process for producing spindle-shaped goethite particles containing cobalt comprising aging a suspension containing an Fe-containing precipitate, which is obtained by reacting an aqueous alkali carbonate solution and an aqueous alkali hydroxide solution with an aqueous ferrous salt solution stirring said suspension in a nonoxidizing atmosphere, and introducing an oxygen-containing gas into said suspension to complete an oxidation, wherein said aqueous alkali hydroxide solution is added at 0.2 to 1.2 molar ratio (alkali hydroxide/alkali carbonate) to said aqueous alkali carbonate solution, or said suspension containing an Fe-containing precipitate before aging so that the equi-molar ratio [(1/2×alkali hydroxide+alkali carbonate)/iron] is 1.3 to 2.5, a compound of at least one element selected from the group consisting of Si, Nd, Y, La, Ce, Pr and Tb of 0.1 to 1.0 atm %, calculated as said element, based on the total Fe in said aqueous ferrous salt solution is added to said aqueous ferrous salt solution, said aqueous alkali carbonate solution, said aqueous alkali hydroxide solution, or said suspension containing an Fe-containing precipitate after aging, a Co compound of 8.0 to 50.0 atm %, calculated as Co based on the total Fe in said aqueous ferrous salt solution is added to said aqueous ferrous salt solution, said suspension containing an Fe-containing precipitate before aging, or said suspension in process of aging, and a compound of at least one element selected from the group consisting of Al, Si, Nd, Y, La, Ce, Pr and Tb of 0.1 to 10.0 atm %, calculated as an element, based on the total Fe in said aqueous ferrous salt solution is added to said aqueous ferrous salt solution in process of said oxidation under the same condition as the condition for said oxidation when the oxidation friction (ferric/total iron) is 20 to 50%.

In a sixteenth aspect of the present invention, there is provided a magnetic recording medium comprising a substrate, and a magnetic recording layer which is formed on the substrate and is composed of magnetic iron-based alloy particles as defined in claim 1 and a binder.

DESCRIPTION OF THE PREFERRED EMBODIMENTS

Figure 1:
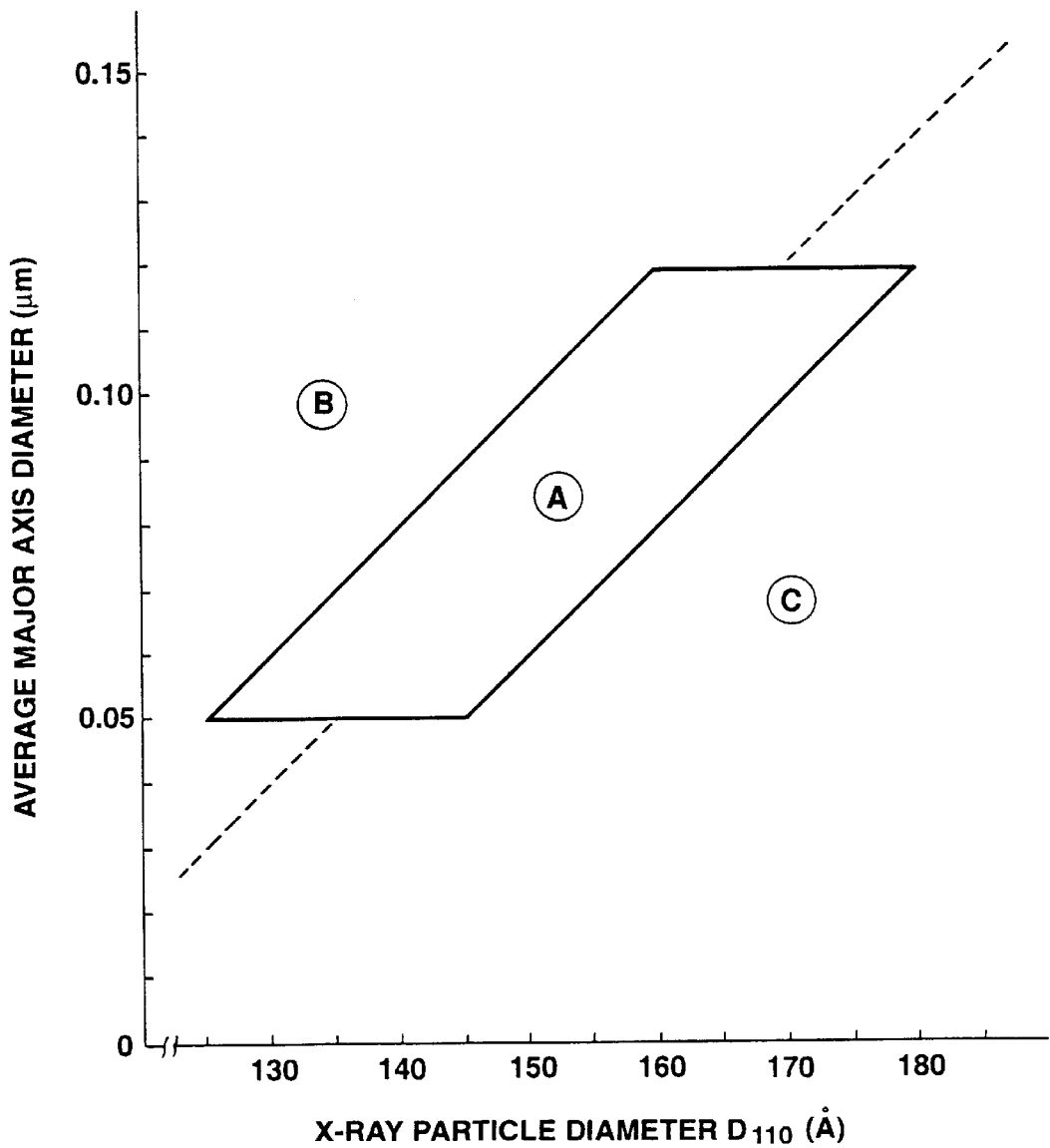
FIG. 1 shows the relationship between the average major axis diameter ($\mu$m) and the X-ray crystallite size $D_{110}$ of the spindle-shaped magnetic iron-based alloy particles according to the present invention.

Firstly, the spindle-shaped magnetic iron-based alloy particles and further containing cobalt (hereinunder referred to simply as "spindle-shaped magnetic iron-based alloy particles") in the first aspect of the present invention will be described.

The lower limit of the average major axis diameter of the spindle-shaped magnetic iron-based alloy particles of the present invention is 0.05 μm and the upper limit thereof is 0.18 μm.

If the average major axis diameter is less than 0.05 μm, the major axis diameter is so small that the particle diameter approaches the range revealing a superparamagnetism and the saturation magnetization and the coercive force lower. If the average major axis diameter exceeds 0.18 μm, it is easy to obtain a large saturation magnetization, but it is difficult to obtain a high coercive force when the aspect ratio is in the range defined by the present invention.

The size distribution (standard deviation/major axis diameter) of the spindle-shaped magnetic iron-based alloy particles of the present invention is not more than 0.25. If the size distribution exceeds 0.25, the dispersibility of the spindle-shaped magnetic iron-based alloy particles is deteriorated, the distribution thereof is broad and S.F.D. is deteriorated.

The lower limit of the average minor axis diameter of the spindle-shaped magnetic iron-based alloy particles of the present invention is 0.010 μm and the upper limit thereof is 0.020 μm.

If the average minor axis diameter is less than 0.010 μm, the major axis diameter is so small that the particle diameter approaches the range revealing a superparamagnetism and it is difficult to obtain a large saturation magnetization and the coercive force lowers. If the average minor axis diameter exceeds 0.020 μm, it is difficult to obtain a high coercive force when the aspect ratio is in the range defined by the present invention.

The lower limit of the aspect ratio is 4 and the upper limit thereof is 15.

If the aspect ratio is less than 4, it is difficult to obtain a high coercive force. If the aspect ratio exceeds 15, although it is easy to obtain a high coercive force, it is difficult to obtain a large saturation magnetization.

The lower limit of the X-ray crystallite size $D_{110}$ of the spindle-shaped magnetic iron-based alloy particles of the present invention is 120 Å and the upper limit thereof is 180 Å. If the X-ray crystallite size is less than 120 Å, it is impossible to obtain a large saturation magnetization. If it exceeds 180 Å, although a large saturation magnetization is obtained, the coercive force lowers due to the particle shape.

The lower limit of the coercive force (Hc) of the spindle-shaped magnetic iron-based alloy particles of the present invention is 1720 Oe and the upper limit thereof is 2500 Oe.

If the coercive force is less than 1720 Oe, it is difficult to improve the frequency characteristics when from the spindle-shaped magnetic iron-based alloy particles are produced a magnetic recording medium. If the coercive force exceeds 2500 Oe, it is meaningless to raise the coercive force more than necessary from the point of view of a recording reproducing head.

The saturation magnetization of the spindle-shaped magnetic iron-based alloy particles of the present invention is not less than 110 emu/g. If the saturation magnetization is less than 110 emu/g, it is difficult to obtain a magnetic recording medium having a large saturation magnetic flux density, which is not favorable as a high-density recording material.

The saturation magnetization decrement percentage of the spindle-shaped magnetic iron-based alloy particles of the present invention is not more than 17%. If the saturation magnetization decrement percentage exceeds 17%, the stability against oxidation of the spindle-shaped magnetic iron-based alloy particles is deteriorated.

The lower limit of the cobalt content in the spindle-shaped magnetic iron-based alloy particles of the present invention is 1.0 atm % (calculated as Co) based on the total Fe in the spindle-shaped magnetic iron-based alloy particles and the upper limit thereof is 50.0 atm % (calculated as Co) based on the total Fe in the spindle-shaped magnetic iron-based alloy particles.

The squareness ($\sigma_r/\sigma_s$) of the spindle-shaped magnetic iron-based alloy particles of the present invention is not less than 0.500, preferably not less than 0.505. If the squareness ($\sigma_r/\sigma_s$) of the spindle-shaped magnetic iron-based alloy particles of the present invention is less than 0.500, it is difficult to accomplish the aims of the present invention.

If the Co content is less than 1.0 atm %, it is difficult to obtain a large saturation magnetization and an excellent stability against oxidation. If the Co content exceeds 50.0 atm %, it leads to a reduction of the saturation magnetization.

The spindle-shaped magnetic iron-based alloy particles of the present invention preferably contain a compound of at least one element selected from the group consisting of Al, Si, Nd, Y, La, Ce, Pr, Tb, Ca, Mg, Ba and Sr. The preferable content of the compound thereof is not more than 10.0 atm % (calculated as the element) based on the total Fe in the spindle-shaped magnetic iron-based alloy particles.

The spindle-shaped magnetic iron-based alloy particles of the present invention is preferably coated with a compound containing at least one element selected from the group consisting of Ni, Al, Si, P, Co, Ca, Mg, Ba, Sr, Bi, B, Zn, Nd, Y, La, Ce, Pr and Tb. The preferable amount of the compound thereof is preferably not more than 25 atm % (calculated as the element) based on the total Fe in the spindle-shaped magnetic iron-based alloy particles.

Secondly, the spindle-shaped magnetic iron-based alloy particles and further containing cobalt and iron in the second aspect of the present invention will be described.

The lower limit of the average major axis diameter of the spindle-shaped magnetic iron-based alloy particles of the present invention is 0.05 μm and the preferable upper limit thereof is 0.12 μm, more preferably 0.10 μm.

If the average major axis diameter is less than 0.05 μm, the major axis diameter is so small that the particle diameter approaches the range revealing a superparamagnetism and the saturation magnetization and the coercive force lower. When the average major axis diameter is more than 0.12 μm, it is easy to obtain a large saturation magnetization, but it may be difficult to easily obtain a high coercive force when the aspect ratio is in the range defined by the present invention.

The size distribution (standard deviation/major axis diameter) of the spindle-shaped magnetic iron-based alloy particles of the present invention is not more than 0.25, preferably not more than 0.23, more preferably 0.20. If the size distribution exceeds 0.25, the dispersibility of the spindle-shaped magnetic iron-based alloy particles is deteriorated.

The lower limit of the average minor axis diameter of the spindle-shaped magnetic iron-based alloy particles of the present invention is 0.010 $\mu$m and the upper limit thereof is 0.020 $\mu$m, preferably 0.018 $\mu$m.

If the average minor axis diameter is less than 0.010 $\mu$m, the major axis diameter is so small that the particle diameter approaches the range revealing a superparamagnetism and it is difficult to obtain a large saturation magnetization and the coercive force lowers. If the average minor axis diameter exceeds 0.020 $\mu$m, it is difficult to obtain a high coercive force when the aspect ratio is in the range defined by the present invention.

The lower limit of the aspect ratio is 4 and the preferable upper limit thereof is 7.

If the aspect ratio is less than 4, it is difficult to obtain a high coercive force. When the aspect ratio is not more than 7, it is easy to easily obtain a high coercive force, but it may be difficult to obtain a large saturation magnetization.

The preferable lower limit of the X-ray crystallite size $D_{110}$ of the spindle-shaped magnetic iron-based alloy particles of the present invention is 125 Å, more preferably 130 Å and the upper limit thereof is 180 Å, more preferably 160 Å. When the X-ray crystallite size is not less than 125 Å, it may be difficult to easily obtain a large saturation magnetization. If it exceeds 180 Å, although a large saturation magnetization is obtained, the coercive force lowers due to the particle shape.

The relationship between the average major axis diameter and the X-ray crystallite size $D_{110}$ (Å) of the spindle-shaped magnetic iron-based alloy particles of the present invention is preferably as represented by the following formula:

$$[(L \times 500) + 100] \leq D_{110} \leq [(L \times 500) + 120]$$

wherein L represents the average major axis diameter ($\mu$m).

The relationship between the X-ray crystallite size $D_{110}$ and the average major axis diameter is shown in FIG. 1. The region (A) in FIG. 1 is the range intended in the present invention. If the relationship is in the region (B), it is difficult to obtain a high saturation magnetization. On the other hand, if the relationship is in the region (C), not only is it difficult to obtain a high saturation magnetization but also the switching field distribution is deteriorated. It is also difficult to obtain an excellent dispersibility when a magnetic recording medium is produced from the spindle-shaped magnetic iron-based alloy particles.

The preferable lower limit of the coercive force (Hc) of the spindle-shaped magnetic iron-based alloy particles of the present invention is 1850 Oe, more preferably 1900 Oe and the upper limit thereof is 2500 Oe, preferably 2400 Oe, more preferably 2300 Oe.

If the coercive force is less than 1850 Oe, it may be difficult to easily improve the frequency characteristics when form the spindle-shaped magnetic iron-based alloy particles are produced a magnetic recording medium. If the coercive force exceeds 2500 Oe, it is meaningless to raise the coercive force more than necessary from the point of view of a recording-reproducing head.

The saturation magnetization of the spindle-shaped magnetic iron-based alloy particles of the present invention is preferably not less than 130 emu/g, more preferably not less than 135 emu/g. When the saturation magnetization is less than 130 emu/g, it may be difficult to easily obtain a magnetic recording medium having a large saturation magnetic flux density, which is not favorable as a high-density recording material.

The saturation magnetization decrement percentage of the spindle-shaped magnetic iron-based alloy particles of the present invention is not more than 17%. If the saturation magnetization decrement percentage exceeds 17% the stability against oxidation of the spindle-shaped magnetic iron-based alloy particles is deteriorated.

The squareness ($\sigma_r/\sigma_s$) of the spindle-shaped magnetic iron-based alloy particles of the present invention is not less than 0.500, preferably not less than 0.505. If the squareness ($\sigma_r/\sigma_s$) of the spindle-shaped magnetic iron-based alloy particles of the present invention is less than 0.500, it is difficult to accomplish the aims of the present invention.

The preferable lower limit of the cobalt content in the spindle-shaped magnetic iron-based alloy particles of the present invention is 8.0 atm % and the upper limit thereof is 50.0 atm %, preferably 43.0 atm %, more preferably 36.0 atm % (calculated as Co) based on the total Fe in the spindle-shaped magnetic iron-based alloy particles.

When the Co content is less than 8.0 atm %, it may be difficult to easily obtain a large saturation magnetization and an excellent stability against oxidation. If the Co content exceeds 50.0 atm %, it leads to a reduction of the saturation magnetization.

The spindle-shaped magnetic iron-based alloy particles of the present invention preferably contain a compound of at least one element selected from the group consisting of Al, Si, Nd, Y, La, Ce, Pr and Tb. The content of the compound thereof is preferably not more than 10.0 atm % (calculated as the element) based on the total Fe in the spindle-shaped magnetic iron-based alloy particles.

The spindle-shaped magnetic iron-based alloy particles of the present invention are preferably coated with a compound containing at least one element selected from the group consisting of Ni, Al, Si, P, Co, Ca, Mg, Ba, Sr, Bi, B, Zn, Nd, Y, La, Ce, Pr and Tb. The amount of the compound thereof is preferably not more than 25.0 atm % (calculated as the element) based on the total Fe in the spindle-shaped magnetic iron-based alloy particles.

Thirdly, the spindle-shaped magnetic iron-based alloy particles and further containing cobalt and iron in the third aspect of the present invention will be described.

The lower limit of the average major axis diameter of the spindle-shaped magnetic iron-based alloy particles of the present invention is 0.05 $\mu$m and the upper limit thereof is 0.18 $\mu$m, preferably 0.15 $\mu$m.

If the average major axis diameter is less than 0.05 $\mu$m, the major axis diameter is so small that the particle diameter approaches the range revealing a superparamagnetism and the saturation magnetization and the coercive force lower. If the average major axis diameter is more than 0.18 $\mu$m, it is easy to obtain a large saturation magnetization, but it is difficult to obtain a high coercive force when the aspect ratio is in the range defined by the present invention.

The size distribution (standard deviation/major axis diameter) of the spindle-shaped magnetic iron-based alloy particles of the present invention is not more than 0.25, preferably not more than 0.23, more preferably 0.20. If the size distribution exceeds 0.25, the dispersibility of the spindle-shaped magnetic iron-based alloy particles is deteriorated.

The lower limit of the average minor axis diameter of the spindle-shaped magnetic iron-based alloy particles of the present invention is 0.010 μm and the preferable upper limit thereof is 0.018 μm, more preferably 0.015 μm.

If the average minor axis diameter is less than 0.010 μm, the more axis diameter is so small that the particle diameter approaches the range revealing a superparamagnetism and it is difficult to obtain a large saturation magnetization and the coercive force lowers. When the average minor axis diameter is more than 0.018 μm, it may be difficult to easily obtain a high coercive force when the aspect ratio is in the range defined by the present invention.

The lower limit of the aspect ratio is 4, preferably 5 and the upper limit thereof is preferably 15, preferably 10.

If the aspect ratio is less than 4, it is difficult to obtain a high coercive force. If the aspect ratio exceeds 15, although it is easy to obtain a high coercive force, it is difficult to obtain a large saturation magnetization.

The lower limit of the X-ray crystallite size $D_{110}$ of the spindle-shaped magnetic iron-based alloy particles of the present invention is 120 Å and the preferable upper limit thereof is 160 Å. If the X-ray crystallite size is less than 120 Å, it is difficult to obtain a large saturation magnetization. When the X-ray crystallite size $D_{110}$ is more than 160 Å, although a large saturation magnetization can be obtained, the coercive force may lower.

The lower limit of the coercive force (Hc) of the spindle-shaped magnetic iron-based alloy particles of the present invention is 1720 Oe, preferably 1750 Oe and the preferable upper limit thereof is 2200 Oe, more preferably 2100 Oe, still more preferably 2000 Oe.

If the coercive force is less than 1720 Oe, it is difficult to improve the frequency characteristics when the spindle-shaped magnetic iron-based alloy particles are produced into a magnetic recording medium.

The saturation magnetization of the spindle-shaped magnetic iron-based alloy particles of the present invention is not less than 110 emu/g, preferably not less than 114 emu/g, more preferably 116 emu/g. If the saturation magnetization is less than 110 emu/g, it is difficult to obtain a magnetic recording medium having a large saturation magnetic flux density, which is not favorable as a high-density recording material.

The saturation magnetization decrement percentage of the spindle-shaped magnetic iron-based alloy particles of the present invention is not more than 14%. If the saturation magnetization decrement percentage exceeds 14%, the stability against oxidation of the spindle-shaped magnetic iron-based alloy particles may be insufficient.

The squareness ($\sigma_r/\sigma_s$) of the spindle-shaped magnetic iron-based alloy particles of the present invention is not less than 0.505. If the squareness ($\sigma_r/\sigma_s$) of the spindle-shaped magnetic iron-based alloy particles of the present invention is less than 0.500, it may be difficult to easily accomplish the aims of the present invention.

The cobalt content in the spindle-shaped magnetic iron-based alloy particles of the present invention is not less than 1.0 atm % and less than 8.0 atm %, preferably not less than 1.5 atm % and less than 8.0 atm %, more preferably not less than 2.0 atm % and less than 8.0 atm % (calculated as Co) based on the total Fe in the spindle-shaped magnetic iron-based alloy particles.

If the Co content is less than 1.0 atm %, it is difficult to obtain a large saturation magnetization and an excellent stability against oxidation.

The spindle-shaped magnetic iron-based alloy particles of the present invention preferably contain a compound of at least one element selected from the group consisting of Al, Si, Nd, Y, La, Ce, Pr, Tb, Ca, Mg, Ba and Sr. The content of the compound thereof is preferably not more than 5.0 atm % (calculated as the element) based on the total Fe in the spindle-shaped magnetic iron-based alloy particles.

The spindle-shaped magnetic iron-based alloy particles of the present invention are preferably coated with a compound containing at least one element selected from the group consisting of Ni, Al, Si, P, Co, Ca, Mg, Ba, Sr, Bi, B, Zn, Nd, Y, La, Ce, Pr and Tb. The amount of the compound thereof is preferably not more than 25.0 atm % (calculated as the element) based on the total Fe in the spindle-shaped magnetic iron-based alloy particles.

The spindle-shaped goethite particles containing cobalt in ninth aspect of the present invention will now be described.

The lower limit of the average major axis diameter of the spindle-shaped goethite particles of the present invention is 0.05 μm, and the upper limit thereof is 0.20 μm.

If the average major axis diameter is less than 0.05 μm, the major axis diameter is so small that the particle diameter of the spindle-shaped magnetic iron-based alloy particles produced therefrom becomes small and approaches the range revealing a superparamagnetism. As a result, the saturation magnetization and coercive force of the spindle-shaped magnetic iron-based alloy particles produced therefrom also lower. If the average major axis diameter exceeds 0.20 μm, it is easy to obtain a large saturation magnetization, but it is difficult to obtain a high coercive force when the aspect ratio is in the range defined by the present invention.

The size distribution (standard deviation/major axis diameter) of the spindle-shaped goethite particles of the present invention is not more than 0.30. If the size distribution exceeds 0.30, the dispersibility of the spindle-shaped magnetic iron-based alloy particles produced therefrom is deteriorated.

The lower limit of the average minor axis diameter of the spindle-shaped goethite particles of the present invention is 0.010 μm, and the upper limit thereof is 0.025 μm.

If the average minor axis diameter is less than 0.010 μm, the minor axis diameter of the spindle-shaped magnetic iron-based alloy particles produced therefrom becomes so small that the particle diameter approaches the range revealing a superparamagnetism. As a result, the saturation magnetization and coercive force of the spindle-shaped magnetic iron-based alloy particles produced therefrom lower. If the average minor axis diameter exceeds 0.025 μm, it is difficult to obtain a high coercive force when the aspect ratio is in the range defined by the present invention.

The lower limit of the aspect ratio is 4 and the upper limit thereof is 15.

If the aspect ratio is less than 4, it is difficult to obtain a high coercive force. If the aspect ratio exceeds 15, although it is easy to obtain a high coercive force, it is difficult to obtain a large saturation magnetization.

The lower limit of the X-ray crystallite size ratio ($D_{020}/D_{110}$) is 1.5 and the upper limit thereof is 3.5.

If the ratio is less than 1.5, the effect on an increase in the coercive force of the spindle-shaped magnetic iron-based alloy particles is insufficient. If it exceeds 3.5, the minor axis diameter lowers, so that it is difficult to obtain spindle-shaped magnetic iron-based alloy particles having a high coercive force.

The lower limit of the cobalt content in the spindle-shaped goethite particles of the present invention is 1.0 atm % and the upper limit thereof is 50.0 atm % (calculated as Co) based on the total Fe in the spindle-shaped goethite particles.

Spindle-shaped goethite particles having an X-ray crystallite size $D_{020}$ of 140 to 300 Å are preferable. The X-ray crystallite size $D_{020}$ may be less than 140 Å, it may become difficult to obtain magnetic iron-based alloy particles having a high coercive force. The X-ray crystallite size $D_{020}$ may be more than 300 Å, the minor axis diameter may become so large that the aspect ratio lowers and it may become difficult to obtain spindle-shaped magnetic iron-based alloy particles having a high coercive force.

In addition, spindle-shaped goethite particles having an X-ray crystallite size $D_{110}$ of 70 to 200 Å are preferable. The X-ray crystallite size $D_{110}$ may be less than 70 Å, it may become difficult to obtain spindle-shaped magnetic iron-based alloy particles having a high coercive force. The X-ray crystallite size $D_{110}$ may be more than 200 Å, the minor axis diameter becomes so large that the aspect ratio lowers and it may become difficult to obtain spindle-shaped magnetic iron-based alloy particles having a high coercive force.

The spindle-shaped goethite particles of the present invention preferably contain a compound of at least one element selected from the group consisting of Al, Si, Nd, Y, La, Ce, Pr, Tb, Ca, Mg, Ba and Sr. The content of the compound thereof is preferably not more than 25.0 atm % (calculated as the element) based on the total Fe in the spindle-shaped goethite particles.

The spindle-shaped goethite particles containing cobalt of tenth aspect of the present invention will now be described.

The lower limit of the average major axis diameter of the spindle-shaped goethite particles of the present invention is 0.05 µm and the preferable upper limit thereof is 0.15 µm, more preferably 0.12 µm.

If the average major axis diameter is less than 0.05 µm, the major axis diameter is so small that the particle diameter of the spindle-shaped magnetic iron-based alloy particles produced therefrom becomes small and approaches the range revealing a superparamagnetism. As a result, the saturation magnetization and coercive force of the spindle-shaped magnetic iron-based alloy particles produced therefrom lower. When the average major axis diameter is more than 0.15 µm, it is easy to obtain a large saturation magnetization, but it may be difficult to easily obtain a high coercive force when the aspect ratio is in the range defined by the present invention.

The size distribution (standard deviation/major axis diameter) of the spindle-shaped goethite particles of the present invention is not more than 0.30, preferably 0.27, more preferably 0.25. If the size distribution exceeds 0.30, the dispersibility of the spindle-shaped magnetic iron-based alloy particles produced therefrom is deteriorated.

The lower limit of the average minor axis diameter of the spindle-shaped goethite particles of the present invention is 0.010 µm, and the upper limit thereof is 0.025 µm, preferably 0.020 µm.

If the average minor axis diameter is less than 0.010 µm, the minor axis diameter of the spindle-shaped magnetic iron-based alloy particles produced therefrom becomes so small that the particle diameter approaches the range revealing a superparamagnetism. As a result, the saturation magnetization and coercive force of the spindle-shaped magnetic iron-based alloy particles produced therefrom lower. If the average minor axis diameter exceeds 0.025 µm, it is difficult to obtain a high coercive force when the aspect ratio is in the range defined by the present invention.

The lower limit of the aspect ratio is 4, preferably 5, and the preferable upper limit thereof is 8.

If the aspect ratio is less than 4, it is difficult to obtain a high coercive force. When the aspect ratio thereof is more than 8, it is easy to obtain a high coercive force, but it may be easily difficult to obtain a large saturation magnetization.

The preferable lower limit of the X-ray crystallite size ratio ($D_{020}/D_{110}$) is 2.0, more preferably 2.1 and the upper limit thereof is 3.5, preferably 3.1, more preferably 2.8.

When the X-ray crystallite size ratio is less than 2.0, it is easy to obtain the effect on an increase in the coercive force of the spindle-shaped magnetic iron-based alloy particles produced therefrom. If it exceeds 3.5, the minor axis diameter lowers, so that it is difficult to obtain spindle-shaped magnetic iron-based alloy particles having a high coercive force.

The preferable lower limit of the cobalt content in the spindle-shaped goethite particles of the present invention is 8.0 atm % and the upper limit thereof is 50.0 atm %, preferably 43.0 atm %, more preferably 36.0 atm % (calculated as Co) based on the total Fe in the spindle-shaped goethite particles.

Spindle-shaped goethite particles having an X-ray crystallite size $D_{020}$ of 160 to 300 Å are preferred. If the X-ray crystallite size $D_{020}$ is less than 160 Å, it may be difficult to obtain magnetic iron-based alloy particles having a high coercive force. If it exceeds 300 Å, the minor axis diameter becomes so large that the aspect ratio lowers and it may become difficult to obtain spindle-shaped magnetic iron-based alloy particles having a high coercive force. The more preferable range of the X-ray crystallite size $D_{020}$ is 180 to 280 Å.

In addition, spindle-shaped goethite particles having an X-ray crystallite size $D_{110}$ of 70 to 200 Å are preferable. If the X-ray crystallite size $D_{110}$ is less than 70 Å, it may become difficult to obtain spindle-shaped magnetic iron-based alloy particles having a high coercive force. If it exceeds 200 Å, the minor axis diameter becomes so large that the aspect ratio lowers and it may become difficult to obtain spindle-shaped magnetic iron-based alloy particles having a high coercive force. The more preferable range of the X-ray crystallite size ($D_{110}$) is 80 to 150 Å.

The spindle-shaped goethite particles of the present invention preferably contain a compound of at least one element selected from the group consisting of Al, Si, Nd, Y, La, Ce, Pr and Tb. The content of the compound thereof is preferably not more than 10.0 atm % (calculated as the element) based on the total Fe in the spindle-shaped goethite particles.

A process for producing the spindle-shaped goethite particles for the spindle-shaped magnetic iron-based alloy particles according to the present invention will now be described.

As an aqueous ferrous salt solution used in the present invention, for example, an aqueous ferrous sulfate solution, an aqueous ferrous chloride solution and the like may be cited.

As an aqueous alkali carbonate solution used in the present invention, an aqueous sodium carbonate solution, an aqueous potassium carbonate solution, an aqueous ammonium carbonate solution and the like are usable.

As an aqueous alkali hydroxide solution used in the present invention, an aqueous sodium hydroxide solution, a potassium hydroxide solution and the like are usable.

In the present invention, both an aqueous alkali hydroxide solution and an aqueous alkali carbonate solution are used. If an aqueous alkali carbonate solution is used singly, it is difficult to obtain goethite particles having a large aspect ratio and it is difficult to obtain spindle-shaped magnetic iron-based alloy particles having a high coercive force (Hc). If an aqueous alkali hydroxide solution is used singly, it is difficult to obtain goethite fine particles having a uniform particle size and, in addition, since dendrites are sometimes mixed with the goethite particles, it is difficult to obtain fine spindle-shaped magnetic iron-based alloy particles having a uniform particle size.

The molar ratio (alkali hydroxide/alkali carbonate) is 0.2 to 1.2. If it is less than 0.2, it is difficult to obtain spindle-shaped magnetic iron-based alloy particles having a large coercive force (Hc) as in the case of singly using an aqueous alkali carbonate solution. On the other hand, if it exceeds 1.2, it is difficult to obtain goethite fine particles having a uniform size and dendrites are sometimes mixed with the goethite particles as in the case of singly using an aqueous alkali hydroxide solution. In addition, granular particles are sometimes mixed with the goethite particles. The preferred range of the molar ratio (alkali hydroxide/alkali carbonate) is 0.3 to 1.0.

The equi-molar ratio [(1/2×alkali hydroxide+alkali carbonate)/iron] is 1.3 to 2.5. If it is less than 1.3, granular particles are sometimes existent in the spindle-shaped goethite particles. If it exceeds 2.5, it is difficult to obtain fine goethite particles having a uniform particle size. The preferable lower limit of the equi-molar ratio [(1/2×alkali hydroxide+alkali carbonate)/iron] is 1.4 and the preferable upper limit is 2.4, more preferably 1.8 equivalents.

The pH of the reaction liquid is in the range of 7.0 to 11.0 as in the production reaction of ordinary iron carbonate-based goethite particles. The more preferable pH is 8.0 to 10.0.

The aqueous alkali hydroxide solution is added to either the aqueous alkali carbonate solution or a suspension containing an Fe-containing precipitate before aging. It is preferred to add the aqueous alkali hydroxide solution to the aqueous alkali carbonate solution.

The suspension in the present invention is aged in a nonoxidizing atmosphere by stirring the suspension for 2.0 to 7.0 hours. If the aging time is less than 2.0 hours, it is difficult to obtain fine goethite particles. Even if the aging time exceeds 7.0 hours, it is easy to obtain the target goethite particles, but it is meaningless to prolong the aging time more than necessary. The preferable aging time is in the range of 3 to 5 hours.

The aging temperature is 40 to 60° C. If it is lower than 40° C., although the particle size of the goethite particles becomes small, it is difficult to obtain goethite particles having a suitable aspect ratio. If it exceeds 60° C., it is difficult to obtain goethite particles having a small particle size. The preferable aging temperature is in the range of 45 to 55° C.

The nonoxidizing atmosphere is obtained by introducing an inert gas (such as $N_2$ gas) into the reaction vessel containing the suspension.

A compound of at least one element selected from the group consisting of Si, Nd, Y, La, Ce, Pr and Tb is added to the aqueous ferrous salt solution, the aqueous alkali carbonate solution, the aqueous alkali hydroxide solution or the suspension containing an Fe-containing precipitate before aging. The compound is added at the above-described stage upon due consideration of the particle shape and the growth of crystalline faces. More specifically, the compound is added at this stage in order to produce goethite particles having an aspect ratio of 4 to 15 and an X-ray crystallite size ratio ($D_{020}/D_{110}$) of 1.5 to 3.5, preferably 2.0 to 3.5.

Examples of the Si compound are sodium silicate, potassium silicate, and water glass such as #3 water glass.

As a compound of Nd, Y, La, Ce, Pr and Tb, a water-soluble salt such as a sulfate, a chloride and a nitrate of each element is usable.

The amount of added compound of at least one element selected from the group consisting of Si, Nd, Y, La, Ce, Pr and Tb is 0.1 to 1.0 atm % (calculated as the element) based on the total Fe in the aqueous ferrous salt solution. If it is less than 0.1 atm %, it is difficult to obtain a high coercive force and a large saturation magnetization which are intended by the present invention. If it exceeds 1.0 atm %, the aspect ratio becomes smaller than the intended aspect ratio, so that it is difficult to obtain spindle-shaped magnetic iron-based alloy particles having a high coercive force.

The amount of Si compound added is preferably in the range of 0.1 to 0.5 atm %, more preferably 0.1 to 0.3 atm %. The amount of added compound of at least one element selected from the group consisting of Nd, Y, La, Ce, Pr and Tb is preferably in the range of 0.1 to 0.5 atm % (calculated as the element) based on the total Fe in the aqueous ferrous salt solution.

It is preferable to add each compound in the form of an aqueous solution because it is possible to quickly disperse the aqueous solution of the compound in the corresponding solution under stirring.

As examples of the Co compound used in the present invention, cobalt sulfate, cobalt acetate, cobalt chloride and cobalt nitrate may be cited.

The amount of Co compound is 1.0 to 50.0 atm % (calculated as Co) based on the total Fe in the aqueous ferrous salt solution. If it is less than 1.0 atm %, it is difficult to make the particles finer, so that it is difficult to obtain spindle-shaped magnetic iron-based alloy particles having a high coercive force, a large saturation magnetization and an excellent stability against oxidation. On the other hand, if it exceeds 50.0 atm %, it results in a reduction of the saturation magnetization. The amount of the Co compound is (1) not less than 1.0 atm % and less than 8.0 atm %, preferably not less than 1.5 atm % and less than 8.0 atm %, more preferably not less than 2.0 atm % and less than 8.0 atm % (calculated as Co) based on the total Fe in the aqueous ferrous salt solution, and (2) 8.0 to 50.0 atm %, preferably 8.0 to 43.0 atm %, more preferably 8.0 to 36.0 atm % (calculated as Co) based on the total Fe in the aqueous ferrous salt solution.

The Co compound is added to the aqueous ferrous salt solution, the suspension containing an Fe-containing precipitate before aging or the suspension in process of aging. If the Co compound is added after the start of the oxidation, it is difficult to obtain fine goethite particles. In the case (1), the preferable time at which the Co compound is added is between 15 minute before the oxidation and just before the oxidation. In the case (2), the preferable time at which the Co compound is added is from immediately after aging to 120 minutes thereafter.

It is preferable to add the Co compound in the form of an aqueous solution because it is possible to quickly disperse the aqueous solution of the Co compound in the corresponding solution under stirring.

The oxidation temperature for producing the goethite particles is 40 to 60° C. If it is lower than 40° C., although fine goethite particles are obtained, the aspect ratio thereof becomes smaller than the intended aspect ratio. If it exceeds 60° C., although the intended fine goethite particles are obtained, granular particles are sometimes contained in the spindle-shaped goethite particles. The preferable temperature range is 45 to 55° C.

The following compound is added to the reaction liquid which is in process of oxidation by the following method.

(i) In the production condition of goethite particles containing cobalt wherein the Co content is 8.0 to 50.0 atm % (calculated as Co) based on the total Fe therein, a compound of at least one element selected from the group consisting of Al, Si, Nd, Y, La, Ce, Pr and Tb is added to the reaction liquid which is in process of oxidation process. The compound is added to the reaction liquid in process of oxidation when the oxidation fraction (ferric/total iron) is 20 to 50%. If the compound is added when the oxidation fraction (ferric/total iron) is less than 20%, the aspect ratio becomes smaller than the intended aspect ratio, so that it is difficult to obtain spindle-shaped magnetic iron-based alloy particles having a high coercive force. If the compound is added when the oxidation fraction (ferric/total iron) is more than 50%, it may be difficult to obtain the intended spindle-shaped magnetic iron-based alloy particles which satisfy a high coercive force and a large saturation magnetization. It is preferable to add the compound when the oxidation fraction (ferric/total iron) is in the range of 30 to 50%.

The amount of added compound of at least one element selected from the group consisting of Al, Si, Nd, Y, La, Ce, Pr and Tb, is 0.1 to 10.0 atm % (calculated as the element) based on the total Fe in the aqueous ferrous salt solution. If it is less than 0.1 atm %, it is difficult to obtain the sintering preventive effect in the reduction. If it exceeds 10.0 atm %, the aspect ratio becomes smaller than the intended one, so that it is difficult to obtain spindle-shaped magnetic iron-based alloy particles having a high coercive force. In addition, if the amount of compound which does not contribute to magnetization increases, the saturation magnetization lowers. The preferable range of the compound added is 0.5 to 6.0 atm % (calculated as the element) based on the total Fe in the aqueous ferrous salt solution.

The amount of Al compound added is preferably 0.1 to 3.0 atm % (calculated as Al) based on the total Fe in the aqueous ferrous salt solution, and the amount of Si compound added is preferably 0.5 to 2.0 atm % (calculated as Si) based on the total Fe in the aqueous ferrous salt solution. The amount of each added compound of at least one element selected from the group consisting of Nd, Y, La, Ce, Pr and Tb is preferably in the range of 1.0 to 2.0 atm % (calculated as the element) based on the total Fe in the aqueous ferrous salt solution.

When a combination of these compounds is added, the total amount of combined compounds is 0.1 to 10.0 atm % (calculated as the total amount of the elements added) based on the Fe in the aqueous ferrous salt solution. If the amount is less than 0.1 atm %, it is difficult to obtain the sintering preventive effect in the reduction, so that the stability against oxidation and an improvement of the coercive force may be insufficient when spindle-shaped magnetic iron-based alloy particles are produced therefrom. If it exceeds 10.0 atm %, the aspect ratio becomes smaller than the intended aspect ratio, so that it is difficult to obtain spindle-shaped magnetic iron-based alloy particles having a high coercive force. In addition, if the amount of compound which does not contribute to magnetization increases, the saturation magnetization lowers. The reducing time is sometimes prolonged. The preferable range of combined compounds added is in the range of 0.5 to 6.0 atm % (calculated as the element) based on the total Fe in the aqueous ferrous sulfate solution.

(ii) In the production condition of goethite particles containing cobalt wherein the Co content is not less than 1.0 atm % and less than 8.0 atm % (calculated as Co) based on the total Fe therein, either an aqueous solution of a compound of at least one element selected from the group consisting of Al, Si, Ca, Mg, Ba, Sr, Nd, Y, La, Ce, Pr and Tb, or an aqueous solution of Al compound and a compound of at least one element selected from the group consisting of Si, Ca, Mg, Ba, Sr, Nd, Y, La, Ce, Pr and Tb is added to the reaction liquid which is in process of oxidation when the oxidation fraction (ferric/total iron) is 50 to 90%. The amount of aqueous solution added is so controlled that the total amount of the elements of the compound is 0.1 to 5.0 atm % (calculated as the element) based on the total Fe in the aqueous ferrous salt solution.

If the compound is added when the oxidation fraction (ferric/total iron) exceeds 90%, since the production of the goethite particles is nearly finished, the element added is sometimes not dissolved on the surfaces of the goethite particles in the form of solid solution, and granular particles are sometimes contained in the goethite particles. It is preferable to add the compound when the oxidation fraction (ferric/total iron) is in the range of 70 to 85%.

If the total amount of compound added is less than 0.1 atm % (calculated as the total amount of the elements), the sintering preventive effect may be not sufficient and an improvement of the stability against oxidation and the coercive force may be insufficient in the spindle-shaped magnetic iron-based alloy particles produced therefrom As the Al compound used in the present invention, aluminum sulfate, aluminum chloride, aluminum nitrate, sodium aluminate, potassium aluminate, ammonium aluminate, etc. are usable produced.

As the aqueous solution of a compound of at least one element selected from the group consisting of Ca, Mg, Ba and Sr used in the present invention, an aqueous solution of a water-soluble salt such as a sulfate, a chloride and a nitrate of each element is usable.

It is preferable to dissolve the Al compound on the surfaces of the goethite particles in the form of solid solution. This is because not only are the spindle-shaped magnetic iron-based alloy particles produced therefrom excellent in the shape retaining property and the stability against oxidation but also a magnetic recording medium produced therefrom is compatible with a binder resin and excellent in the dispersibility and the durability. It is therefore favorable to use a combination of an Al compound and the above-described compound other than the Al compound.

When an Si compound is used, it produces an excellent sintering preventive effect. When a compound of a rare earth element such as Nd, Y, La, Ce, Pr and Tb is used, not only does it produce a sintering preventive effect but also it can improve the dispersibility because since it is a basic material. It is compatible with a binder resin having an acidic functional group such as —COOM and —SO$_3$M (wherein M represents a metal element) which is used for a magnetic recording medium.

In this way, it is preferable to select an appropriate combination of each compound added, the amount of compound added and the oxidation fraction (ferric/total iron) in the oxidization in accordance with the aim.

It is preferable to add each compound in the form of an aqueous solution because it is possible to quickly disperse the aqueous solution of the compound in the corresponding solution under stirring.

The oxidation for producing the goethite particles is carried out by introducing an oxygen-containing gas (e.g., air) into the suspension or by mechanically stirring the suspension.

The target goethite particles are obtained by filtering the spindle-shaped goethite particles produced in accordance with the present invention, washing the particles with water, and drying them by an ordinary method.

A process for producing the spindle-shaped magnetic iron-based alloy particles by using the spindle-shaped goethite particles of the present invention as a starting material will now be described.

As a starting material, it is also possible to use spindle-shaped hematite particles obtained by heat-dehydrating spindle-shaped goethite particles, if necessary. Heat-dehydration may be carried out by an ordinary method, and the heating temperature for dehydration is 250 to 500° C.

It is also preferable to produce a cake by adding 0.1 to 5.0 wt % of water- or hot water-soluble semisynthetic starch or semisynthetic cellulose such as soluble starches, cationic starches, starches substituted by a hydrophilic group (e.g., carboxymethyl, diadlehyde), viscose and celluloses substituted by a hydrophilic group (e.g., methyl, ethyl, hydroxyl ether, carboxyl), based on spindle-shaped goethite particles or spindle-shaped hematite particles, to an aqueous suspension of the spindle-shaped goethite particles or the spindle-shaped hematite particles, stirring the mixture, and compressing and dehydrating the mixture, and to use such a cake as a starting material for the spindle-shaped magnetic iron-based alloy particles of the present invention after granulating and molding the cake. The cake is preferable because it is easy to deal with in the heat-treating process in a nonreducing gas atmosphere and in the heat-treatment in a reducing gas.

It is preferable to coat the spindle-shaped goethite particles or the spindle-shaped hematite particles with a compound containing at least one element selected from the group consisting of Ni, Al, Si, P, Co, Ca, Mg, Ba, Sr, Bi, B, Zn, Nd, Y, La, Ce, Pr and Tb by an ordinary method in order to improve the magnetic characteristics of the spindle-shaped magnetic iron-based alloy particles produced, to keep the particle shape and to prevent sintering between particles. Since these compounds have not only a sintering preventive effect but also a function of controlling the reducing speed, it is preferable to use them in the form of a combination, as occasion demands.

The amount of the compound containing at least one element selected from the group consisting of Ni, Al, Si, P, Co, Ca, Mg, Ba, Sr, Bi, B, Zn, Nd, Y, La, Ce, Pr and Tb for coating is preferably not more than 25.0 atm %, more preferably 10.0 to 23.0 atm % (calculated as the element) based on the total Fe in the spindle-shaped magnetic iron-based alloy particles.

When the particles are further coated with a Co compound in order to improve the magnetic characteristics, it is preferable that the sum of the content of the Co compound which is added in the production reaction for the spindle-shaped goethite particles and the Co compound added for the improvement of the magnetic characteristics is not more than 50.0 atm % (calculated as Co) based on the total Fe in the spindle-shaped magnetic iron-based alloy particles obtained. Also, it is preferable that the percentage of the coating amount of Co is not more than 50 wt % based on the total Co content in the spindle-shaped magnetic iron-based alloy particles. If the coating amount of Co exceeds 50 wt %, since a large amount of Co exists on the surfaces of the spindle-shaped magnetic iron-based alloy particles, solid solution in the particles is difficult in the heat-treatment, so that it is difficult to obtain a large saturation magnetization. The coating amount of Co is preferably not more than 30 wt %.

Although it is possible to obtain the intended spindle-shaped magnetic iron-based alloy particles by reducing the particles coated with a metal compound, in order to control the magnetic characteristics and the shape of the particles, it is preferable to heat-treat the starting material in a nonreducing gas atmosphere prior to the reduction.

In the heat-treatment process in a non-reducing gas, the particles may be annealed in a temperature range of 300 to 800° C. in a stream of air, oxygen gas or nitrogen gas. It is preferable to appropriately select the heating temperature in accordance with the kind of the metal compound used for coating the particles. If it exceeds 800° C., the particle shape is deformed and sintering between particles is caused.

The temperature for heat-treating in a reducing gas is 300 to 550° C. If it is lower than 300° C., the progress of the reduction is so slow that it takes a long time. On the other hand, if it exceeds 550° C., the reduction rapidly progresses, thereby deforming the particle shape and causing sintering between particles.

The spindle-shaped magnetic iron-based alloy particles according to the present invention after the heat-treatment can be taken out into air by a known method, for example, by immersing the spindle-shaped magnetic iron-based alloy particles in an organic solvent such as toluene (Japanese Patent Application Laid-open (KOKAI) No. 1-18961) or by temporarily replacing the Atmosphere of the spindle-shaped magnetic iron-based alloy particles after the reduction by an inert gas and then gradually oxidizing the inert gas by gradually increasing the oxygen content in the inert gas until it becomes air (European Patent 0466338A1).

The magnetic recording medium according to the present invention can be obtained by applying a coating composition containing a binder resin and the magnetic particles of the present invention on a substrate by a conventional method to form a magnetic recording layer on the substrate. The amount of the magnetic iron-based alloy particles in the magnetic recording layer is 60 to 90 wt %, preferably 65 to 85 wt %. The amount of binder in the magnetic recording layer is 10 to 40 wt %, preferably 15 to 35 wt % and the amount of the additives therein is not more than 30 wt %.

The coating composition may contain the usually used additives such as lubricant, abrasive material antistatic agent, etc.

As the binder resin in the present invention, there can be used vinyl chloride-vinyl acetate copolymer, vinyl chloride-vinyl acetate-maleic acid urethane elastomer, butadiene-acrylonitrile copolymer, polyvinyl butyral, cellulose derivatives such as nitrocellulose, polyester, synthetic rubber resins such as polybutadiene, epoxy resins, polyamide, isocyanate polymers, electron-ray curing-type acrylic urethane resins, etc., and mixtures thereof, which are commonly used in manufacture of magnetic recording media.

As the substrate, there can be used the films of synthetic resins such as polyethylene terephthalates, polyethylenes, polypropylenes, plycarbonates, polyethylene naphthalates, polyamides, polyamide-imides, polyimides, polysulfones etc., foils or plates of metals such as aluminum, stainless steel, etc., and various papers, which are generally employed in manufacture of magnetic recording media.

The thickness of the magnetic recording layer of the present invention is 1 to 5 μm. The thickness of the magnetic recording medium of the present invention is less than 18 μm.

The magnetic recording medium according to the present invention has a high coercive force, a low light transmittance and an excellent magnetic and chemical stability against oxidation owing to high coercive force, black color and excellent magnetic and chemical stability against oxidation.

The operation of the present invention will now be explained with reference to the prior art and the finding by the present inventors.

The spindle-shaped magnetic iron-based alloy particles containing cobalt and iron as main ingredients are obtained by heat-treating, if necessary, the goethite particles, hematite particles obtained by heat-dehydrating the goethite particles or the particles containing a metal other than iron as a starting material, and heat-treating such particles in a reducing gas.

There are known a method of producing iron hydroxide-based goethite particles and a method of producing iron carbonate-based goethite particles as a method of producing the goethite particles. Iron hydroxide-based goethite particles are acicular goethite particles having a large aspect ratio but they contain dendrites and the particle size thereof cannot be said to be uniform. On the other hand, iron carbonate-based goethite particles are spindle-shaped goethite particles which have a uniform particle size and no inclusion of dendrites, but it is difficult to produce goethite particles having a large aspect ratio.

In order to produce spindle-shaped magnetic iron-based alloy particles having a high coercive force, since the coercive force of magnetic particles are generally dependent upon the shape anisotropy as described above, it is necessary to make the particles as fine as possible or increase the aspect ratio of the particles.

When iron hydroxide-based goethite particles are used as the starting material, acicular magnetic iron-based alloy particles which have a coercive force as high as more than 1700 Oe are produced by utilizing the large aspect ratio of the iron hydroxide-based goethite particles, but when iron carbonate-based goethite particles are used as the starting material, it is difficult to obtain spindle-shaped magnetic iron-based alloy particles having a coercive force higher than 1700 Oe.

The present inventors made an attempt to produce spindle-shaped fine magnetic iron-based alloy particles containing cobalt and iron as main ingredients which have a uniform particle size, no inclusion of dendrites, and a high coercive force, especially, a coercive force (Hc) of 1720 to 2500 Oe, by using iron carbonate-based goethite particles which facilitate the production of fine particles having a uniform particle size as a starting material.

The present inventors considered a method of dissolving elements which are effective in making the iron carbonate-based goethite particles fine and elements which contribute to an increase in the aspect ratio in the particles, in the form of solid solution when iron carbonate-based goethite particles are produced, and a method of adding an element such as Co, Zn and Ni in the reaction process for producing the iron carbonate-based goethite particles.

However, no fine spindle-shaped magnetic iron-based alloy particles which have a high coercive force has been produced from iron carbonate-based goethite particles as the starting material by any of the above-described prior art. On the other hand, according to a method of using both an alkali carbonate and an alkali hydroxide, spindle-shaped magnetic iron-based alloy particles which have a high coercive force are obtained, as described in Japanese Patent Application Laid-Open (KOKAI) No. 4-63210 (1992). When a Zn compound is existent in a suspension containing an Fe-containing precipitate, it is possible to produce spindle-shaped goethite particles having an aspect ratio of not less than 15, so that it is possible to produce spindle-shaped magnetic iron-based alloy particles which have a large coercive force Hc. In this case, however, the major axis diameter also inconveniently becomes as large as 0.23 to 0.33 $\mu$m.

Accordingly, the present inventors undertook studies so as to produce spindle-shaped magnetic iron-based alloy particles having balanced characteristics, especially spindle-shaped magnetic iron-based alloy particles which have a uniform particle size, especially a size distribution (standard deviation/major axis diameter) of not more than 0.25, no inclusion of dendrites, an average major axis diameter of 0.05 to 0.18 $\mu$m, a coercive force Hc of 1720 to 2500 Oe, a saturation magnetization of not less than 110 emu/g and a saturation magnetization decrement percentage of not more than 17%, from mixed alkalis-based goethite particles as the starting material.

As a result of the investigation of the reaction by using both an aqueous alkali carbonate solution and an aqueous alkali hydroxide solution, it was confirmed that when an Ni compound was existent in an Fe-containing precipitate in place of a Zn compound, the spindle-shaped fine goethite particles had a small aspect ratio, as shown in later-described Comparative Example 33, and that when the goethite particles were produced into spindle-shaped magnetic iron-based alloy particles, the coercive force (Hc) thereof was as low as 1427 Oe, as shown in later described Comparative Example 51.

It was found from investigation that when a Co compound was existent in a suspension containing an Fe-containing precipitate, spindle-shaped fine goethite particles had a comparatively large aspect ratio, and that when from the goethite particles as a starting material were produced spindle-shaped magnetic iron-based alloy particles containing cobalt and iron as main ingredients, the coercive force (Hc) thereof was as high as more than 1720 Oe.

When the spindle-shaped goethite particles obtained were observed in detail through an electron microscope, it was confirmed that the spindle-shaped goethite particles having Co in the form of solid solution were fine particles, and that since the minor axis diameter thereof was small, the aspect ratio thereof was appropriately large, as compared with the goethite produced by using alkali carbonate. It was also confirmed that the X-ray particle size measured by X-ray diffraction was small as compared with the goethite produced by using alkali carbonate. For this reason, it is considered, the coercive force (Hc) of the spindle-shaped magnetic iron-based alloy particles containing cobalt and iron as main ingredients which were obtained by reducing the goethite particles, became as high as more than 1720 Oe.

More specifically, the existence of the aqueous alkali carbonate solution and the Co compound suppresses the growth of the particles in the minor axis direction to produce fine particle, and the existence of the aqueous alkali hydroxide solution contributed to the growth of the particles in the major axis direction to led to a larger aspect ratio. As a result, spindle-shaped fine goethite particles having a uniform particle size and having an appropriately large aspect ratio were obtained. Therefore, the spindle-shaped magnetic iron-based alloy particles containing cobalt and iron as main ingredients obtained by reducing the goethite particles had a coercive force (Hc) as high as more than 1720 Oe. This is considered due to a synergistic effect of the use of both an aqueous alkali carbonate solution and an aqueous alkali hydroxide solution, and the addition of a Co compound.

The finer spindle-shaped magnetic iron-based alloy particles are, the more apt they are to be oxidized in air, so that it is necessary to prevent the magnetic characteristics such as the coercive force (Hc) and the saturation magnetization from lowering due to oxidation.

There are several methods of using a compound such as Al as a method of improving the stability against oxidation. When Al is dissolved in the form of solid solution, as described in, for example, Japanese Patent Application Laid-Open (KOKAI) No. 57-73105 (1982), the coercive force of the spindle-shaped magnetic iron-based alloy particles obtained is lowered. Although there is a method of coating the surfaces of the particles with Al, as described in, for example, Japanese Patent Application Laid-Open (KOKAI) Nos. 63-103424 (1988), 63-171419 (1988) and 5-73898 (1993), it is difficult to uniformly coat the surfaces of the particles with Al and the stability against oxidation cannot be said to be sufficient. In addition, if a large amount of Al is used in order to adequately coat the surfaces of the particles, the magnetic characteristics such as the coercive force (Hc) are lowered.

The present inventors considered that it would be possible to coat the particle surfaces more uniformly and to improve the shape retaining property if the solid solution was formed only on the surfaces of the particles.

Such method is disclosed in Japanese Patent Application Laid-Open (KOKAI) No. 5-98321 (1993). The present inventors wondered why it is necessary to provide a non-reducing atmosphere in process of oxidation, and why it is necessary to age at a temperature higher than the oxidation temperature.

Also, the present inventors investigated as to the description in Japanese Patent Publication (KOKOKU) No. 1-18961 (1989), " . . . The coercive force increases with an increase in the aspect ratio. On the other hand, the coercive force is influenced by the particle size, and in particles having a particle size larger than the particle size which reveals the superparamagnetism, the coercive force increases in proportion to a reduction in the particle size. It is, therefore, possible to obtain an intended coercive force by appropriately selecting the particle size and the aspect ratio. . . . "

As a result of studies so as to improve spindle-shaped goethite particles, as a starting material for spindle-shaped magnetic iron-based alloy particles of the present invention, the spindle-shaped goethite particles obtained having an average major axis diameter of 0.05 to 0.15 $\mu$m, an average minor axis diameter of 0.010 to 0.025 $\mu$m, an aspect ratio of 4 to 8 and an X-ray crystallite size ratio ($D_{020}/D_{110}$) of 2.0 to 3.5.

It has not been clear the reason why the spindle-shaped magnetic iron-based alloy particles which are fine particles, especially an average major axis diameter of 0.05 to 0.12 $\mu$m, have a larger coercive force (Hc), especially 1850 to 2500 Oe and a larger saturation magnetization, especially not less than 130 emu/g, the present inventors have considered that the spindle-shaped goethite particles having an aspect ratio of 4 to 8 are not greatly different from conventional spindle-shaped goethite particles, but in conventional spindle-shaped goethite particles having an aspect ratio of 4 to 8, X-ray crystallite size ratio ($D_{020}/D_{110}$) is 1.5 to 1.9, and it is difficult to produce spindle-shaped magnetic iron-based alloy particles having a higher coercive force. In contrast, in the spindle-shaped goethite particles of the eighth aspect of the present invention, even if the average major axis diameter is 0.05 to 0.15 and the aspect ratio is 4 to 8, X-ray crystallite size ratio ($D_{020}/D_{110}$) is as large as 2.0 to 3.5. At this point, the spindle-shaped goethite particles are greatly different from conventional goethite particles.

The difference in X-ray crystallite size ratio ($D_{020}/D_{110}$) is produced by difference in the degree of growth of the crystalline faces. It was found that a compound of at least one element selected from the group consisting of Si, Nd, Y, La, Ce, Pr and Tb which was added to the aqueous ferrous salt solution, the aqueous alkali carbonate solution, the aqueous alkali hydroxide solution or the suspension containing an Fe-containing precipitate before aging, has an influenced upon the degree of growth of the crystalline faces.

It is considered that the function of increasing the aspect ratio due to the use of both the alkali carbonate and the alkali hydroxide, and the function of suppressing an increase in the aspect ratio due to the addition of the compound of at least one element selected from the group consisting of Si, Nd, Y, La, Ce, Pr and Tb, are checked by each other and influence the degree of growth of the crystalline faces. The addition of the Co compound makes the particles finer, and the long-time aging produces the seed crystals.

Further, the addition of a compound of at least one element selected from the group consisting of Al, Si, Nd, Y, La, Ce, Pr and Tb to a reaction liquid in process of oxidation, for example, the oxidation fraction (ferric/total iron) of 20 to 50%, promotes the growth of the seed crystals in the major axis direction in comparison with the growth in the minor axis direction. Consequently, it is considered that spindle-shaped goethite particles in the eighth aspect of the present invention which have an aspect ratio of 4 to 8 and X-ray crystallite size ratio ($D_{020}/D_{110}$) of 2.0 to 3.5 were obtained due to a combination of the above-described effects.

It is impossible to obtain goethite particles which satisfy the relationship between the aspect ratio and X-ray crystallite size ratio ($D_{020}/D_{110}$), and the relationship between the average major axis diameter and X-ray crystallite size ratio ($D_{020}/D_{110}$) in the present invention by using alkali hydroxide-based goethite particles or alkali carbonate-based goethite particles. In addition, when the kind of a compound added or the time at which the compound is added is changed, it is impossible to obtain the spindle-shaped goethite particles of the present invention.

When spindle-shaped magnetic iron-based alloy particles are produced from the spindle-shaped goethite particles of the present invention obtained in the above-mentioned method, since the degree of growth of the crystalline surfaces of the spindle-shaped goethite particles is different from that of conventional goethite particles and the compound of at least one element selected from the group consisting of Al, Si, Nd, Y, La, Ce, Pr and Tb is dissolved in the goethite particles produced in the form of solid solution, it is unlikely that the particle shape is destroyed by heat-treatment for reduction. This is considered to be the reason why the spindle-shaped magnetic iron-based alloy particles produced have a high coercive force in spite of a small aspect ratio such as 4 to 7.

It is also considered that since the degree of growth of the crystalline surfaces of the spindle-shaped goethite particles is different from that of conventional goethite particles and the spindle-shaped goethite particles of the present invention contain Co, uniform growth of primary particles is facilitated in the heat-treatment for producing spindle-shaped magnetic iron-based alloy particles, thereby obtaining a large saturation magnetization.

As a method of adding Co, there are a method of adding Co when the spindle-shaped goethite particles are produced, and a method of coating the spindle-shaped goethite particles obtained with Co. By the former method, it is easy to obtain a larger saturation magnetization. According to the latter method, it is considered that it is more difficult to obtain a large saturation magnetization than by the former method, probably because the Co with which the particle surfaces are coated, insufficiently dissolve or disperse in the particles in the heat-dehydration process or in the heat-treatment in a reducing gas.

In addition, although the reason is not clear, it is considered that the above-described degree of growth of the crystalline faces contributes to the production of spindle-shaped magnetic iron-based alloy particles having an excellent coercive force distribution, as shown in later-described examples.

This agrees with the results of many experiments by the present inventors. It is actually proved from later-described examples that although the spindle-shaped fine magnetic iron-based alloy particles in the second aspect of the present invention have an average major axis diameter of 0.05 to 0.12 μm and an aspect ratio of 4 to 7, the particles have a high coercive force, an excellent coercive force distribution, a large saturation magnetization and an excellent and balanced stability against oxidation.

That is, it has been found that it is not always necessary that the spindle-shaped magnetic iron-based alloy particles of the present invention have a large aspect ratio when the coercive force (Hc) is the maximum.

It has also been found that when the relationship between the average major axis diameter and the X-ray crystallite size $D_{110}$ of the spindle-shaped magnetic iron-based alloy particles in the second aspect of the present invention is in the region (A) shown in FIG. 1, the spindle-shaped magnetic iron-based alloy particles have a coercive force as high as 1850 to 2500 Oe, an excellent coercive force distribution, and a large saturation magnetization such as more than 130 emu/g are produced.

As to the relationship between the average major axis diameter and X-ray crystallite size $D_{110}$, the particles described in Example 9 of Japanese Patent Application Laid-Open (KOKAI) No. 6-25702 have a relationship in the region (C) in FIG. 1, and the particles described in Examples 6 and 7 of Japanese Patent Application Laid-Open (KOKAI) No. 6-140222 have a relationship in the region (B) in FIG. 1 which are different from the spindle-shaped magnetic iron-based alloy particles of the present invention, having a relationship in the region (A). If the relationship is in the region (B), it is difficult to obtain a high saturation magnetization. On the other hand, if the relationship is in the region (C), not only is it difficult to obtain a high saturation magnetization but also the coercive force distribution is deteriorated. It has been found that when the relationship is in the region (A), fine particles having a large coercive force, an excellent coercive force distribution, a large saturation magnetization and a balanced stability against oxidation according to the present invention are obtained, and that the dispersibility and the packing property of a magnetic recording medium produced therefrom are excellent.

The magnetic recording medium of the present invention preferably have a coercive force of 1720 to 2600 Oe, preferably 1850 to 2600, a squareness (Br/Bm) of not less than 0.850, preferably not less than 0.860, and S.F.D of not more than 0.500, preferably not more than 0.470, more preferably not more than 0.450.

Since the spindle-shaped fine magnetic iron-based alloy particles of the second of the present invention have an average major axis diameter of 0.05 to 0.12 μm, a uniform particle size, no inclusion of dendrites, an aspect ratio of 4 to 7, a coercive force as high as 1850 to 2500, an excellent coercive force distribution, a large saturation magnetization such as not less than 130 emu/g, and excellent and balanced stability against oxidation, they are suitable for use as a magnetic material for a high-density, high-sensitivity and high-output recording medium.

The spindle-shaped magnetic iron-based alloy particles of the present invention preferably have a squareness ($\sigma_r/\sigma_s$) of not less than 0.500, preferably not less than 0.505, and a stability against oxidation (saturation magnetization decrement) of not more than 17%, preferably not more than 14%.

Since the spindle-shaped magnetic iron-based alloy particles of the present invention have a good dispersibility in a vehicle in the production of a magnetic coating, it is possible to produce a magnetic recording medium having an excellent packing property.

The spindle-shaped fine goethite particles containing cobalt of the eighth aspect of the present invention have an average major axis diameter of 0.05 to 0.15 μm, an aspect ratio of 4 to 8, an X-ray crystallite size ratio ($D_{020}/D_{110}$) of 2.0 to 3.5, a uniform article size and no inclusion of dendrites.

It is therefore possible to produce spindle-shaped fine magnetic iron-based alloy particles containing cobalt and iron as the main ingredients which have a uniform particle size, no inclusion of dendrites, a high coercive force, an excellent coercive force distribution and a large saturation magnetization. They are therefore suitable for use as a starting material of a magnetic material for a high-density, high-sensitivity and high-output recording medium described above.

The spindle-shaped fine magnetic iron-based alloy particles of the present invention have a uniform particle size, no inclusion of dendrites, and a high coercive force, especially a coercive force (Hc) of 1720 to 2500 Oe. They are therefore suitable for use as magnetic particles for a high-density, high-sensitivity and high-output recording medium.

In addition, the spindle-shaped fine magnetic iron-based alloy particles of the present invention have an excellent dispersibility in a vehicle in the production of a magnetic coating. Further- more, since the X-ray crystallite size is as small as 120 to 180 Å, it is possible to lower the noise level and to produce a favorable magnetic recording medium having a large S/N ratio.

The magnetic recording medium according to the present invention has a high coercive force, a low light transmittance and an excellent magnetic and chemical stability against oxidation, so that it is suitable for use as a high-performance recording medium, especially as a high-density, high-sensitivity and high-output recording medium.

EXAMPLES

The present invention will now be explained with reference to the following examples and comparative example.

(1) The manor axis diameter, the minor axis diameter and the aspect ratio in the following examples and comparative examples are expressed by the averages of the values of 300 particles measured from electron micrographs (×200,000 magnification).

(2) The size distribution of the particles is expressed by the ratio of a standard deviation to the average major axis diameter.

The major axis diameters of 300 particles in an electron microphotograph (×200,000 magnification) were measured. The actual major axial diameters and the number of the particles were obtained from the calculation on the basis of the measured values.

The standard deviation (s) was obtained by the following equation.

$$s = \sqrt{\sum_{i=1}^{n}(x_i - \bar{x})^2 / n}$$

wherein $x_1$, $x_2$, , $x_n$ represent the determined major axis diameter of the each specimen, $\bar{x}$ represents an average major axis diameter determined of the each specimen.

(3) The specific surface area is expressed by the value measured by a BET method.

(4) The X-ray crystallite size of goethite particles are expressed by the diameters of crystals in the direction perpendicular to the crystalline faces (020) and (110) measured by X-ray diffraction. The X-ray crystallite size of spindle-shaped magnetic iron-based alloy particles is expressed by the diameter of a crystal in the direction perpendicular to the crystalline face (110) measured by X-ray diffraction. The measured values are expressed by the values calculated from the line profiles of the diffraction lines on the crystalline faces (020) and (110) by using the following Scherrer formula:

$$D \text{ (X-ray crystallite size)} = K\lambda/\beta \cos \theta$$

wherein β: the half-width of the real diffraction peak with the width of the machine subtracted therefrom K: Scherrer constant (0.9)

λ: the wavelength of X-ray

θ: diffraction angle (5) The content of each element is expressed by the value measured by "High-Frequency Plasma Emission Spectrophotometer ICAP-575" (manufactured by Japan Journal Ash Co., Ltd).

(6) The oxidation fraction is expressed by the value obtained by oxidation-reduction titration carried out by replacing the reaction liquid with an inert gas and heating and dissolving the reaction liquid by a mixture of sulfuric acid and phosphoric acid.

(7) The magnetic characteristics of spindle-shaped magnetic iron-based alloy particles and the characteristics of a coating film were measured under an external magnetic field of up to 10 kOe by "Vibration Sample Magnetometer VSM-3S-15" (manufactured by Toei Kogyo Co., Ltd).

(8) The stability aaainst oxidation is expressed by the saturation magnetization decrement percentage ($\Delta\sigma_s$) of the particles which were allowed to stand at a temperature of 60° C. and a relative humidity of 90% for one week.

Saturation magnetization decrement $(\Delta\sigma_s)(\%)$=[initial saturation magnetization $(\sigma_s)$–saturation magnetization $(\sigma_s)$ after oxidation]/[initial saturation magnetization $(\sigma_s)$]×100

(9) The squareness and the S.F.D. value of a coating film were obtained by using a sheet-like sample obtained by the method described in Example 46. The S.F.D. value was obtained by obtaining the differentiation curve of the demagnetization curve of the magnetic hysteresis curve, measuring the half-width of the curve and dividing the half-width by the coercive force at the peak value of the curve.

Production of Goethite Particles

Examples 1 to 15

Comparative Examples 1 to 6

Example 1

20 liter of an aqueous solution containing 25 mol of $Na_2CO_3$, 10 liter of an aqueous solution containing 18 mol of NaOH (molar ratio: 0.72) (equi-molar ratio: 1.70), and 0.25 atm % of water glass #3 (calculated as Si) based on the total Fe were charged in a reaction vessel which was maintained in a non-oxidizing atmosphere by introducing $N_2$ gas thereinto at a rate of 50 liter/minute. With the resultant aqueous solution was mixed 20 liter of an aqueous ferrous sulfate solution containing 20 mol of the total Fe ($Fe^{+2}$ concentration: 0.4 mol/liter) at a temperature of 47° C. to produce a suspension containing an Fe-containing precipitate.

The suspension containing an Fe-containing precipitate was held at 47° C. for 60 minutes while continuously blowing $N_2$ gas thereinto at a rate of 50 liter/minute.

Thereafter, an aqueous cobalt sulfate solution was added thereto so that the suspension contained 18 atm % of Co based on the total Fe, and the mixed suspension was aged for 4 hours.

Air was introduced into the aged suspension containing an Fe-containing precipitate at 47° C. at a rate of 90 liter/minute, and when the oxidation fraction reached 40%, 1.75 atm % of water glass #3 (calculated as Si) based on the total Fe was added, and the oxidation was further continued for 100 minutes under the same oxidation condition to produce yellowish brown precipitated particles. The pH of the suspension during the aeration was 8.0 to 9.5. The total oxidation time was 22 minutes.

The yellowish brown precipitated particles were filtered out, washed with water, dried and pulverized by an ordinary method to obtain about 2 kg of yellowish brown particles.

Figure 2:
FIG. 2 is an electron micrograph (×30000) of the particle structure of the spindle-shaped goethite particles obtained in Example 1.
Figure 3:
FIG. 3 is an electron micrograph (×30000) of the particle structure of the spindle-shaped goethite particles obtained in Example 10.
Figure 4:
FIG. 4 is an electron micrograph (×30000) of the particle structure of the spindle-shaped goethite particles obtained in Example 14.
Figure 5:
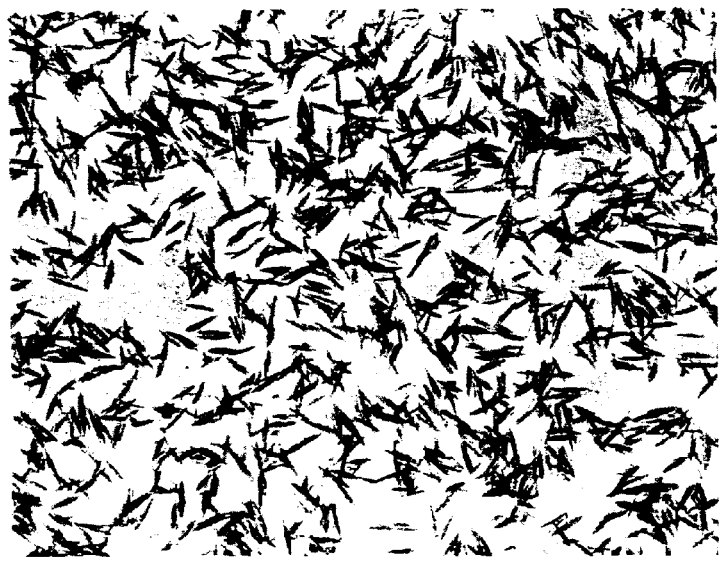
FIG. 5 is an electron micrograph (×30000) of the particle structure of the spindle-shaped goethite particles obtained in Comparative Example 1.
Figure 6:
FIG. 6 is an electron micrograph (×30000) of the particle structure of the spindle-shaped goethite particles obtained in Comparative Example 5.

The thus-obtained yellowish brown particles were proved to be goethite particles. As is obvious from the electron microphotograph (×30000) shown in FIG. 2, they were spindle-shaped particles having an average major axis diameter of 0.108 μm, a size distribution of 0.204, an average minor axis diameter of 0.016 μm, an aspect ratio of 6.8, an X-ray crystallite size ratio ($D_{020}/D_{110}$) of 2.26 with a uniform particle size and containing no dendrites. The Co content was 17.94 atm % and the Si content was 1.93 atm %.

Examples 2 to 15. Comparative Examples 1 to 7

Goethite particles were obtained in the same procedure as in Example 1 except for varying the amount of aqueous alkali carbonate solution used, the amount of aqueous alkali hydroxide solution used, the time at which the aqueous alkali hydroxide solution is added, the alkali ratio (NaOH/$Na_2CO_3$:molar ratio), the kind and the amount of a compound added before aging, if any, the time at which the a compound was added, the aging temperature and time, the amount of Co compound added, the time at which the Co compound was added, the time elapsed from the start of aging until the Co compound was added, the oxidation temperature, the kind and the amount of compound added in the oxidation process, and the oxidation fraction when the compound was added. Also, in Comparative Example 7, Ni compound was used instead of Co compound.

The main producing conditions are shown in Tables 1 to 4 and the properties of the goethite particles obtained are shown in Tables 3 and 4.

Production of Hematite Particles

Examples 16 to 30

Comparative Examples 8 to 14

Example 16

The amount of press-cake which was equivalent to 800 g of the spindle-shaped goethite particles obtained in Example 1 was suspended in 15 liter of water. The pH of the suspension was 8.5.

10 wt % of aluminum nitrate nonahydrate, 7 wt % of neodymium nitrate hexahydrate, 10 wt % of cobalt acetate tetrahydrate, each based on the goethite particles, were added to the suspension. Thereafter boric acid was added to the suspension so that the content of boric acid became 15 wt % based on the goethite particles and the mixed suspension was stirred for 10 minutes. The pH of the suspension was 4.5.

After adjusting the pH of the suspension to 9.5 by adding an aqueous ammonia solution, the suspension was filtered by a filter press, washed with water and dried to obtain the goethite particles coated with Al, Nd, Co and B compounds.

The goethite particles coated with Al, Nd, Co and B compounds were dehydrated at 400° C. in air so as to produce spindle-shaped hematite particles.

Examples 17 to 30, Comparative Examples 8 to 14

Coated hematite particles were obtained in the same procedure as in Example 16 except for varying the kind of treated particles, the kind and the amount of compound containing a coating element added, the dehydration temperature, and the annealing temperature, if the annealing process was carried out.

The main producing conditions are shown in Tables 5 and 6.

In the Example 22, aluminum nitrate nonahydrate was added to the suspension so that the content of aluminum nitrate became 4 wt % based on the goethite particles and cobalt acetate tetrahydrate was added to the suspension so that the content of cobalt acetate became 10 wt % based on the goethite particles. After adjusting the pH of the suspension to 9.0 by adding an aqueous sodium hydroxide solution, 8 wt % of #3 water glass was added to the resultant suspension, and the obtained suspension was filtered by a filter press, washed with water and dried.

Production of Spindle-shaped Magnetic Iron-based Alloy Particles

Examples 31 to 45

Comparative Examples 15 to 21

Example 31

100 g of the spindle-shaped hematite particles coated with Al, Nd, Co and B compounds obtained in Example 16 were charged in a fixed bed reducing furnace having an inner diameter of 72 mm, and $H_2$ gas was introduced into the furnace at a rate of 35 liter/minute so as to reduce the particles at 420° C. The reduction process was finished when the dew point of the exhaust gas reached −30° C. The reducing time was 370 minutes.

After the end of reduction, $H_2$ gas was replaced with $N_2$ gas, and while the $N_2$ gas was introduced into the furnace at a rate of 50 liter/min, the hematite particles were cooled to 40° C. A mixed gas of 50 liter/min of $N_2$ gas and 0.2 liter/min of air was then introduced into the furnace while the furnace temperature was maintained at 40° C. After the exothermic peak produced by the oxidation with the mixed gas was observed, the air flow rate was raised to 0.4 liter/min so as to increase the air ratio in the mixed. gas. In this way, the air mixing ratio was raised by stages by raising the air ratio in the mixed gas every time the exothermic peak produced by the oxidation was observed. Finally, the oxidation process was continued by a mixed gas of 0.6 liter/min of air and 50 liter/min of $N_2$ gas until no exothermic reaction due to oxidation was observed and the temperature of the particles became 40° C., which was approximately the same as the temperature of the furnace. During the oxidation, the temperature of the particles reached 75° C. at the maximum.

The air mixing ratio was then gradually increased while maintaining the furnace temperature at 40° C. and the flow rate of $N_2$ gas at 50 liter/min until the amount of air was 10 liter/min. No exothermic reaction was observed during this period. Thereafter, the temperature was cooled to the room temperature while aerating with the mixed gas of $N_2$ gas and air under the same condition.

After the aeration was stopped and the air was replaced with $N_2$ gas, the spindle-shaped magnetic iron-based alloy particles containing cobalt and iron as main ingredients with an oxide layer was recovered.

Figure 7:
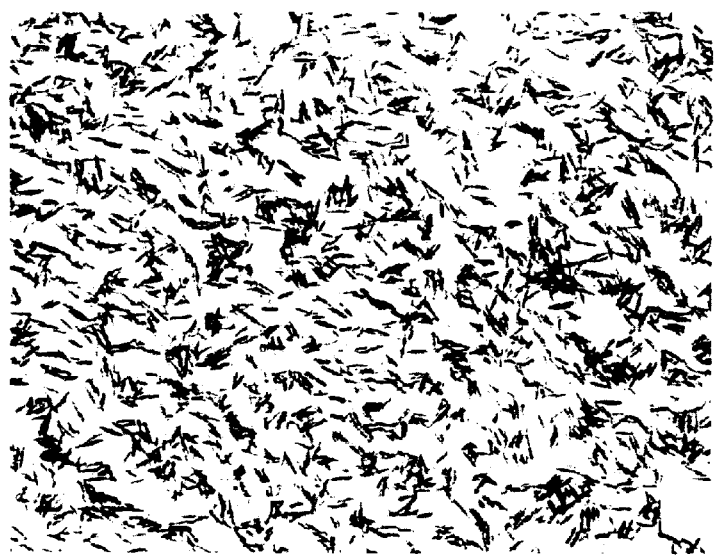
FIG. 7 is an electron micrograph (×30000) of the particle structure of the spindle-shaped magnetic iron-based alloy particles obtained in Example 31.
Figure 8:
FIG. 8 is an electron micrograph (×30000) of the particle structure of the spindle-shaped magnetic iron-based alloy particles obtained in Example 40.
Figure 9:
FIG. 9 is an electron micrograph (×30000) of the particle structure of the spindle-shaped magnetic iron-based alloy particles obtained in Example 44.
Figure 10:
FIG. 10 is an electron micrograph (×30000) of the particle structure of the spindle-shaped magnetic iron-based alloy particles obtained in Comparative Example 13.
Figure 11:
FIG. 11 is an electron micrograph (×30000) of the particle structure of the spindle-shaped magnetic iron-based alloy particles obtained in Comparative Example 17.

As is obvious from the electron microphotograph (×30000) shown in FIG. 7, the spindle-shaped magnetic iron-based alloy particles had an average major axis diameter of 0.085 µm, an average minor axis diameter of 0.013 µm, a size distribution of 0.184, an aspect ratio of 6.5, and X-ray crystallite size $D_{110}$ of 148 Å with a uniform particle size and containing no dendrites. As to the magnetic characteristics, the coercive force (Hc) was 2032 Oe, the saturation magnetization was 138 emu/g, the squareness ($\sigma_r/\sigma_s$) was 0.518, and the saturation magnetization decrement percentage was 15%. The Co content in the particle was 17.94 atm % and the amount of coating Co was 2.29 atm %, the Si content in the particles was 1.93 atm %, the amount of coating Al was 2.91 atm %, the amount of coating Nd was 1.53 atm %, and the amount of coating B was 12.8 atm %.

Examples 32 to 45, Comparative Examples 15 to 21

Spindle-shaped magnetic iron-based alloy particles containing cobalt and iron as main ingredients were obtained in the same procedure as in Example 31 except for varying the kind of the treated particles, and the reducing temperature in the heat treatment. The main producing conditions and various properties of the particles obtained are shown in Tables 7 and 8.

Production of Coating Film

Examples 46 to 66

Example 46

A kneaded material was obtained by kneading 100 parts by weight of the spindle-shaped magnetic iron-based alloy particles obtained in Example 31 and 50 parts by weight of a vinyl chloride copolymer resin (MR-110, produced by Japanese Geon Co., Ltd.) having a strong polar functional group in the form of a 30 atm % cyclohexanone solution for 50 minutes by using a 88-cc blast mill.

A magnetic coating was prepared by mixing and dispersing the kneaded material in the following ratio in a 140-cc glass bottle for 6 hours. The magnetic coating was applied to a polyethylene terephthalate film (25 µm in thickness) to a thickness of 50 µm by an applicator, and the film was then dried in a magnetic field of 8 KGauss to obtain a sheet-like sample of a coating film.

Kneaded material 100 parts by weight
Glass beads of 1 mm in diameter 530 parts by weight
Cyclohexanone 50 parts by weight
Methylethyl ketone 57 parts by weight
Toluene 57 parts by weight The coercive force (Hc) of the coating film obtained from the sheet-like sample was 2114 Oe, the squareness (Br/Bm) was 0.882, and S.F.D. was 0.391.

Examples 47 to 60, Comparative Examples 22 to 28

Coating films were produced in the same procedure as in Example 46 except for varying the kind of spindle-shaped magnetic iron-based alloy particles. Various properties of the coating films obtained are shown in Tables 9 and 10.

Production of Goethite Particles

Examples 61 to 75

Comparative Examples 29 to 38

Example 61

20 liter of an aqueous solution containing 25 mol of $Na_2CO_3$, 10 liter of an aqueous solution containing 15 mol of NaOH (molar ratio: 0.6) were charged in a reaction vessel which was maintained in a non-oxidizing atmosphere by introducing $N_2$ gas thereinto at a rate of 100 liter/minute (equi-molar ratio: 1.63). Thereafter 20 liter of an aqueous ferrous sulfate containing 20 mol of $Fe^{2+}$ ($Fe^{2+}$ concentration: 0.4 mol/liter) was added to and mixed with the resultant solution at a temperature of 47° C. to produce a suspension containing an Fe-containing precipitate.

39

The suspension containing an Fe-containing precipitate was held at 47° C. for 5 hours (the viscosity after 2 hours from blowing the $N_2$ gas was 270 cps, and the viscosity after 5 hours from blowing the $N_2$ gas was 205 cps) while continuously blowing $N_2$ gas thereinto at a rate of 100 liter/minute. Thereafter, an aqueous cobalt sulfate solution was added thereto so that the suspension contained 3.0 atm % of Co based on $Fe^{2+}$, and the mixed suspension was aged for 10 minutes.

Air was introduced into the aged suspension containing an Fe-containing precipitate at 47° C. at a rate of 180 liter/minute for 65 minutes, and when the oxidation fraction reached 80%, 3.0 atm % of an aqueous aluminum sulfate solution calculated as Al based on the total Fe was added, and the oxidation was further continued for 35 minutes under the same oxidation condition to produce yellowish brown precipitated particles. The pH of the suspension during the aeration was 8.0 to 9.5.

The yellowish brown precipitated particles were filtered out, washed with water, dried and pulverized by an ordinary method to obtain about 2 kg of yellowish brown particles.

Figure 12:
FIG. 12 is an electron micrograph (×30000) of the particle structure of the spindle-shaped goethite particles obtained in Example 61.
Figure 13:
FIG. 13 is an electron micrograph (×30000) of the particle structure of the spindle-shaped goethite particles obtained in Example 63.
Figure 14:
FIG. 14 is an electron micrograph (×30000) of the particle structure of the spindle-shaped goethite particles obtained in Example 69.
Figure 15:
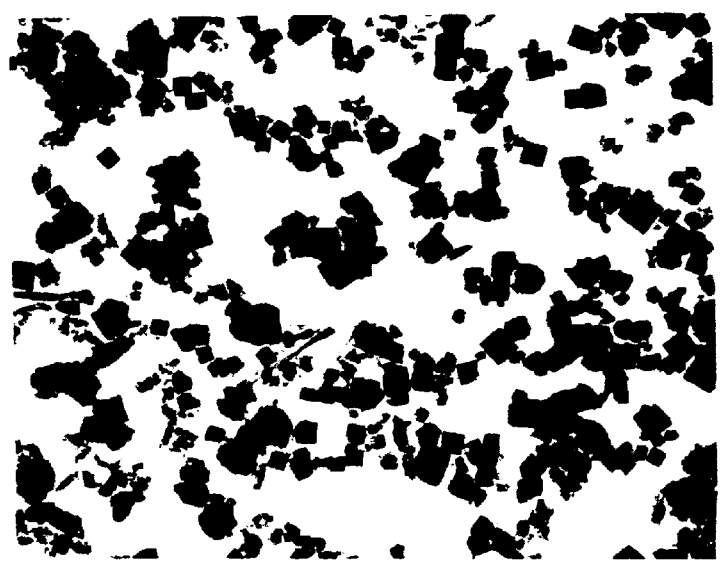
FIG. 15 is an electron micrograph (×30000) of the particle structure of the granular goethite particles obtained in Comparative Example 31.
Figure 16:
FIG. 16 is an electron micrograph (×30000) of the particle structure of the spindle-shaped goethite particles obtained in Comparative Example 32.
Figure 17:
FIG. 17 is an electron micrograph (×30000) of the particle structure of the spindle-shaped goethite particles obtained in Comparative Example 33.

The thus-obtained yellowish brown particles were proved to be goethite particles. As is obvious from the electron microphotograph (×30000) shown in FIG. 12, they had an average major axis diameter of 0.126 μm, a size distribution of 0.214, an average minor axis diameter of 0.015 μm, an aspect ratio of 8.4 with a uniform particle size and containing no dendrites. The Co content was 3.04 atm % and the Al content was 2.95 atm %.

Examples 62 to 75, Comparative Examples 29 to 38

Goethite particles were obtained in the same procedure as in Example 1 except for varying the amount of aqueous alkali carbonate solution used, the amount of aqueous alkali hydroxide solution used, the time at which the aqueous alkali hydroxide solution is added, the mixing ratio, the mixing temperature, the aging temperature and time, the amount of Co compound added, the time at which the Co compound was added, the oxidation temperature, the kind and the amount of compound added in the oxidation process, and the oxidation fraction when the compound was added.

In Comparative Example 38, air was introduced into the aged suspension containing an Fe-containing precipitate at 47° C. at a rate of 180 liter/minute for 70 minutes, and when the oxidation fraction reached 80%, $N_2$ gas was blown into the suspension at a rate of 100 liter/minute so as to produce a nonoxidizing atmosphere and the temperature was raised to 57° C. To the suspension was added 1.0 atm % of water glass #3 (calculated as Si) based on the total Fe, and the mixed suspension was held for 35 minutes. The oxidation was further continued for 15 minutes at 57° C. while air was blown at a rate of 180 liter/minute in place of the $N_2$ gas, thereby producing yellowish brown precipitated particles.

The yellowish brown precipitated particles were filtered out, washed with water, dried and pulverized by an ordinary method to obtain about 2 kg of yellowish brown particles.

Figure 18:
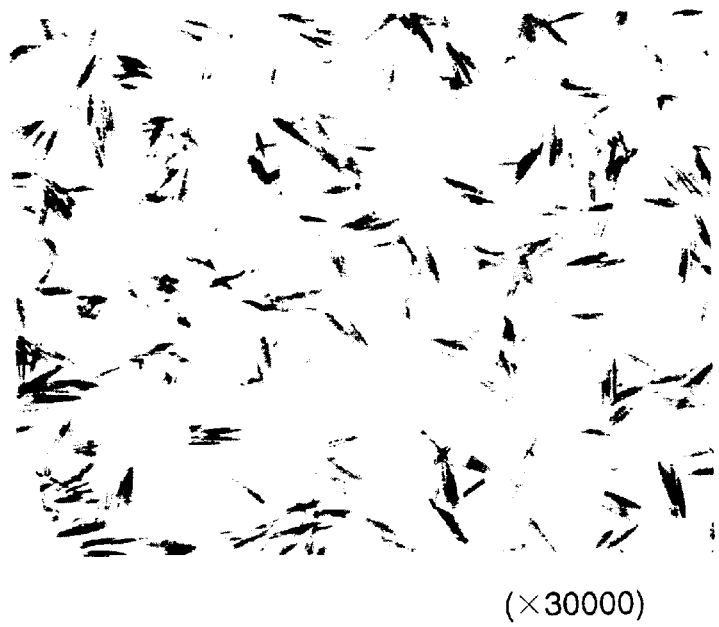
FIG. 18 is an electron micrograph (×30000) of the particle structure of the spindle-shaped goethite particles obtained in Comparative Example 38.

The thus-obtained yellowish brown particles were proved to be goethite particles. As is obvious from the electron microphotograph (×30000) shown in FIG. 18, they had an average major axis diameter of 0.153 μm, a size distribution of 0.241, and an average minor axis diameter of 0.023 μm, an aspect ratio of 6.7. It was confirmed that the goethite particles became slightly larger, especially, the particles grew in the minor axis direction.

The main producing conditions are shown in Tables 11 to 14 and the properties of the goethite particles obtained are shown in Tables 13 and 14.

40

Production of Hematite Particles

Examples 76 to 88

Comparative Examples 39 to 47

Example 76

The amount of presscake which was equivalent to 900 g of the spindle-shaped goethite particles which was washed with water and filtered in Example 61 was suspended in 15 liter of water. The pH of the suspension was 8.5.

10 wt % of cobalt acetate tetrahydrate based on the goethite particles were added to the suspension. Thereafter boric acid was added to the suspension so that the content of boric acid became 15 wt % based on the goethite particles and the mixed suspension was stirred for 10 minutes. The pH of the suspension was 4.5.

After adjusting the pH of the suspension to 9.5 by adding an aqueous ammonia solution, the suspension was filtered by a filter press, washed with water and dried to obtain the goethite particles coated with Co and B compounds.

The goethite particles coated with Co and B compounds were dehydrated at 400° C. in air so as to produce spindle-shaped hematite particles coated with Co and B compounds.

Examples 77 to 88, Comparative Examples 39 to 47

Coated hematite particles were obtained in the same procedure as in Example 76 except for varying the kind of treated particles, the kind and the amount of compound containing a coating element added, the dehydration temperature, and the annealing temperature, if the annealing process was carried out.

The main producing conditions are shown in Tables 15 and 16.

In the Example 84, cobalt hematite particles were obtained in the same procedure as in the Example 76 except that after adding a compound containing a coating element (s) to conduct a coating treatment, the resultant suspension was filtered and washed with water.

Production of Spindle-shaped Magnetic Iron-based Alloy Particles Containing Cobalt and Iron as Main Ingredients Examples 89 to 101

Comparative Examples 48 to 56

Example 89

100 g of the spindle-shaped hematite particles coated with Co and B compounds obtained in Example 76 were charged in a fixed bed reducing furnace having an inner diameter of 72 mm, and $H_2$ gas was introduced into the furnace at a rate of 35 liter/minute so as to reduce the particles at 420° C.

After the end of reduction, $H_2$ gas was replaced with $N_2$ gas, and while the $N_2$ gas was introduced into the furnace at a rate of 50 liter/min, the hematite particles were cooled to 40° C. A mixed gas of 50 liter/min of $N_2$ gas and 0.2 liter/min of air was then introduced into the furnace while the furnace temperature was maintained at 40° C. After the exothermic peak produced by the oxidation with the mixed gas was observed, the air flow rate was raised to 0.4 liter/min so as to increase the air ratio in the mixed gas. In this way, the air mixing ratio was raised by stages by raising the air ratio in the mixed gas every time the exothermic peak produced by the oxidation was observed. Finally, the oxidation process was continued by a mixed gas of 0.6 liter/min of air and 50 liter/min of $N_2$ gas until no exothermic reaction due to oxidation was observed and the temperature of the particles became 40° C., which was approximately the same as the temperature of the furnace. During the oxidation, the temperature of the particles reached 75° C. at the maximum.

The air mixing ratio was then gradually increased while maintaining the furnace temperature at 40° C. and the flow rate of $N_2$ gas at 50 liter/min until the amount of air was 10 liter/min. No exothermic reaction was observed during this period. Thereafter, the temperature was cooled to the room temperature while aerating with the mixed gas of $N_2$ gas and air under the same condition.

After the aeration was stopped and the air was replaced with $N_2$ gas, the spindle-shaped magnetic iron-based alloy particles containing cobalt and iron as main ingredients with oxide layer was recovered.

Figure 19:
FIG. 19 is an electron micrograph (×30000) of the particle structure of the spindle-shaped magnetic iron-based alloy particles containing cobalt and iron as main ingredients obtained in Example 89.

The X-ray crystallite size of the spindle-shaped magnetic iron-based alloy particles containing Co, Al and B was 146 Å. As is obvious from the electron microphotograph (×30000) shown in FIG. 19, they had an average major axis diameter of 0.096 μm, a size distribution of 0.198, an average minor axis diameter of 0.014 μm, and an aspect ratio of 6.9 with a uniform particle size and containing no dendrites. As to the magnetic characteristics, the coercive force (Hc) was 1847 Oe, the saturation magnetization was 121 emu/g, and the squareness ($\sigma_r/\sigma_s$) was 0.508. The Co content in the particle was 3.04 atm % and the amount of coating Co was 2.21 atm %, the Al content in the particle was 2.95 atm %, and the amount of coating B was 12.2 atm %.

Examples 90 to 101, Comparative Examples 48 to 56

Spindle-shaped magnetic iron-based alloy particles containing cobalt and iron as main ingredients were obtained in the same procedure as in Example 89 except for varying the kind of the treated particles, and the reducing temperature in the heat-treatment.

The main producing conditions and various properties of the particles obtained are shown in Tables 17 and 18.

Production of Coating Film

Examples 102 to 106

Comparative Examples 57 to 60

Examples 102 to 106, Comparative Examples 57 to 60

Coating films were produced in the same procedure as in Example 46 except for varying the kind of spindle-shaped magnetic iron-based alloy particles containing cobalt and iron as the main ingredient. Various properties of the coating films obtained are shown in Table 19.

TABLE 1

Production of goethite particles

| | Aqueous alkali carbonate solution | | Aqueous alkali hydroxide solution | | |
|---|---|---|---|---|---|
| | Kind | Amount (mol/20 liter) | Kind | Amount (mol/10 liter) | *Time for addition |
| Ex. 1 | $Na_2CO_3$ | 25 | NaOH | 18 | A |
| Ex. 2 | $Na_2CO_3$ | 30 | NaOH | 15 | A |
| Ex. 3 | $Na_2CO_3$ | 25 | NaOH | 20 | A |
| Ex. 4 | $Na_2CO_3$ | 38 | NaOH | 18 | B |
| Ex. 5 | $Na_2CO_3$ | 25 | NaOH | 18 | A |
| Ex. 6 | $Na_2CO_3$ | 25 | NaOH | 18 | A |
| Ex. 7 | $Na_2CO_3$ | 25 | NaOH | 18 | A |
| Ex. 8 | $Na_2CO_3$ | 25 | NaOH | 18 | A |
| Ex. 9 | $Na_2CO_3$ | 25 | NaOH | 18 | A |
| Ex. 10 | $Na_2CO_3$ | 25 | NaOH | 20 | A |

TABLE 1-continued

Production of goethite particles

| | Aqueous ferrous salt solution | | | |
|---|---|---|---|---|
| | $NaOH/Na_2CO_3$ (Molar ratio) | Kind | Amount (mol/20 liter) | Equi-molar ratio Total amount of alkali/Total Fe |
| Ex. 1 | 0.72 | $FeSO_4$ | 20 | 1.70 |
| Ex. 2 | 0.50 | $FeSO_4$ | 20 | 1.88 |
| Ex. 3 | 0.80 | $FeSO_4$ | 20 | 1.75 |
| Ex. 4 | 0.47 | $FeSO_4$ | 20 | 2.35 |
| Ex. 5 | 0.72 | $FeSO_4$ | 20 | 1.70 |
| Ex. 6 | 0.72 | $FeSO_4$ | 20 | 1.70 |
| Ex. 7 | 0.72 | $FeSO_4$ | 20 | 1.70 |
| Ex. 8 | 0.72 | $FeSO_4$ | 20 | 1.70 |
| Ex. 9 | 0.72 | $FeSO_4$ | 20 | 1.70 |
| Ex. 10 | 0.80 | $FeSO_4$ | 20 | 1.75 |

| | Si, Nd, Y, La, Ce, Pr or Tb | | | Aging | |
|---|---|---|---|---|---|
| | Kind | Amount (atm %) | **Time for addition | Temperature (° C.) | Time (hr) |
| Ex. 1 | Water glass | 0.25 | D | 47 | 5 |
| Ex. 2 | Water glass | 0.25 | D | 49 | 5 |
| Ex. 3 | Water glass | 0.5 | D | 47 | 5 |
| Ex. 4 | Cerium nitrate | 0.5 | C | 49 | 3 |
| Ex. 5 | Neodymium nitrate | 0.5 | C | 47 | 4 |
| Ex. 6 | Neodymium nitrate | 0.5 | C | 47 | 4 |
| Ex. 7 | Neodymium nitrate | 0.5 | C | 47 | 4 |
| Ex. 8 | Neodymium nitrate | 0.5 | C | 51 | 5 |
| Ex. 9 | Neodymium nitrate | 0.5 | C | 51 | 5 |
| Ex. 10 | Neodymium nitrate | 0.5 | C | 49 | 5 |

| | Co compound | | | |
|---|---|---|---|---|
| | Kind | Amount (atm %) | ***Time for addition | Elapsed time (min) |
| Ex. 1 | $CoSO_4$ | 18 | F | 60 |
| Ex. 2 | $CoSO_4$ | 18 | F | 30 |
| Ex. 3 | $CoSO_4$ | 18 | F | 60 |
| Ex. 4 | $CoSO_4$ | 18 | F | 30 |
| Ex. 5 | $CoSO_4$ | 9 | F | 60 |
| Ex. 6 | $CoSO_4$ | 9 | F | 60 |
| Ex. 7 | $CoSO_4$ | 9 | F | 60 |
| Ex. 8 | $COSO_4$ | 13.5 | F | 120 |
| Ex. 9 | $CoSO_4$ | 13.5 | F | 120 |
| Ex. 10 | $CoSO_4$ | 30 | F | 15 |

*: Time for addition of aqueous alkali hydroxide solution:
A: Add to aqueous alkali carbonate solution
B: Add to suspension containing an Fe-containing precipitate
**: Time for addition of Si, Nd, Y, La, Ce, Pr or Tb compound:
C: Add to aqueous ferrous salt solution
D: Add to aqueous alkali solution
***: Time for addition of Co compound:
E: Add to aqueous ferrous salt solution
F: Add to suspension in process of aging
: Time elapsed from the start of aging

TABLE 2

Production of goethite particles

| | Aqueous alkali carbonate solution | | Aqueous alkali hydroxide solution | | |
|---|---|---|---|---|---|
| | Kind | Amount (mol/20 liter) | Kind | Amount (mol/10 liter) | *Time for addition |
| Ex. 11 | $Na_2CO_3$ | 25 | NaOH | 20 | A |
| Ex. 12 | $Na_2CO_3$ | 17 | NaOH | 13 | A |
| Ex. 13 | $Na_2CO_3$ | 25 | NaOH | 20 | A |
| Ex. 14 | $Na_2CO_3$ | 18 | NaOH | 17 | A |
| Ex. 15 | $Na_2CO_3$ | 18 | NaOH | 17 | A |
| Comp. Ex. 1 | $Na_2CO_3$ | 25 | NaOH | 18 | A |
| Comp. Ex. 2 | $Na_2CO_3$ | 25 | NaOH | 18 | A |
| Comp. Ex. 3 | $Na_2CO_3$ | 25 | NaOH | 18 | A |
| Comp. Ex. 4 | $Na_2CO_3$ | 25 | NaOH | 18 | A |
| Comp. Ex. 5 | $Na_2CO_3$ | 25 | NaOH | 18 | A |
| Comp. Ex. 6 | $Na_2CO_3$ | 25 | NaOH | 18 | A |
| Comp. Ex. 7 | — | — | NaOH | 60 | — |

| | NaOH/$Na_2CO_3$ (Molar ratio) | Aqueous ferrous salt solution | | Equi-molar ratio (Total amount of alkali/Total Fe) |
|---|---|---|---|---|
| | | Kind | Amount (mol/20 liter) | |
| Ex. 11 | 0.80 | $FeSO_4$ | 20 | 1.75 |
| Ex. 12 | 0.76 | $FeSO_4$ | 15 | 1.57 |
| Ex. 13 | 0.80 | $FeSO_4$ | 20 | 1.75 |
| Ex. 14 | 0.94 | $FeSO_4$ | 15 | 1.77 |
| Ex. 15 | 0.94 | $FeSO_4$ | 15 | 1.77 |
| Comp. Ex. 1 | 0.72 | $FeSO_4$ | 20 | 1.70 |
| Comp. Ex. 2 | 0.72 | $FeSO_4$ | 20 | 1.79 |
| Comp. Ex. 3 | 0.72 | $FeSO_4$ | 20 | 1.70 |
| Comp. Ex. 4 | 0.72 | $FeSO_4$ | 20 | 1.70 |
| Comp. Ex. 5 | 0.72 | $FeSO_4$ | 20 | 1.70 |
| Comp. Ex. 6 | 0.72 | $FeSO_4$ | 20 | 1.70 |
| Comp. Ex. 7 | — | $FeSO_4$ | 10 | 3.0 |

| | Si, Nd, Y, La, Ce, Pr or Tb | | | Aging | |
|---|---|---|---|---|---|
| | Kind | Amount (atm %) | **Time for addition | Temperature (° C.) | Time (hr) |
| Ex. 11 | Water glass | 0.25 | D | 49 | 5 |
| Ex. 12 | Water glass | 0.25 | D | 45 | 5 |
| Ex. 13 | Water glass | 0.25 | D | 47 | 3 |
| Ex. 14 | Yttrium nitrate | 0.5 | C | 47 | 3 |
| Ex. 15 | Yttrium nitrate | 0.5 | C | 47 | 5 |
| Comp. Ex. 1 | — | — | — | 45 | 5 |
| Comp. Ex. 2 | Water glass | 1.5 | D | 47 | 5 |
| Comp. Ex. 3 | Neodymium nitrate | 0.5 | C | 47 | 5 |
| Comp. Ex. 4 | — | — | — | 47 | 5 |
| Comp. Ex. 5 | — | — | — | 47 | 4 |
| Comp. Ex. 6 | Neodymium nitrate | 0.5 | C | 47 | 4 |
| Comp. Ex. 7 | — | — | — | — | — |

| | Co compound | | | |
|---|---|---|---|---|
| | Kind | Amount (atm %) | ***Time for addition | Elapsed time (min) |
| Ex. 11 | $CoSO_4$ | 30 | F | 15 |
| Ex. 12 | $CoSO_4$ | 30 | F | 15 |
| Ex. 13 | $CoSO_4$ | 30 | F | 30 |
| Ex. 14 | $CoSO_4$ | 36 | E | — |
| Ex. 15 | $CoSO_4$ | 40 | E | — |
| Comp. Ex. 1 | $CoSO_4$ | 18 | F | 60 |
| Comp. Ex. 2 | $CoSO_4$ | 18 | F | 60 |
| Comp. Ex. 3 | $CoSO_4$ | 18 | F | 60 |
| Comp. Ex. 4 | $CoSO_4$ | 18 | F | 60 |
| Comp. Ex. 5 | $CoSO_4$ | 9 | F | 60 |
| Comp. Ex. 6 | $CoSO_4$ | 9 | F | 60 |
| Comp. Ex. 7 | $NiSO_4$ | 1.5 | E | — |

*: Time for addition of aqueous alkali hydroxide solution:
A: Add to aqueous alkali carbonate solution
B: Add to suspension containing an Fe-containing precipitate
**: Time for addition of Si, Nd, Y, La, Ce, Pr or Tb compound:
C: Add to aqueous ferrous salt solution
D: Add to aqueous alkali solution
***: Time for addition of Co compound:
E: Add to aqueous ferrous salt solution
F: Add to suspension in process of aging
: Time elapsed from the start of aging

TABLE 3

Production of goethite particles

| | Compound added to liquid in process of oxidation | | | | |
|---|---|---|---|---|---|
| | Oxidation temperature (° C.) | Oxidation fraction (time of addition) (%) | Kind | Element & Amount (atm %) | Total amount of element added (atm %) |
| Ex. 1 | 47 | 40 | Water glass | Si: 1.75 | 1.75 |
| Ex. 2 | 49 | 40 | Neodymium nitrate Aluminum nitrate | Nd: 2.5 Al: 3.0 | 5.5 |
| Ex. 3 | 47 | 35 | Neodymium nitrate | Nd: 1.5 | 1.5 |
| Ex. 4 | 49 | 45 | Water glass Aluminum nitrate | Si: 0.75 Al: 3.0 | 3.75 |
| Ex. 5 | 47 | 40 | Water glass Aluminum nitrate | Si: 1.0 Al: 2.0 | 3.0 |
| Ex. 6 | 47 | 40 | Water glass | Si: 1.0 | 3.0 |

TABLE 3-continued

Production of goethite particles

| | | | | | |
|---|---|---|---|---|---|
| Ex. 7 | 47 | 40 | Aluminum nitrate | Al: 2.0 | 3.0 |
| | | | Water glass | Si: 1.0 | |
| Ex. 8 | 51 | 40 | Aluminum nitrate | Al: 2.0 | 3.0 |
| | | | Water glass | Si: 1.0 | |
| Ex. 9 | 51 | 40 | Aluminum nitrate | Al: 2.0 | 3.0 |
| | | | Water glass | Si: 1.0 | |
| Ex. 10 | 49 | 40 | Aluminum nitrate | Al: 2.0 | 2.0 |
| | | | Water glass | Si: 1.0 | |
| | | | Aluminum nitrate | Al: 1.0 | |

| | Shape | Major axial diameter ($\mu$m) | Minor axial diameter ($\mu$m) | Aspect ratio (-) |
|---|---|---|---|---|
| Ex. 1 | Spindle-shaped | 0.108 | 0.016 | 6.8 |
| Ex. 2 | Spindle-shaped | 0.118 | 0.017 | 6.9 |
| Ex. 3 | Spindle-shaped | 0.131 | 0.018 | 7.3 |
| Ex. 4 | Spindle-shaped | 0.121 | 0.018 | 6.7 |
| Ex. 5 | Spindle-shaped | 0.118 | 0.017 | 6.9 |
| Ex. 6 | Spindle-shaped | 0.118 | 0.017 | 6.9 |
| Ex. 7 | Spindle-shaped | 0.118 | 0.017 | 6.9 |
| Ex. 8 | Spindle-shaped | 0.112 | 0.017 | 6.6 |
| Ex. 9 | Spindle-shaped | 0.112 | 0.017 | 6.6 |
| Ex. 10 | Spindle-shaped | 0.104 | 0.014 | 7.4 |

| | Crystallite size | | |
|---|---|---|---|
| | $D_{020}$ (Å) | $D_{110}$ (Å) | $D_{020}/D_{110}$ |
| Ex. 1 | 224 | 99 | 2.26 |
| Ex. 2 | 217 | 83 | 2.61 |
| Ex. 3 | 234 | 103 | 2.27 |
| Ex. 4 | 212 | 100 | 2.12 |
| Ex. 5 | 209 | 98 | 2.13 |
| Ex. 6 | 209 | 98 | 2.13 |
| Ex. 7 | 209 | 98 | 2.13 |
| Ex. 8 | 203 | 96 | 2.11 |
| Ex. 9 | 203 | 96 | 2.11 |
| Ex. 10 | 201 | 88 | 2.28 |

| | Content of compound added | | | | Major axis diameter standard deviation ($\times 10^{-1}$ $\mu$m) | Standard deviation/ major axis diameter |
|---|---|---|---|---|---|---|
| | Co (atm %) | Si (atm %) | Al (atm %) | Rare earth element & Amount (atm %) | | |
| Ex. 1 | 17.94 | 1.93 | — | — | 0.220 | 0.204 |
| Ex. 2 | 18.12 | 0.24 | 2.94 | Nd: 2.48 | 0.245 | 0.208 |
| Ex. 3 | 18.04 | 0.48 | — | Nd: 1.49 | 0.289 | 0.221 |
| Ex. 4 | 17.97 | 0.72 | 2.97 | Ce: 0.49 | 0.243 | 0.201 |
| Ex. 5 | 9.11 | 0.97 | 1.95 | Nd: 0.47 | 0.253 | 0.214 |
| Ex. 6 | 9.11 | 0.97 | 1.95 | Nd: 0.47 | 0.253 | 0.214 |
| Ex. 7 | 9.11 | 0.97 | 1.95 | Nd: 0.47 | 0.253 | 0.214 |
| Ex. 8 | 13.41 | 0.98 | 1.98 | Nd: 0.49 | 0.228 | 0.204 |
| Ex. 9 | 13.41 | 0.98 | 1.98 | Nd: 0.49 | 0.228 | 0.204 |
| Ex. 10 | 29.95 | 0.97 | 0.96 | Nd: 0.49 | 0.210 | 0.202 |

TABLE 4

Production of goethite particles

| | Oxidation temperature (° C.) | Oxidation fraction (time of addition) (%) | Compound added to liquid in process of oxidation | | Total amount of element added (atm %) |
|---|---|---|---|---|---|
| | | | Kind | Element & Amount (atm %) | |
| Ex. 11 | 49 | 40 | Water glass | Si: 1.75 | 3.25 |
| | | | Neodymium nitrate | Nd: 1.5 | |
| Ex. 12 | 45 | 35 | Water glass | Si: 1.75 | 3.25 |
| | | | Neodymium nitrate | Nd: 1.5 | |
| Ex. 13 | 47 | 40 | Water glass | Si: 2.5 | 2.5 |
| Ex. 14 | 47 | 40 | Water glass | Si: 1.5 | 3.5 |
| | | | Yttrium nitrate | Y: 2.0 | |
| Ex. 15 | 47 | 40 | Water glass | Si: 1.5 | 3.5 |
| | | | Yttrium nitrate | Y: 2.0 | |
| Comp. Ex. 1 | 45 | — | — | — | — |
| Comp. Ex. 2 | 47 | — | — | — | — |
| Comp. Ex. 3 | 47 | — | — | — | — |
| Comp. Ex. 4 | 47 | 10 | Neodymium nitrate | Nd: 4.0 | 4.0 |
| Comp. Ex. 5 | 47 | 20 | Water glass | Si: 4.0 | 4.0 |
| Comp. Ex. 6 | 47 | 60 | Water glass | Si: 1.0 | 1.0 |
| Comp. Ex. 7 | 40 | — | — | — | — |

| | Shape | Major axial diameter ($\mu$m) | Minor axial diameter ($\mu$m) | Aspect ratio (-) |
|---|---|---|---|---|
| Ex. 11 | Spindle-shaped | 0.098 | 0.014 | 7.0 |
| Ex. 12 | Spindle-shaped | 0.087 | 0.014 | 6.2 |
| Ex. 13 | Spindle-shaped | 0.130 | 0.021 | 6.2 |
| Ex. 14 | Spindle-shaped | 0.103 | 0.016 | 6.4 |
| Ex. 15 | Spindle-shaped | 0.094 | 0.015 | 6.3 |
| Comp. Ex. 1 | Spindle-shaped | 0.112 | 0.012 | 9.3 |
| Comp. Ex. 2 | Spindle-shaped | 0.065 | 0.017 | 3.8 |
| Comp. Ex. 3 | Spindle-shaped | 0.102 | 0.012 | 8.5 |
| Comp. Ex. 4 | Spindle-shaped | 0.072 | 0.019 | 3.8 |
| Comp. Ex. 5 | Spindle-shaped | 0.074 | 0.019 | 3.9 |
| Comp. Ex. 6 | Spindle-shaped | 0.116 | 0.013 | 8.9 |
| Comp. Ex. 7 | Acicular | 0.146 | 0.013 | 11.2 |

| | Crystallite size | | |
|---|---|---|---|
| | $D_{020}$ (Å) | $D_{110}$ (Å) | $D_{020}/D_{110}$ |
| Ex. 11 | 221 | 104 | 2.13 |
| Ex. 12 | 225 | 101 | 2.23 |
| Ex. 13 | 234 | 94 | 2.49 |
| Ex. 14 | 213 | 96 | 2.22 |
| Ex. 15 | 209 | 91 | 2.30 |
| Comp. Ex. 1 | 162 | 88 | 1.84 |

TABLE 4-continued

Production of goethite particles

|  |  |  |  |
|---|---|---|---|
| Comp. Ex. 2 | 254 | 113 | 2.25 |
| Comp. Ex. 3 | 184 | 86 | 2.14 |
| Comp. Ex. 4 | 182 | 87 | 2.09 |
| Comp. Ex. 5 | 217 | 103 | 2.11 |
| Comp. Ex. 6 | 184 | 94 | 1.96 |
| Comp. Ex. 7 | 151 | 72 | 2.10 |

| | Content of compound added | | | Major | |
|---|---|---|---|---|---|
| | Co (atm %) | Si (atm %) | Al (atm %) | Rare earth element & Amount (atm %) | axis diameter standard deviation (×10$^{-1}$ μm) | Standard deviation/major axis diameter |
| Ex. 11 | 30.12 | 1.92 | — | Nd: 1.51 | 0.174 | 0.178 |
| Ex. 12 | 30.08 | 1.93 | — | Nd: 1.49 | 0.153 | 0.176 |
| Ex. 13 | 29.83 | 2.64 | — | — | 0.257 | 0.198 |
| Ex. 14 | 35.86 | 1.46 | — | Y: 2.49 | 0.192 | 0.186 |
| Ex. 15 | 39.80 | 1.45 | — | Y: 2.48 | 0.164 | 0.174 |
| Comp. Ex. 1 | 17.97 | — | — | — | 0.242 | 0.216 |
| Comp. Ex. 2 | 18.02 | 1.48 | — | — | 0.116 | 0.178 |
| Comp. Ex. 3 | 18.12 | — | — | Nd: 0.48 | 0.206 | 0.202 |
| Comp. Ex. 4 | 18.04 | — | — | Nd: 3.93 | 0.137 | 0.190 |
| Comp. Ex. 5 | 9.08 | 3.83 | — | — | 0.142 | 0.192 |
| Comp. Ex. 6 | 9.14 | 0.96 | — | Nd: 0.50 | 0.238 | 0.205 |
| Comp. Ex. 7 | — | — | — | — | 0.636 | 0.436 |

TABLE 5

Production of hematite particles

Sintering preventing treatment

| | | Al compound | | Si compound | |
|---|---|---|---|---|---|
| | Particles treated | Kind | Amount (wt %) | Kind | Amount (wt %) |
| Ex. 16 | Ex. 1 | Aluminum nitrate nonahydrate | 10 | — | — |
| Ex. 17 | Ex. 2 | — | — | — | — |
| Ex. 18 | Ex. 3 | Aluminum nitrate nonahydrate | 10 | — | — |
| Ex. 19 | Ex. 4 | — | — | — | — |
| Ex. 20 | Ex. 5 | Aluminum nitrate nonahydrate | 4 | — | — |
| Ex. 21 | Ex. 6 | Aluminum nitrate nonahydrate | 4 | — | — |
| Ex. 22 | Ex. 7 | Aluminum nitrate nonahydrate | 4 | Water glass | 8 |
| Ex. 23 | Ex. 8 | Aluminum nitrate nonahydrate | 4 | — | — |
| Ex. 24 | Ex. 9 | Aluminum nitrate nonahydrate | 4 | — | — |
| Ex. 25 | Ex. 10 | Aluminum nitrate nonahydrate | 7 | — | — |

Sintering preventing treatment

| | Rare earth compound | | Co compound | |
|---|---|---|---|---|
| | Kind | Element & Amount (wt %) | Kind | Amount & (wt %) |
| Ex. 16 | Neodymium nitrate hexahydrate | Nd: 7 | Cobalt acetate tetrahydrate | 10 |
| Ex. 17 | Neodymium nitrate hexahydrate | Nd: 7 | Cobalt acetate tetrahydrate | 10 |
| Ex. 18 | Neodymium nitrate hexahydrate | Nd: 7 | Cobalt acetate tetrahydrate | 10 |
| Ex. 19 | Cerium nitrate hexahydrate | Ce: 7 | Cobalt acetate tetrahydrate | 10 |
| Ex. 20 | — | — | Cobalt acetate tetrahydrate | 10 |
| Ex. 21 | — | — | Cobalt acetate tetrahydrate | 30 |
| Ex. 22 | — | — | Cobalt acetate tetrahydrate | 10 |
| Ex. 23 | — | — | Cobalt acetate tetrahydrate | 10 |
| Ex. 24 | — | — | Cobalt acetate tetrahydrate | 30 |
| Ex. 25 | Neodymium nitrate hexahydrate | Nd: 7 | — | — |

Sintering preventing treatment

| | B compound | | Dehydration | Annealing |
|---|---|---|---|---|
| | Kind | Amount (wt %) | temperature (° C.) | temperature (° C.) |
| Ex. 16 | Boric acid | 15 | 400 | — |
| Ex. 17 | Boric acid | 15 | 350 | — |
| Ex. 18 | Boric acid | 15 | 400 | — |
| Ex. 19 | Boric acid | 15 | 300 | 450 |
| Ex. 20 | Boric acid | 15 | 400 | — |
| Ex. 21 | Boric acid | 10 | 400 | — |
| Ex. 22 | — | — | 300 | 700 |
| Ex. 23 | Boric acid | 10 | 400 | — |
| Ex. 24 | Boric acid | 12.5 | 400 | — |
| Ex. 25 | Boric acid | 15 | 400 | — |

TABLE 6

Production of hematite particles

| | | Sintering preventing treatment | | | |
|---|---|---|---|---|---|
| | | Al compound | | Si compound | |
| | Particles treated | Kind | Amount (wt %) | Kind | Amount (wt %) |
| Ex. 26 | Ex. 11 | Aluminum nitrate nonahydrate | 10 | — | — |
| Ex. 27 | Ex. 12 | Aluminum nitrate nonahydrate | 10 | — | — |
| Ex. 28 | Ex. 13 | Aluminum nitrate nonahydrate | 10 | — | — |
| Ex. 29 | Ex. 14 | Aluminum nitrate nonahydrate | 4 | — | — |
| Ex. 30 | Ex. 15 | Aluminum nitrate nonahydrate | 4 | — | — |
| Comp. Ex. 8 | Comp. Ex. 1 | Aluminum nitrate nonahydrate | 10 | — | — |
| Comp. Ex. 9 | Comp. Ex. 2 | Aluminum nitrate nonahydrate | 10 | — | — |
| Comp. Ex. 10 | Comp. Ex. 3 | Aluminum nitrate nonahydrate | 10 | — | — |
| Comp. Ex. 11 | Comp. Ex. 4 | Aluminum nitrate nonahydrate | 10 | — | — |
| Comp. Ex. 12 | Comp. Ex. 5 | Aluminum nitrate nonahydrate | 10 | — | — |
| Comp. Ex. 13 | Comp. Ex. 6 | Aluminum nitrate nonahydrate | 10 | — | — |
| Comp. Ex. 14 | Comp. Ex. 7 | Aluminum nitrate nonahydrate | 10 | — | — |

| | Sintering preventing treatment | | | |
|---|---|---|---|---|
| | Rare earth compound | | Co compound | |
| | Kind | Element & Amount (wt %) | Kind | Amount & (wt %) |
| Ex. 26 | — | — | — | — |
| Ex. 27 | — | — | — | — |
| Ex. 28 | Neodymium nitrate hexahydrate | Nd: 7 | Cobalt acetate tetrahydrate | 10 |
| Ex. 29 | Yttrium nitrate hexahydrate | Y: 6 | Cobalt acetate tetrahydrate | 10 |
| Ex. 30 | Yttrium nitrate hexahydrate | Y: 6 | Cobalt acetate tetrahydrate | 10 |
| Comp. Ex. 8 | Neodymium nitrate hexahydrate | Nd: 7 | Cobalt acetate tetrahydrate | 10 |
| Comp. Ex. 9 | — | — | Cobalt acetate tetrahydrate | 10 |
| Comp. Ex. 10 | — | — | Cobalt acetate tetrahydrate | 10 |
| Comp. Ex. 11 | — | — | Cobalt acetate tetrahydrate | 10 |
| Comp. Ex. 12 | — | — | Cobalt acetate tetrahydrate | 10 |
| Comp. Ex. 13 | Neodymium nitrate hexahydrate | Nd: 7 | Cobalt acetate tetrahydrate | 10 |
| Comp. Ex. 14 | — | — | Cobalt acetate tetrahydrate | 20 |

| | Sintering preventing treatment | | Dehydration temperature (° C.) | Annealing temperature (° C.) |
|---|---|---|---|---|
| | B compound | | | |
| | Kind | Amount (wt %) | | |
| Ex. 26 | Boric acid | 15 | 400 | — |
| Ex. 27 | Boric acid | 15 | 400 | — |
| Ex. 28 | Boric acid | 15 | 400 | — |
| Ex. 29 | Boric acid | 15 | 300 | 450 |
| Ex. 30 | Boric acid | 15 | 300 | 450 |
| Comp. Ex. 8 | Boric acid | 15 | 400 | — |
| Comp. Ex. 9 | Boric acid | 15 | 400 | — |
| Comp. Ex. 10 | Boric acid | 15 | 400 | — |
| Comp. Ex. 11 | Boric acid | 15 | 400 | — |
| Comp. Ex. 12 | Boric acid | 15 | 400 | — |
| Comp. Ex. 13 | Boric acid | 15 | 400 | — |
| Comp. Ex. 14 | Boric acid | 15 | 400 | — |

TABLE 7

Production of magnetic iron-based alloy particles containing cobalt and iron as the main ingredients

| | | | Properties of magnetic iron-based alloy particles containing iron as the main ingredient | |
|---|---|---|---|---|
| | Particles treated | Reduction Temperature (° C.) | Major axial diameter (μm) | Minor axial diameter (μm) |
| Ex. 31 | Ex. 16 | 420 | 0.085 | 0.013 |
| Ex. 32 | Ex. 17 | 420 | 0.087 | 0.014 |
| Ex. 33 | Ex. 18 | 420 | 0.099 | 0.015 |
| Ex. 34 | Ex. 19 | 420 | 0.086 | 0.015 |
| Ex. 35 | Ex. 20 | 420 | 0.090 | 0.015 |
| Ex. 36 | Ex. 21 | 420 | 0.089 | 0.015 |
| Ex. 37 | Ex. 22 | 450 | 0.089 | 0.015 |
| Ex. 38 | Ex. 23 | 420 | 0.092 | 0.015 |
| Ex. 39 | Ex. 24 | 420 | 0.091 | 0.015 |
| Ex. 40 | Ex. 25 | 420 | 0.079 | 0.012 |

Production of magnetic iron-based alloy particles containing cobalt and iron as the main ingredients
Properties of magnetic iron-based alloy particles containing cobalt and iron as the main ingredients

| | Aspect ratio (—) | X-ray crystallite size $D_{110}$ (Å) | Coercive force HC (Oe) | Saturation magnetization $\sigma_s$ (emu/g) |
|---|---|---|---|---|
| Ex. 31 | 6.5 | 148 | 2032 | 138 |
| Ex. 32 | 6.2 | 146 | 1991 | 139 |
| Ex. 33 | 6.6 | 151 | 1948 | 142 |

TABLE 7-continued

| | | | | |
|---|---|---|---|---|
| Ex. 34 | 5.7 | 147 | 1920 | 141 |
| Ex. 35 | 6.0 | 152 | 1976 | 137 |
| Ex. 36 | 5.9 | 157 | 1954 | 135 |
| Ex. 37 | 5.9 | 148 | 1903 | 139 |
| Ex. 38 | 6.1 | 150 | 1996 | 136 |
| Ex. 39 | 6.1 | 152 | 1978 | 135 |
| Ex. 40 | 6.6 | 145 | 2063 | 135 |

Production of magnetic iron-based alloy particles containing cobalt and iron as the main ingredients
Properties of magnetic iron-based alloy particles containing cobalt and iron as the main ingredients

| | Squareness ($\sigma_r/\sigma_s$) (–) | $\Delta\sigma_s$ (%) |
|---|---|---|
| Ex. 31 | 0.518 | 15 |
| Ex. 32 | 0.513 | 16 |
| Ex. 33 | 0.506 | 15 |
| Ex. 34 | 0.509 | 14 |
| Ex. 35 | 0.509 | 15 |
| Ex. 36 | 0.504 | 16 |
| Ex. 37 | 0.511 | 16 |
| Ex. 38 | 0.510 | 15 |
| Ex. 39 | 0.508 | 14 |
| Ex. 40 | 0.510 | 17 |

| | Size distribution | | Amount of the elements contained in goethite reaction |
|---|---|---|---|
| | Major axis diameter standard deviation ($\times 10^{-1}$ μm) | Standard deviation/major axis diameter | Co content (atm %) |
| Ex. 31 | 0.156 | 0.184 | 17.94 |
| Ex. 32 | 0.157 | 0.180 | 18.12 |
| Ex. 33 | 0.196 | 0.198 | 18.04 |
| Ex. 34 | 0.157 | 0.183 | 17.97 |
| Ex. 35 | 0.175 | 0.194 | 9.11 |
| Ex. 36 | 0.170 | 0.191 | 9.11 |
| Ex. 37 | 0.178 | 0.200 | 9.11 |
| Ex. 38 | 0.168 | 0.183 | 13.41 |
| Ex. 39 | 0.161 | 0.177 | 13.41 |
| Ex. 40 | 0.145 | 0.184 | 29.95 |

Amount of the elements contained in goethite reaction

| | Si content (atm %) | Al content (atm %) |
|---|---|---|
| Ex. 31 | 1.93 | — |
| Ex. 32 | 0.24 | 2.94 |
| Ex. 33 | 0.48 | — |
| Ex. 34 | 0.72 | 2.97 |
| Ex. 35 | 0.97 | 1.95 |
| Ex. 36 | 0.97 | 1.95 |
| Ex. 37 | — | 1.95 |
| Ex. 38 | 0.98 | 1.98 |
| Ex. 39 | 0.98 | 1.98 |
| Ex. 40 | 0.97 | 0.96 |

| | Amount of the elements contained in goethite reaction Content of rare earth element (atm %) | Amount of elements coated | |
|---|---|---|---|
| | | Co (atm %) | Si (atm %) |
| Ex. 31 | — | 2.29 | — |
| Ex. 32 | Nd: 2.48 | 2.31 | — |
| Ex. 33 | Nd: 1.49 | 2.30 | — |
| Ex. 34 | Ce: 0.49 | 2.33 | — |
| Ex. 35 | Nd: 0.47 | 2.26 | — |
| Ex. 36 | Nd: 0.47 | 6.54 | — |
| Ex. 37 | Nd: 0.47 | 2.27 | 4.84 |
| Ex. 38 | Nd: 0.49 | 2.31 | — |
| Ex. 39 | Nd: 0.49 | 7.22 | — |
| Ex. 40 | Nd: 0.49 | — | — |

| | Amount of elements coated | | |
|---|---|---|---|
| | Al (atm %) | Rare earth element & Amount (atm %) | B (atm %) |
| Ex. 31 | 2.91 | Nd: 1.53 | 12.8 |
| Ex. 32 | — | Nd: 1.50 | 13.1 |
| Ex. 33 | 2.89 | Nd: 1.54 | 12.2 |
| Ex. 34 | — | Ce: 1.03 | 12.8 |
| Ex. 35 | 0.86 | — | 11.7 |
| Ex. 36 | 0.89 | — | 12.0 |
| Ex. 37 | 0.91 | — | — |
| Ex. 38 | 0.90 | — | 13.0 |
| Ex. 39 | 0.87 | — | 12.9 |
| Ex. 40 | 2.00 | Nd: 1.63 | 13.2 |

TABLE 8

Production of magnetic iron-based alloy particles containing cobalt and iron as the main ingredients
Properties of magnetic iron-based alloy particles containing iron as the main ingredient

| Particles treated | | Reduction Temperature (°C.) | Major axial diameter (μm) | Minor axial diameter (μm) |
|---|---|---|---|---|
| Ex. 41 | Ex. 26 | 420. | 0.070 | 0.011 |
| Ex. 42 | Ex. 27 | 420 | 0.064 | 0.011 |
| Ex. 43 | Ex. 28 | 420 | 0.094 | 0.017 |
| Ex. 44 | Ex. 29 | 440 | 0.072 | 0.013 |
| Ex. 45 | Ex. 30 | 440 | 0.064 | 0.012 |
| Comp. Ex. 15 | Ex. 8 | 420 | 0.083 | 0.010 |
| Comp. Ex. 16 | Ex. 9 | 420 | 0.051 | 0.015 |
| Comp. Ex. 17 | Ex. 10 | 420 | 0.075 | 0.010 |
| Comp. Ex. 18 | Ex. 11 | 420 | 0.054 | 0.016 |
| Comp. Ex. 19 | Ex. 12 | 420 | 0.056 | 0.016 |
| Comp. Ex. 20 | Ex. 13 | 420 | 0.087 | 0.011 |
| Comp. Ex. 21 | Ex. 14 | 420 | 0.108 | 0.011 |

Production of magnetic iron-based alloy particles containing cobalt and iron as the main ingredients
Properties of magnetic iron-based alloy particles containing cobalt and iron as the main ingredients

| | Aspect ratio (–) | X-ray crystallite size $D_{110}$ (Å) | Coercive force HC (Oe) | Saturation magnetization $\sigma_s$ (emu/g) |
|---|---|---|---|---|
| Ex. 41 | 6.4 | 145 | 2129 | 137 |
| Ex. 42 | 5.8 | 147 | 2287 | 136 |
| Ex. 43 | 5.5 | 152 | 1974 | 139 |
| Ex. 44 | 5.5 | 150 | 1942 | 135 |
| Ex. 45 | 5.3 | 145 | 1909 | 135 |
| Comp. Ex. 15 | 8.3 | 131 | 1831 | 124 |
| Comp. | 3.4 | 150 | 1692 | 133 |

TABLE 8-continued

| | | | | |
|---|---|---|---|---|
| Ex. 16 Comp. Ex. 17 | 7.5 | 135 | 1784 | 126 |
| Comp. Ex. 18 | 3.4 | 156 | 1714 | 133 |
| Comp. Ex. 19 | 3.5 | 158 | 1743 | 131 |
| Comp. Ex. 20 | 7.9 | 133 | 1820 | 124 |
| Comp. Ex. 21 | 9.8 | 137 | 1816 | 122 |

Production of magnetic iron-based alloy particles containing cobalt and iron as the main ingredients
Properties of magnetic iron-based alloy particles containing cobalt and iron as the main ingredients

| | Squareness ($\sigma_r/\sigma_s$) (–) | $\Delta\sigma_s$ (%) |
|---|---|---|
| Ex. 41 | 0.512 | 16 |
| Ex. 42 | 0.514 | 15 |
| Ex. 43 | 0.506 | 13 |
| Ex. 44 | 0.502 | 12 |
| Ex. 45 | 0.500 | 12 |
| Comp. Ex. 15 | 0.499 | 23 |
| Comp. Ex. 16 | 0.495 | 18 |
| Comp. Ex. 17 | 0.495 | 22 |
| Comp. Ex. 18 | 0.493 | 19 |
| Comp. Ex. 19 | 0.492 | 20 |
| Comp. Ex. 20 | 0.502 | 22 |
| Comp. Ex. 21 | 0.508 | 21 |

| | Size distribution | | Amount of the elements contained in goethite reaction Co content (atm %) |
|---|---|---|---|
| | Major axis diameter standard deviation (×10⁻¹ μm) | Standard deviation/ major axis diameter | |
| Ex. 41 | 0.112 | 0.160 | 30.12 |
| Ex. 42 | 0.103 | 0.161 | 30.08 |
| Ex. 43 | 0.166 | 0.177 | 29.88 |
| Ex. 44 | 0.122 | 0.169 | 35.86 |
| Ex. 45 | 0.101 | 0.158 | 39.80 |
| Comp. Ex. 15 | 0.163 | 0.196 | 17.97 |
| Comp. Ex. 16 | 0.081 | 0.159 | 18.02 |
| Comp. Ex. 17 | 0.135 | 0.180 | 18.12 |
| Comp. Ex. 18 | 0.094 | 0.174 | 18.04 |
| Comp. Ex. 19 | 0.097 | 0.173 | 9.08 |
| Comp. Ex. 20 | 0.162 | 0.186 | 9.14 |
| Comp. Ex. 21 | 0.426 | 0.394 | — |

| | Amount of the elements contained in goethite reaction Si content (atm %) | Amount of the elements contained in goethite reaction Content of rare earth element (atm %) | Amount of elements coated Co (atm %) |
|---|---|---|---|
| Ex. 41 | 1.92 | Nd: 1.51 | — |
| Ex. 42 | 1.93 | Nd: 1.49 | — |
| Ex. 43 | 2.64 | — | 2.45 |
| Ex. 44 | 1.46 | Y: 2.49 | 2.53 |
| Ex. 45 | 1.45 | Y: 2.48 | 2.58 |
| Comp. Ex. 15 | — | — | 2.23 |
| Comp. Ex. 16 | 1.48 | — | 2.51 |
| Comp. Ex. 17 | — | Nd: 0.48 | 2.41 |
| Comp. Ex. 18 | — | Nd: 3.93 | 2.66 |
| Comp. Ex. 19 | 3.83 | — | 2.27 |
| Comp. Ex. 20 | 1.96 | Nd: 0.50 | 2.30 |
| Comp. Ex. 21 | — | — | 4.53 |

| | Amount of elements coated | | |
|---|---|---|---|
| | Al (atm %) | Rare earth element & Amount (atm %) | B (atm %) |
| Ex. 41 | 3.10 | — | 13.5 |
| Ex. 42 | 2.99 | — | 12.9 |
| Ex. 43 | 3.00 | Nd: 1.61 | 13.0 |
| Ex. 44 | 3.12 | Y: 1.49 | 13.4 |
| Ex. 45 | 3.15 | Y: 1.49 | 13.3 |
| Comp. Ex. 15 | 2.83 | Nd: 1.55 | 13.0 |
| Comp. Ex. 16 | 2.91 | — | 12.5 |
| Comp. Ex. 17 | 2.85 | — | 12.6 |
| Comp. Ex. 18 | 2.89 | — | 12.7 |
| Comp. Ex. 19 | 2.83 | — | 12.1 |
| Comp. Ex. 20 | 2.80 | Nd: 1.49 | 12.3 |
| Comp. Ex. 21 | 2.81 | — | 12.3 |

TABLE 9

| | | Properties of coating film | | |
|---|---|---|---|---|
| | Particles treated | Coercive force Hc (Oe) | Squareness (Br/Bm) (–) | S.F.D. (–) |
| Ex. 46 | Ex. 31 | 2114 | 0.882 | 0.391 |
| Ex. 47 | Ex. 32 | 2057 | 0.876 | 0.398 |
| Ex. 48 | Ex. 33 | 2054 | 0.892 | 0.378 |
| Ex. 49 | Ex. 34 | 1994 | 0.881 | 0.394 |
| Ex. 50 | Ex. 35 | 2032 | 0.885 | 0.387 |
| Ex. 51 | Ex. 36 | 2053 | 0.879 | 0.402 |
| Ex. 52 | Ex. 37 | 1967 | 0.880 | 0.392 |
| Ex. 53 | Ex. 38 | 2088 | 0.892 | 0.378 |
| Ex. 54 | Ex. 39 | 2061 | 0.875 | 0.402 |
| Ex. 55 | Ex. 40 | 2154 | 0.874 | 0.399 |

TABLE 10

| | | Properties of coating film | | |
|---|---|---|---|---|
| | Particles treated | Coercive force Hc (Oe) | Squareness (Br/Bm) (−) | S.F.D. (−) |
| Ex. 56 | Ex. 41 | 2231 | 0.871 | 0.394 |
| Ex. 57 | Ex. 42 | 2348 | 0.868 | 0.398 |
| Ex. 58 | Ex. 43 | 2054 | 0.890 | 0.378 |
| Ex. 59 | Ex. 44 | 2034 | 0.874 | 0.401 |
| Ex. 60 | Ex. 45 | 2015 | 0.860 | 0.422 |
| Comp. Ex. 22 | Comp. Ex. 15 | 1894 | 0.854 | 0.471 |
| Comp. Ex. 23 | Comp. Ex. 16 | 1763 | 0.834 | 0.497 |
| Comp. Ex. 24 | Comp. Ex. 17 | 1869 | 0.844 | 0.484 |
| Comp. Ex. 25 | Comp. Ex. 18 | 1798 | 0.833 | 0.501 |
| Comp. Ex. 26 | Comp. Ex. 19 | 1834 | 0.838 | 0.483 |
| Comp. Ex. 27 | Comp. Ex. 20 | 1886 | 0.851 | 0.472 |
| Comp. Ex. 28 | Comp. Ex. 21 | 1839 | 0.859 | 0.546 |

TABLE 11

Production of goethite particles

| | Aqueous alkali carbonate solution | | Aqueous alkali hydroxide solution | | |
|---|---|---|---|---|---|
| | Kind | Amount (mol/20 liter) | Kind | Amount (mol/10 liter) | *Time for addition |
| Ex. 61 | Na$_2$CO$_3$ | 25 | NaOH | 15 | A |
| Ex. 62 | Na$_2$CO$_3$ | 23 | NaOH | 10 | B |
| Ex. 63 | Na$_2$CO$_3$ | 23 | NaOH | 10 | A |
| Ex. 64 | Na$_2$CO$_3$ | 23 | NaOH | 14 | A |
| Ex. 65 | Na$_2$CO$_3$ | 25 | NaOH | 15 | A |
| Ex. 66 | Na$_2$CO$_3$ | 25 | NaOH | 15 | A |
| Ex. 67 | Na$_2$CO$_3$ | 25 | NaOH | 15 | A |
| Ex. 68 | Na$_2$CO$_3$ | 25 | NaOH | 15 | A |
| Ex. 69 | Na$_2$CO$_3$ | 25 | NaOH | 15 | A |
| Ex. 70 | Na$_2$CO$_3$ | 25 | NaOH | 15 | A |
| Ex. 71 | Na$_2$CO$_3$ | 25 | NaOH | 15 | A |
| Ex. 72 | Na$_2$CO$_3$ | 25 | NaOH | 15 | A |
| Ex. 73 | Na$_2$CO$_3$ | 25 | NaOH | 15 | A |

| | NaOH/Na$_2$CO$_3$ (Molar ratio) | Aqueous ferrous salt solution | |
|---|---|---|---|
| | | Kind | Amount (mol/20 liter) |
| Ex. 61 | 0.60 | FeSO$_4$ | 20 |
| Ex. 62 | 0.43 | FeSO$_4$ | 20 |
| Ex. 63 | 0.43 | FeSO$_4$ | 20 |
| Ex. 64 | 0.61 | FeSO$_4$ | 20 |
| Ex. 65 | 0.60 | FeSO$_4$ | 20 |
| Ex. 66 | 0.60 | FeSO$_4$ | 20 |
| Ex. 67 | 0.60 | FeSO$_4$ | 20 |
| Ex. 68 | 0.60 | FeSO$_4$ | 20 |
| Ex. 69 | 0.60 | FeSO$_4$ | 20 |
| Ex. 70 | 0.60 | FeSO$_4$ | 20 |
| Ex. 71 | 0.60 | FeSO$_4$ | 20 |
| Ex. 72 | 0.60 | FeSO$_4$ | 20 |
| Ex. 73 | 0.60 | FeSO$_4$ | 20 |

TABLE 11-continued

Production of goethite particles

| | Equi-molar ratio | Aging | |
|---|---|---|---|
| | Total amount of alkali/Total Fe | Temperature (° C.) | Time (hr) |
| Ex. 61 | 1.63 | 47 | 5 |
| Ex. 62 | 1.40 | 50 | 5 |
| Ex. 63 | 1.40 | 47 | 5 |
| Ex. 64 | 1.50 | 47 | 5 |
| Ex. 65 | 1.63 | 47 | 5 |
| Ex. 66 | 1.63 | 53 | 5 |
| Ex. 67 | 1.63 | 47 | 5 |
| Ex. 68 | 1.63 | 47 | 5 |
| Ex. 69 | 1.63 | 47 | 5 |
| Ex. 70 | 1.63 | 47 | 5 |
| Ex. 71 | 1.63 | 47 | 5 |
| Ex. 72 | 1.63 | 47 | 3 |
| Ex. 73 | 1.63 | 50 | 5 |

| | Co compound | | | Oxidation |
|---|---|---|---|---|
| | Kind | Amount (atm %) | **Time for addition | temperature (° C.) |
| Ex. 61 | CoSO$_4$ | 3.0 | C | 47 |
| Ex. 62 | CoSO$_4$ | 1.5 | D | 50 |
| Ex. 63 | CoSO$_4$ | 1.5 | E | 47 |
| Ex. 64 | CoSO$_4$ | 3.0 | C | 47 |
| Ex. 65 | CoSO$_4$ | 3.0 | C | 47 |
| Ex. 66 | CoSO$_4$ | 6.0 | C | 53 |
| Ex. 67 | CoSO$_4$ | 3.0 | C | 47 |
| Ex. 68 | CoSO$_4$ | 3.0 | C | 47 |
| Ex. 69 | CoSO$_4$ | 3.0 | C | 47 |
| Ex. 70 | CoSO$_4$ | 3.0 | C | 47 |
| Ex. 71 | CoSO$_4$ | 3.0 | C | 47 |
| Ex. 72 | CoSO$_4$ | 4.5 | C | 47 |
| Ex. 73 | CoSO$_4$ | 6.0 | C | 47 |

*Time for addition of aqueous alkali hydroxide solution:
A: Add to aqueous alkali carbonate solution
B: Add to suspension containing an Fe-containing precipitate
**Time for addition of Co compound:
C: Add to suspension in process of aging 10 minutes before the start of oxidation
D: Add to aqueous ferrous salt solution
E: Add to suspension containing Fe-containing precipitate before aging

TABLE 12

Production of goethite particles

| | Aqueous alkali carbonate solution | | Aqueous alkali hydroxide solution | | |
|---|---|---|---|---|---|
| | Kind | Amount (mol/20 liter) | Kind | Amount (mol/10 liter) | *Time for addition |
| Ex. 74 | Na$_2$CO$_3$ | 25 | NaOH | 15 | A |
| Ex. 75 | Na$_2$CO$_3$ | 25 | NaOH | 15 | A |
| Comp. Ex. 29 | Na$_2$CO$_3$ | 41 | NaOH | 16 | A |
| Comp. Ex. 30 | Na$_2$CO$_3$ | 41 | — | — | — |
| Comp. Ex. 31 | Na$_2$CO$_3$ | 23 | NaOH | 35 | A |
| Comp. Ex. 32 | Na$_2$CO$_3$ | 25 | NaOH | 15 | A |
| Comp. Ex. 33 | Na$_2$CO$_3$ | 23 | NaOH | 10 | A |
| Comp. Ex. 34 | Na$_2$CO$_3$ | 25 | NaOH | 15 | A |

TABLE 12-continued

Production of goethite particles

| | | | | |
|---|---|---|---|---|
| Comp. Ex. 35 | Na$_2$CO$_3$ | 25 | NaOH | 15 | A |
| Comp. Ex. 36 | Na$_2$CO$_3$ | 25 | NaOH | 15 | A |
| Comp. Ex. 37 | — | — | NaOH | 80 | — |
| Comp. Ex. 38 | Na$_2$CO$_3$ | 23 | NaOH | 10 | A |

Aqueous ferrous salt solution

| | NaOH/Na$_2$CO$_3$ (Molar ratio) | Kind | Amount (mol/20 liter) |
|---|---|---|---|
| Ex. 74 | 0.60 | FeSO$_4$ | 20 |
| Ex. 75 | 0.60 | FeSO$_4$ | 20 |
| Comp. Ex. 29 | 0.39 | FeSO$_4$ | 20 |
| Comp. Ex. 30 | — | FeSO$_4$ | 20 |
| Comp. Ex. 31 | 1.52 | FeSO$_4$ | 20 |
| Comp. Ex. 32 | 0.60 | FeSO$_4$ | 20 |
| Comp. Ex. 33 | 0.43 | FeSO$_4$ | 20 |
| Comp. Ex. 34 | 0.60 | FeSO$_4$ | 20 |
| Comp. Ex. 35 | 0.60 | FeSO$_4$ | 20 |
| Comp. Ex. 36 | 0.60 | FeSO$_4$ | 20 |
| Comp. Ex. 37 | — | FeSO$_4$ | 20 |
| Comp. Ex. 38 | 0.43 | FeSO$_4$ | 20 |

| | Equi-molar ratio | Aging | |
|---|---|---|---|
| | Total amount of alkali/Total Fe | Temperature (° C.) | Time (hr) |
| Ex. 74 | 1.63 | 50 | 3 |
| Ex. 75 | 1.63 | 50 | 3 |
| Comp. Ex. 29 | 2.45 | 47 | 5 |
| Comp. Ex. 30 | 2.05 | 47 | 5 |
| Comp. Ex. 31 | 2.03 | 47 | 5 |
| Comp. Ex. 32 | 1.63 | — | — |
| Comp. Ex. 33 | 1.40 | 47 | 5 |
| Comp. Ex. 34 | 1.63 | 47 | 5 |
| Comp. Ex. 35 | 1.63 | 47 | 5 |
| Comp. Ex. 36 | 1.63 | 47 | 5 |
| Comp. Ex. 37 | 2.00 | — | — |
| Comp. Ex. 38 | 1.40 | 47 | 5 |

| | Co compound | | | Oxidation temperature (° C.) |
|---|---|---|---|---|
| | Kind | Amount (atm %) | **Time for addition | |
| Ex. 74 | CoSO$_4$ | 6.0 | C | 47 |
| Ex. 75 | CoSO$_4$ | 6.0 | C | 47 |
| Comp. Ex. 29 | CoSO$_4$ | 3.0 | D | 47 |
| Comp. Ex. 30 | CoSO$_4$ | 3.0 | D | 47 |
| Comp. Ex. 31 | CoSO$_4$ | 3.0 | C | 47 |
| Comp. Ex. 32 | CoSO$_4$ | 3.0 | C | 47 |
| Comp. Ex. 33 | NiSO$_4$ | 1.5 | E | 47 |
| Comp. Ex. 34 | CoSO$_4$ | 3.0 | C | 47 |
| Comp. Ex. 35 | CoSO$_4$ | 3.0 | C | 47 |
| Comp. Ex. 36 | — | — | — | 47 |
| Comp. Ex. 37 | CoSO$_4$ | 3.0 | D | 40 |
| Comp. Ex. 38 | CoSO$_4$ | 1.5 | E | 47→57 |

*Time for addition of aqueous alkali hydroxide solution
A: Add to aqueous alkali carbonate solution
B: Add to suspension containing an Fe-containing precipitate
**Time for addition of Co compound
C: Add to suspension in process of aging 10 minutes before the start of oxidation
D: Add to aqueous ferrous salt solution
E: Add to suspension containing Fe-containing precipitate before aging

TABLE 13

Production of goethite particles

Compound added to liquid in process of oxidation

| | Oxidation ratio (Time of addition) (%) | Kind | Calculated as | Amount (atm %) |
|---|---|---|---|---|
| Ex. 61 | 80 | Aluminum sulfate | Al | 3.0 |
| Ex. 62 | — | — | — | — |
| Ex. 63 | — | — | — | — |
| Ex. 64 | — | — | — | — |
| Ex. 65 | — | — | — | — |
| Ex. 66 | — | — | — | — |
| Ex. 67 | 80 | Aluminum sulfate | Al | 1.5 |
| Ex. 68 | 80 | Water glass #3 | Si | 1.0 |
| Ex. 69 | 80 | Water glass #3 | Si | 2.5 |
| Ex. 70 | 80 | Calcium nitrate | Ca | 1.0 |
| Ex. 71 | 80 | Neodymium nitrate | Nd | 0.5 |
| Ex. 72 | 75 | Aluminum sulfate | Al | 1.5 |
| | | Water glass #3 | Si | 2.5 |
| Ex. 73 | 70 | Aluminum sulfate | Al | 1.5 |
| | | Water glass #3 | Si | 1.0 |

| | Oxidation time (minute) | Shape | Major axial diameter (μm) | Minor axial diameter (μm) |
|---|---|---|---|---|
| Ex. 61 | 100 | Spindle-shaped | 0.126 | 0.015 |
| Ex. 62 | 105 | Spindle-shaped | 0.182 | 0.017 |
| Ex. 63 | 105 | Spindle-shaped | 0.156 | 0.016 |
| Ex. 64 | 100 | Spindle-shaped | 0.130 | 0.015 |
| Ex. 65 | 100 | Spindle-shaped | 0.128 | 0.015 |
| Ex. 66 | 90 | Spindle-shaped | 0.122 | 0.015 |
| Ex. 67 | 100 | Spindle-shaped | 0.129 | 0.015 |
| Ex. 68 | 100 | Spindle-shaped | 0.121 | 0.014 |

TABLE 13-continued

Production of goethite particles

| | | | | |
|---|---|---|---|---|
| Ex. 69 | 100 | Spindle-shaped | 0.118 | 0.014 |
| Ex. 70 | 100 | Spindle-shaped | 0.130 | 0.015 |
| Ex. 71 | 100 | Spindle-shaped | 0.125 | 0.014 |
| Ex. 72 | 90 | Spindle-shaped | 0.104 | 0.013 |
| Ex. 73 | 90 | Spindle-shaped | 0.083 | 0.012 |

| | | Other compound | | Major axis diameter | Standard |
|---|---|---|---|---|---|
| | Aspect ratio (−) | Co content (atm %) | Calculated as | Content (atm %) | standard deviation (×10⁻¹ μm) | deviation/ major axis diameter |
| Ex. 61 | 8.4 | 3.04 | Al | 2.95 | 0.270 | 0.214 |
| Ex. 62 | 10.7 | 1.59 | — | — | 0.417 | 0.229 |
| Ex. 63 | 9.8 | 1.60 | — | — | 0.368 | 0.236 |
| Ex. 64 | 8.7 | 3.06 | — | — | 0.270 | 0.208 |
| Ex. 65 | 8.5 | 3.06 | — | — | 0.262 | 0.205 |
| Ex. 66 | 8.1 | 6.10 | — | — | 0.259 | 0.212 |
| Ex. 67 | 8.6 | 3.09 | Al | 1.48 | 0.268 | 0.208 |
| Ex. 68 | 8.6 | 3.10 | Si | 0.98 | 0.261 | 0.216 |
| Ex. 69 | 8.4 | 3.12 | Si | 2.43 | 0.244 | 0.207 |
| Ex. 70 | 8.7 | 3.05 | Ca | 0.64 | 0.283 | 0.218 |
| Ex. 71 | 9.6 | 3.11 | Nd | 0.47 | 0.274 | 0.219 |
| Ex. 72 | 8.0 | 4.45 | Al Si | 1.47 2.40 | 0.214 | 0.206 |
| Ex. 73 | 6.9 | 6.05 | Al Si | 1.50 0.97 | 0.164 | 0.197 |

TABLE 14

Production of goethite particles

Compound added to liquid in process of oxidation

| | Oxidation ratio (Time of addition) (%) | Kind | Calculated as | Amount (atm %) |
|---|---|---|---|---|
| Ex. 74 | 70 | Aluminum sulfate | Al | 2.0 |
| | | Water glass #3 | Si | 2.0 |
| | | Calcium nitrate | Ca | 1.0 |
| Ex. 75 | 70 | Aluminum sulfate | Al | 1.5 |
| | | Neodymium nitrate | Nd | 0.5 |
| Comp. Ex. 29 | — | — | — | — |
| Comp. Ex. 30 | — | — | — | — |
| Comp. Ex. 31 | — | — | — | — |
| Comp. Ex. 32 | — | — | — | — |
| Comp. Ex. 33 | — | — | — | — |
| Comp. Ex. 34 | 35 | Water glass #3 | Si | 1.0 |
| Comp. Ex. 35 | 35 | Aluminum sulfate | Al | 1.5 |
| Comp. Ex. 36 | — | — | — | — |
| Comp. Ex. 37 | — | — | — | — |
| Comp. Ex. 38 | 80 | Water glass #3 | Si | 1.0 |

TABLE 14-continued

Production of goethite particles

| | Oxidation time (minute) | Shape | Major axial diameter (μm) | Minor axial diameter (μm) |
|---|---|---|---|---|
| Ex. 74 | 90 | Spindle-shaped | 0.120 | 0.014 |
| Ex. 75 | 90 | Spindle-shaped | 0.117 | 0.014 |
| Comp. Ex. 29 | 100 | Spindle-shaped | 0.169 | 0.022 |
| Comp. Ex. 30 | 100 | Spindle-shaped | 0.163 | 0.023 |
| Comp. Ex. 31 | 100 | Granular | — | — |
| Comp. Ex. 32 | 100 | Spindle-shaped | 0.138 | 0.025 |
| Comp. Ex. 33 | 90 | Spindle-shaped | 0.097 | 0.018 |
| Comp. Ex. 34 | 100 | Spindle-shaped | 0.095 | 0.016 |
| Comp. Ex. 35 | 100 | Spindle-shaped | 0.102 | 0.017 |
| Comp. Ex. 36 | 115 | Spindle-shaped | 0.308 | 0.033 |
| Comp. Ex. 37 | 145 | Acicular | 0.192 | 0.017 |
| Comp. Ex. 38 | 105 | Spindle-shaped | 0.153 | 0.023 |

| | | | Aspect ratio | | Major axis diameter | Standard |
|---|---|---|---|---|---|---|
| | Aspect ratio (−) | Co content (atm %) | Calculated as | Content (atm %) | standard deviation (×10⁻¹ μm) | deviation/ major axis diameter |
| Ex. 74 | 8.6 | 6.11 | Al Si Ca | 1.98 1.94 0.62 | 0.241 | 0.201 |
| Ex. 75 | 8.4 | 6.09 | Al Nd | 1.49 0.48 | 0.255 | 0.218 |
| Comp. Ex. 29 | 7.7 | 3.02 | — | — | 0.414 | 0.245 |
| Comp. Ex. 30 | 7.1 | 3.05 | — | — | 0.417 | 0.256 |
| Comp. Ex. 31 | — | 3.05 | — | — | — | — |
| Comp. Ex. 32 | 5.5 | 2.98 | — | — | 0.319 | 0.231 |
| Comp. Ex. 33 | 5.4 | — | — | — | 0.235 | 0.242 |
| Comp. Ex. 34 | 5.9 | 3.06 | Si | 0.96 | 0.208 | 0.219 |
| Comp. Ex. 35 | 6.0 | 3.10 | Al | 1.51 | 0.240 | 0.235 |
| Comp. Ex. 36 | 9.3 | — | — | — | 0.853 | 0.277 |
| Comp. Ex. 37 | 11.3 | 3.01 | — | — | 0.916 | 0.477 |
| Comp. Ex. 38 | 6.7 | 1.60 | Si | 0.97 | 0.369 | 0.241 |

TABLE 15

Production of hematite particles

| | Sintering preventing treatment | | |
|---|---|---|---|
| | Particles treated | Kind | Amount (wt %) |
| Ex. 76 | Ex. 61 | Cobalt acetate tetrahydrate | 10 |
| Ex. 77 | Ex. 62 | Cobalt acetate tetrahydrate | 14 |
| Ex. 78 | Ex. 63 | Cobalt acetate tetrahydrate | 14 |
| Ex. 79 | Ex. 65 | Cobalt acetate tetrahydrate | 10 |
| Ex. 80 | Ex. 67 | Cobalt acetate tetrahydrate | 10 |
| Ex. 81 | Ex. 68 | Cobalt acetate tetrahydrate | 10 |
| Ex. 82 | Ex. 69 | Cobalt nitrate hexahydrate | 12 |
| Ex. 83 | Ex. 70 | Cobalt acetate tetrahydrate | 10 |
| Ex. 84 | Ex. 71 | Cobalt nitrate hexahydrate | 12 |
| Ex. 85 | Ex. 72 | — | — |
| Ex. 86 | Ex. 73 | — | — |
| Ex. 87 | Ex. 74 | — | — |
| Ex. 88 | Ex. 75 | — | — |

| | Sintering preventing treatment | | |
|---|---|---|---|
| | Kind | Amount (wt %) | Kind |
| Ex. 76 | — | — | Boric acid |
| Ex. 77 | Aluminum nitrate nonahydrate | 10 | Boric acid |
| Ex. 78 | Aluminum nitrate nonahydrate | 10 | Boric acid |
| Ex. 79 | Aluminum nitrate nonahydrate | 10 | Boric acid |
| Ex. 80 | Aluminum nitrate nonahydrate | 5 | Boric acid |
| Ex. 81 | Aluminum nitrate nonahydrate | 10 | Boric acid |
| Ex. 82 | Aluminum nitrate nonahydrate | 10 | Neodymium nitrate hexahydrate |
| Ex. 83 | Aluminum nitrate nonahydrate | 10 | Boric acid |
| Ex. 84 | Aluminum nitrate nonahydrate | 10 | Water glass #3 |
| Ex. 85 | — | — | — |
| Ex. 86 | Aluminum nitrate nonahydrate | 5 | Boric acid |
| Ex. 87 | Aluminum nitrate nonahydrate | 2.5 | Neodymium nitrate hexahydrate |
| Ex. 88 | Aluminum nitrate nonahydrate | 5 | Boric acid |

| | Sintering preventing treatment Amount (wt %) | Dehydration temperature (° C.) | Annealing temperature (° C.) |
|---|---|---|---|
| Ex. 76 | 15 | 400 | — |
| Ex. 77 | 17 | 400 | — |
| Ex. 78 | 17 | 400 | — |
| Ex. 79 | 17 | 400 | — |
| Ex. 80 | 15 | 400 | — |
| Ex. 81 | 15 | 400 | — |
| Ex. 82 | 6 | 300 | 700 |
| Ex. 83 | 15 | 400 | — |
| Ex. 84 | 8 | 300 | 700 |
| Ex. 85 | — | 300 | 700 |
| Ex. 86 | 15 | 400 | — |
| Ex. 87 | 6 | 300 | 700 |
| Ex. 88 | 15 | 400 | — |

TABLE 16

Production of hematite particles

| | Sintering preventing treatment | | |
|---|---|---|---|
| | Particles treated | Kind | Amount (wt %) |
| Comp. Ex. 39 | Comp. Ex. 29 | Cobalt acetate tetrahydrate | 10 |
| Comp. Ex. 40 | Comp. Ex. 30 | Cobalt acetate tetrahydrate | 10 |
| Comp. Ex. 41 | Comp. Ex. 32 | Cobalt acetate tetrahydrate | 10 |
| Comp. Ex. 42 | Comp. Ex. 33 | Cobalt acetate tetrahydrate | 20 |
| Comp. Ex. 43 | Comp. Ex. 34 | Cobalt acetate tetrahydrate | 10 |
| Comp. Ex. 44 | Comp. Ex. 35 | Cobalt acetate tetrahydrate | 10 |
| Comp. Ex. 45 | Comp. Ex. 36 | Cobalt acetate tetrahydrate | 10 |
| Comp. Ex. 46 | Comp. Ex. 37 | Cobalt acetate tetrahydrate | 10 |
| Comp. Ex. 47 | Comp. Ex. 38 | Cobalt acetate tetrahydrate | 14 |

| | Sintering preventing treatment | | |
|---|---|---|---|
| | Kind | Amount (wt %) | Kind |
| Comp. Ex. 39 | Aluminum nitrate nonahydrate | 10 | Boric acid |
| Comp. Ex. 40 | Aluminum nitrate nonahydrate | 10 | Boric acid |
| Comp. Ex. 41 | Aluminum nitrate nonahydrate | 10 | Boric acid |
| Comp. Ex. 42 | Aluminum nitrate nonahydrate | 10 | Boric acid |
| Comp. Ex. 43 | Aluminum nitrate nonahydrate | 10 | Boric acid |
| Comp. Ex. 44 | Aluminum nitrate nonahydrate | 5 | Boric acid |
| Comp. Ex. 45 | Aluminum nitrate nonahydrate | 10 | Boric acid |
| Comp. Ex. 46 | Aluminum nitrate nonahydrate | 10 | Boric acid |
| Comp. Ex. 47 | Aluminum nitrate nonahydrate | 10 | Boric acid |

Sintering

TABLE 16-continued

Production of hematite particles

| | preventing treatment Amount (wt %) | Dehydration temperature (° C.) | Annealing temperature (° C.) |
|---|---|---|---|
| Comp. Ex. 39 | 15 | 400 | — |
| Comp. Ex. 40 | 15 | 400 | — |
| Comp. Ex. 41 | 15 | 400 | — |
| Comp. Ex. 42 | 15 | 400 | — |
| Comp. Ex. 43 | 15 | 400 | — |
| Comp. Ex. 44 | 15 | 400 | — |
| Comp. Ex. 45 | 15 | 400 | — |
| Comp. Ex. 46 | 10 | 350 | — |
| Comp. Ex. 47 | 15 | 400 | — |

TABLE 17

Production of magnetic iron-based alloy particles containing cobalt and iron as the main ingredients

| | | Reduction | |
|---|---|---|---|
| | Particles treated | Temperature (° C.) | Time (hr) |
| Ex. 89 | Ex. 76 | 420 | 8.0 |
| Ex. 90 | Ex. 77 | 400 | 8.5 |
| Ex. 91 | Ex. 78 | 400 | 9.0 |
| Ex. 93 | Ex. 79 | 400 | 10.5 |
| Ex. 93 | Ex. 80 | 420 | 8.5 |
| Ex. 94 | Ex. 81 | 420 | 9.5 |
| Ex. 95 | Ex. 82 | 440 | 5.5 |
| Ex. 96 | Ex. 83 | 420 | 9.0 |
| Ex. 97 | Ex. 84 | 440 | 6.0 |
| Ex. 98 | Ex. 85 | 420 | 8.0 |
| Ex. 99 | Ex. 86 | 420 | 9.0 |
| Ex. 100 | Ex. 87 | 440 | 5.0 |
| Ex. 101 | Ex. 88 | 420 | 9.0 |

Production of magnetic iron-based alloy particles containing cobalt and iron as the main ingredients
Properties of magnetic iron-based alloy particles containing cobalt and iron as the main ingredients

| | X-ray crystallite size $D_{110}$ (Å) | Major axial diameter ($\mu$m) | Minor axial diameter ($\mu$m) |
|---|---|---|---|
| Ex. 89 | 146 | 0.096 | 0.014 |
| Ex. 90 | 155 | 0.135 | 0.016 |
| Ex. 91 | 153 | 0.118 | 0.015 |
| Ex. 92 | 150 | 0.099 | 0.014 |
| Ex. 93 | 147 | 0.097 | 0.014 |
| Ex. 94 | 142 | 0.089 | 0.013 |
| Ex. 95 | 140 | 0.088 | 0.013 |
| Ex. 96 | 144 | 0.098 | 0.014 |
| Ex. 97 | 140 | 0.093 | 0.013 |
| Ex. 98 | 140 | 0.078 | 0.012 |
| Ex. 99 | 135 | 0.062 | 0.011 |
| Ex. 100 | 138 | 0.091 | 0.013 |
| Ex. 101 | 142 | 0.088 | 0.013 |

Production of magnetic iron-based alloy particles containing cobalt and iron as the main ingredients TABLE 17-continued Properties of magnetic iron-based alloy particles containing cobalt and iron as the main ingredients

| | Aspect ratio (—) | Coercive force Hc (Oe) | Saturation magnetization $\sigma_s$ (emu/g) | Squareness ($\sigma_r/\sigma_s$) (—) | $\Delta\sigma_s$ (%) |
|---|---|---|---|---|---|
| Ex. 89 | 6.9 | 1847 | 121 | 0.508 | 10 |
| Ex. 90 | 8.4 | 1726 | 122 | 0.512 | 9 |
| Ex. 91 | 7.9 | 1763 | 120 | 0.512 | 11 |
| Ex. 92 | 7.1 | 1772 | 118 | 0.510 | 12 |
| Ex. 93 | 6.9 | 1833 | 121 | 0.510 | 10 |
| Ex. 94 | 6.8 | 1906 | 118 | 0.512 | 13 |
| Ex. 95 | 6.7 | 1802 | 117 | 0.515 | 13 |
| Ex. 96 | 7.0 | 1820 | 119 | 0.513 | 12 |
| Ex. 97 | 7.2 | 1838 | 120 | 0.516 | 13 |
| Ex. 98 | 6.5 | 1809 | 122 | 0.505 | 12 |
| Ex. 99 | 5.6 | 1984 | 115 | 0.516 | 11 |
| Ex. 100 | 7.0 | 1820 | 121 | 0.515 | 11 |
| Ex. 101 | 6.8 | 1881 | 120 | 0.510 | 11 |

| | Size distribution | | Amount of the elements |
|---|---|---|---|
| | Major axis diameter standard deviation ($\times 10^{-1}$ $\mu$m) | Standard deviation/ major axis diameter | contained in goethite reaction Co content (atm %) |
| Ex. 89 | 0.190 | 0.198 | 3.04 |
| Ex. 90 | 0.285 | 0.211 | 1.59 |
| Ex. 91 | 0.251 | 0.213 | 1.60 |
| Ex. 92 | 0.188 | 0.190 | 3.06 |
| Ex. 93 | 0.185 | 0.191 | 3.09 |
| Ex. 94 | 0.176 | 0.198 | 3.10 |
| Ex. 95 | 0.169 | 0.192 | 3.12 |
| Ex. 96 | 0.194 | 0.198 | 3.05 |
| Ex. 97 | 0.187 | 0.201 | 3.11 |
| Ex. 98 | 0.150 | 0.192 | 4.45 |
| Ex. 99 | 0.114 | 0.184 | 6.05 |
| Ex. 100 | 0.173 | 0.190 | 6.11 |
| Ex. 101 | 0.174 | 0.198 | 6.09 |

| | Amount of the elements contained in goethite reaction | | |
|---|---|---|---|
| | Si content (atm %) | Al content (atm %) | Ca content (atm %) |
| Ex. 89 | — | 2.95 | — |
| Ex. 90 | — | — | — |
| Ex. 91 | — | — | — |
| Ex. 92 | — | — | — |
| Ex. 93 | — | 1.48 | — |
| Ex. 94 | 0.98 | — | — |
| Ex. 95 | 2.43 | — | — |
| Ex. 96 | — | — | 0.64 |
| Ex. 97 | — | — | — |
| Ex. 98 | 2.40 | 1.47 | — |
| Ex. 99 | 0.97 | 1.50 | — |
| Ex. 100 | 1.94 | 1.98 | 0.62 |
| Ex. 101 | — | 1.49 | — |

| | Amount of the elements contained in goethite reaction | Amount of elements coated | |
|---|---|---|---|
| | Element (atm %) | Co (atm %) | Si (atm %) |
| Ex. 89 | — | 2.21 | — |
| Ex. 90 | — | 3.09 | — |
| Ex. 91 | — | 3.11 | — |
| Ex. 92 | — | 2.20 | — |
| Ex. 93 | — | 2.21 | — |
| Ex. 94 | — | 2.19 | — |
| Ex. 95 | — | 2.23 | — |
| Ex. 96 | — | 2.25 | — |
| Ex. 97 | Nd: 0.47 | 2.20 | 4.72 |

TABLE 17-continued

| | Al (atm %) | Rare earth element & Amount (atm %) | B (atm %) |
|---|---|---|---|
| Ex. 98 | — | — | — |
| Ex. 99 | — | — | — |
| Ex. 100 | — | — | — |
| Ex. 101 | Nd: 0.48 | — | — |

Amount of elements coated

| | Al (atm %) | Rare earth element & Amount (atm %) | B (atm %) |
|---|---|---|---|
| Ex. 89 | — | — | 12.2 |
| Ex. 90 | 2.92 | — | 13.0 |
| Ex. 91 | 2.96 | — | 12.8 |
| Ex. 92 | 2.87 | — | 13.1 |
| Ex. 93 | 1.47 | — | 12.8 |
| Ex. 94 | 2.90 | — | 12.7 |
| Ex. 95 | 2.93 | Nd: 1.42 | — |
| Ex. 96 | 2.84 | — | 12.5 |
| Ex. 97 | 2.88 | — | — |
| Ex. 98 | — | — | — |
| Ex. 99 | 1.42 | — | 12.4 |
| Ex. 100 | 0.94 | Nd: 1.44 | — |
| Ex. 101 | 1.40 | — | 12.6 |

TABLE 18

Production of magnetic iron-based alloy particles containing cobalt and iron as the main ingredients

| | Particles treated | Reduction Temperature (° C.) | Time (hr) |
|---|---|---|---|
| Comp. Ex. 48 | Comp. Ex. 39 | 400 | 8.0 |
| Comp. Ex. 49 | Comp. Ex. 40 | 400 | 8.0 |
| Comp. Ex. 50 | Comp. Ex. 41 | 400 | 8.0 |
| Comp. Ex. 51 | Comp. Ex. 42 | 400 | 9.0 |
| Comp. Ex. 52 | Comp. Ex. 43 | 420 | 8.5 |
| Comp. Ex. 53 | Comp. Ex. 44 | 420 | 8.0 |
| Comp. Ex. 54 | Comp. Ex. 45 | 400 | 7.5 |
| Comp. Ex. 55 | Comp. Ex. 46 | 430 | 6.5 |
| Comp. Ex. 56 | Comp. Ex. 47 | 420 | 8.5 |

Production of magnetic iron-based alloy particles containing cobalt and iron as the main ingredients
Properties of magnetic iron-based alloy particles containing cobalt and iron as the main ingredients

| | X-ray crystallite size $D_{110}$ (Å) | Major axial diameter (μm) | Minor axial diameter (μm) |
|---|---|---|---|
| Comp. Ex. 48 | 160 | 0.126 | 0.021 |
| Comp. Ex. 49 | 161 | 0.122 | 0.022 |
| Comp. Ex. 50 | 178 | 0.104 | 0.024 |
| Comp. Ex. 51 | 153 | 0.074 | 0.017 |
| Comp. Ex. 52 | 155 | 0.071 | 0.015 |
| Comp. Ex. 53 | 156 | 0.077 | 0.016 |
| Comp. Ex. 54 | 183 | 0.230 | 0.031 |
| Comp. Ex. 55 | 152 | 0.140 | 0.016 |
| Comp. Ex. 56 | 164 | 0.116 | 0.022 |

Production of magnetic iron-based alloy particles containing cobalt and iron as the main ingredients
Properties of magnetic iron-based alloy particles containing cobalt and iron as the main ingredients

| | Aspect ratio (—) | Coercive force Hc (Oe) | Saturation magnetization $\sigma_s$ (emu/g) | Squareness $(\sigma_r/\sigma_s)$ (—) | $\Delta\sigma_s$ (%) |
|---|---|---|---|---|---|
| Comp. Ex. 48 | 6.0 | 1504 | 122 | 0.498 | 19 |
| Comp. Ex. 49 | 5.5 | 1481 | 123 | 0.496 | 19 |
| Comp. Ex. 50 | 4.3 | 1473 | 125 | 0.493 | 18 |
| Comp. Ex. 51 | 4.4 | 1427 | 116 | 0.485 | 23 |
| Comp. Ex. 52 | 4.7 | 1550 | 118 | 0.491 | 22 |
| Comp. Ex. 53 | 4.8 | 1526 | 118 | 0.490 | 22 |
| Comp. Ex. 54 | 7.4 | 1443 | 131 | 0.490 | 20 |
| Comp. Ex. 55 | 8.8 | 1742 | 121 | 0.521 | 23 |
| Comp. Ex. 56 | 5.3 | 1648 | 123 | 0.499 | 19 |

| | Size distribution | | Amount of the elements contained in goethite reaction Co content (atm %) |
|---|---|---|---|
| | Major axis diameter standard deviation ($\times 10^{-1}$ μm) | Standard deviation/ major axis diameter | |
| Comp. Ex. 48 | 0.280 | 0.222 | 3.02 |
| Comp. Ex. 49 | 0.279 | 0.229 | 3.05 |
| Comp. Ex. 50 | 0.216 | 0.208 | 2.98 |
| Comp. Ex. 51 | 0.164 | 0.222 | — |
| Comp. Ex. 52 | 0.143 | 0.201 | 3.06 |
| Comp. Ex. 53 | 0.164 | 0.213 | 3.10 |
| Comp. Ex. 54 | 0.579 | 0.252 | — |
| Comp. Ex. 55 | 0.604 | 0.431 | 3.01 |
| Comp. Ex. 56 | 0.257 | 0.222 | 1.60 |

Amount of the elements contained in goethite reaction

| | Si content (atm %) | Al content (atm %) |
|---|---|---|
| Comp. Ex. 48 | — | — |
| Comp. Ex. 49 | — | — |
| Comp. Ex. 50 | — | — |
| Comp. Ex. 51 | — | — |
| Comp. | 0.96 | |

TABLE 18-continued

| | | |
|---|---|---|
| Ex. 52 Comp. Ex. 53 | — | 1.51 |
| Comp. Ex. 54 | — | — |
| Comp. Ex. 55 | — | — |
| Comp. Ex. 56 | 0.97 | — |

| | Amount of elements coated | | |
|---|---|---|---|
| | Co (atm %) | Al (atm %) | B (atm %) |
| Comp. Ex. 48 | 2.19 | 2.87 | 12.0 |
| Comp. Ex. 49 | 2.25 | 2.90 | 11.8 |
| Comp. Ex. 50 | 2.22 | 2.81 | 12.1 |
| Comp. Ex. 51 | 4.38 | 2.88 | 12.3 |
| Comp. Ex. 52 | 2.23 | 2.95 | 12.5 |
| Comp. Ex. 53 | 2.20 | 1.47 | 11.9 |
| Comp. Ex. 54 | 2.15 | 2.84 | 12.4 |
| Comp. Ex. 55 | 2.18 | 2.93 | 12.1 |
| Comp. Ex. 56 | 3.06 | 2.89 | 12.1 |

TABLE 19

| | | Properties of coating film | | |
|---|---|---|---|---|
| | Particles treated | Coercive force Hc (Oe) | Squareness (Br/Bm) (-) | S.F.D. (-) |
| Ex. 102 | Ex. 89 | 1903 | 0.891 | 0.440 |
| Ex. 103 | Ex. 91 | 1818 | 0.898 | 0.452 |
| Ex. 104 | Ex. 94 | 1967 | 0.873 | 0.463 |
| Ex. 105 | Ex. 97 | 1875 | 0.883 | 0.462 |
| Ex. 106 | Ex. 99 | 2038 | 0.862 | 0.489 |
| Comp. Ex. 57 | Comp. Ex. 49 | 1536 | 0.834 | 0.539 |
| Comp. Ex. 58 | Comp. Ex. 50 | 1524 | 0.829 | 0.574 |
| Comp. Ex. 59 | Comp. Ex. 51 | 1473 | 0.803 | 0.601 |
| Comp. Ex. 60 | Comp. Ex. 55 | 1761 | 0.875 | 0.598 |

What is claimed is:

1. A process for producing spindle-shaped magnetic iron-based alloy particles containing cobalt and iron as the main ingredients, which comprises steps of:

(a) adding an aqueous alkali hydroxide solution at 0.2 to 1.2 of molar ratio, to an aqueous alkali carbonate solution, and then adding the mixed solution to an aqueous ferrous salt solution to react said aqueous alkali carbonate solution and said aqueous alkali hydroxide solution with said aqueous ferrous salt solution, thereby obtaining a suspension containing an Fe-containing precipitate, (b) aging said suspension containing an Fe-containing precipitate in a non-oxidizing atmosphere at a temperature of 40 to 60° C. for 2 to 7 hours while stirring said suspension, (c) oxidizing the aged suspension of step (b) by introducing an oxygen-containing gas into said suspension to produce spindle-shaped goethite particles, (d) optionally heat dehydrating said spindle-shaped goethite particles to produce hematite particles, and (e) heat-treating the goethite particles or hematite particles in a reducing gas, wherein a Co compound at 1.0 to 50.0 atm %, calculated as Co, based on the total Fe in an aqueous ferrous salt solution, is added to said aqueous ferrous salt solution in step (a), to said suspension containing an Fe-containing precipitate in step (a), or said suspension in the process of aging step (b), and wherein a compound of at least one element selected from the group consisting of Al, Si, Ca, Mg, Ba, Sr, Nd, Y, La, Ce, Pr and Tb at 0.1 to 10.0 atm %, calculated as an element, based on the total Fe in said aqueous ferrous salt solution, is added to said aqueous ferrous salt solution in the oxidation step when the oxidation fraction, in terms of ferric/total iron percentage in solution in process of oxidation, is 20 to 90%.

2. A process for producing spindle-shaped magnetic iron-based alloy particles containing cobalt and iron as the main ingredients, which comprises the steps of:

(a) adding an aqueous alkali hydroxide solution at 0.2 to 1.2 of molar ratio, to an aqueous alkali carbonate solution, and then adding the mixed solution to an aqueous ferrous salt solution so that the ratio of (1/2× alkali hydroxide+alkali carbonate)/iron is 1.3 to 2.5, to react said aqueous alkali carbonate solution and said aqueous alkali hydroxide solution with said aqueous ferrous salt solution, thereby obtaining a suspension containing an Fe-containing precipitate, (b) aging the resultant suspension containing an Fe-containing precipitate from step (a) in a non-oxidizing atmosphere at a temperature of 40 to 60° C. for 2 to 7 hours while stirring said suspension, (c) oxidizing the aged suspension of step (b) by introducing an oxygen-containing gas into said suspension to produce spindle-shaped goethite particles, (d) optionally heat-dehydrating said spindle-shaped goethite particles, and (e) heat-treating said goethite particles or hematite particles in a reducing gas, wherein a compound of at least one element selected from the group consisting of Si, Nd, Y, La, Ce, Pr and Tb at 0.1 to 1.0 atm %, calculated as said element, based on the total Fe in said aqueous ferrous salt solution, is added to said aqueous ferrous salt solution, to said aqueous alkali carbonate solution, to said aqueous alkali hydroxide solution in step (a), or to said suspension containing an Fe-containing precipitate before aging step (b), and wherein a Co compound at 8.0 to 50.0 atm %, calculated as Co, based on the total Fe in said aqueous ferrous salt solution, is added to an aqueous ferrous salt solution, or said suspension containing an Fe-containing precipitate in step (a), or is added to said suspension in the process of aging step (b), and wherein a compound of at least one element selected from the group consisting of Al, Si, Nd, Y, La, Ce, Pr and Tb of 0.1 to 10.0 atm %, calculated as an element, based on the total Fe in said aqueous ferrous salt solution, to said aqueous ferrous salt solution in the process of oxidation when the oxidation fraction, in terms of ferric/total iron percentage in solution in process of said oxidation, is 20 to 50%.

3. A process for producing spindle-shaped magnetic iron-based alloy particles containing cobalt and iron as main ingredients, which comprises the steps of:

(a) adding an aqueous alkali hydroxide solution at 0.2 to 1.0 of molar ratio, to an aqueous alkali carbonate solution, and then adding the mixed solution to an aqueous ferrous salt solution so that the ratio of (1/2× alkali hydroxide+alkali carbonate)/iron is 1.3 to 1.8, to react said aqueous alkali carbonate solution and said aqueous alkali hydroxide solution with said aqueous ferrous salt solution, thereby obtaining a suspension containing an Fe-containing precipitate, (b) aging the resultant suspension containing an Fe-containing precipitate from step (a) in a non-oxidizing atmosphere at a temperature of 40 to 60° C. for 2 to 7 hours while stirring said suspension, (c) oxidizing the aged suspension of step (b) by introducing an oxygen-containing gas into said suspension at a temperature of 40 to 60° C. to produce spindle-shaped goethite particles, and (d) heat-dehydrating said spindle-shaped goethite particles in a reducing gas, wherein a Co compound of not less than 1.0 and less than 8.0 atm %, calculated as Co, based on the total Fe in said aqueous ferrous salt solution, is added to said aqueous ferrous salt solution, or to said suspension containing an Fe-containing precipitate in step (a) before aging, or is added to the aged suspension containing an Fe-containing precipitate prior to oxidation step (c).

4. A process for producing spindle-shaped magnetic iron-based alloy particles containing cobalt and iron as main ingredients, which comprises the steps of:

(a) adding an aqueous alkali hydroxide solution at 0.2 to 1.0 of molar ratio, to an aqueous alkali carbonate solution, and then adding the mixed solution to an aqueous ferrous salt solution so that the ratio of (1/2× alkali hydroxide+alkali carbonate)/iron is 1.3 to 1.8, to react said aqueous alkali carbonate solution and said aqueous alkali hydroxide solution with said aqueous ferrous salt solution, thereby obtaining a suspension containing an Fe-containing precipitate, (b) aging the resultant suspension containing an Fe-containing precipitate from step (a) in a non-oxidizing atmosphere at a temperature of 40 to 60° C. for 2 to 7 hours while stirring said suspension, (c) oxidizing the aged suspension of step (b) by introducing an oxygen-containing gas into said suspension at a temperature of 40 to 60° C. produce spindle-shaped goethite particles, (d) optionally heat-dehydrating said spindle-shaped goethite particles to produce spindle-shaped hematite particles, and (e) heat-treating said spindle-shaped goethite particles or spindle-shaped hematite particles in a reducing gas, wherein a Co compound at not less than 1.0 and less than 8.0 atm %, calculated as Co, based on the $Fe^{2+}$ in an aqueous ferrous salt solution, is added to an aqueous ferrous salt solution or said suspension containing an Fe-containing precipitate of step (a), or added the aged suspension containing an Fe-containing precipitate of step (b), and wherein an aqueous solution of a compound of at least one element selected from the group consisting of Al, Si, Ca, Mg, Ba, Sr, Nd, Y, La, Ce, Pr and Tb of 0.1 to 5.0 atm %, calculated as the total amount of said element of said compound, based on the total Fe in said aqueous ferrous salt solution, is added to said aqueous ferrous salt solution in the process of oxidation of step (c) when the oxidation fraction, in terms of ferric/total iron percentage in solution in process of said oxidation, is 50 to 90%.

5. A process for producing spindle-shaped magnetic iron-based alloy particles containing cobalt and iron as main ingredients, which comprises the steps of:

(a) adding an aqueous alkali hydroxide solution at 0.2 to 1.0 of molar ratio, to an aqueous alkali carbonate solution, and then adding the mixed solution to an aqueous ferrous salt solution so that the ratio of (1/2× alkali hydroxide+alkali carbonate)/iron is 1.3 to 1.8, to react said aqueous alkali carbonate solution and said aqueous alkali hydroxide solution with said aqueous ferrous salt solution, thereby obtaining a suspension containing an Fe-containing precipitate, (b) aging the resultant suspension containing an Fe-containing precipitate from step (a) in a non-oxidizing atmosphere at a temperature of 40 to 60° C. for 2 to 7 hours while stirring said suspension, (c) oxidizing the aged suspension of step (b) by introducing an oxygen-containing gas into said suspension at a temperature of 40 to 60° C. so as to complete oxidation and form spindle-shaped goethite particles, (d) optionally heat dehydrating said spindle-shaped goethite particles to produce spindle-shaped hematite particles, and (e) heat-treating said spindle-shaped goethite particles or spindle-shaped hematite particles in a reducing gas, wherein a Co compound of not less than 1.0 and less than 8.0 atm %, calculated as Co, based on the total Fe in an aqueous ferrous salt solution, is added to an aqueous ferrous salt solution, or to said suspension containing an Fe-containing precipitate of step (a), or is added to the aged suspension containing an Fe-containing precipitate of step (b), and wherein an aqueous solution of an Al compound and an aqueous solution of a compound of at least one element selected from the group consisting of Si, Ca, Mg, Ba, Sr, Nd, Y, La, Ce, Pr and Tb of 0.1 to 5.0 atm %, calculated as the total amount of said elements of said compound, based on the total Fe in said aqueous ferrous salt solution, are added to said aqueous ferrous salt solution in the process of oxidation in step (c) when the oxidation fraction, in terms of ferric/total iron percentage in solution in process of said oxidation, is 50 to 90%.

6. A process for producing spindle-shaped goethite particles containing cobalt, which comprises the steps of:

(a) adding an aqueous alkali hydroxide solution at 0.2 to 1.2 of molar ratio, to an aqueous alkali carbonate solution, and then adding the mixed solution to an aqueous ferrous salt solution so that the ratio of (1/2× alkali hydroxide+alkali carbonate)/iron is 1.3 to 2.5, to react said aqueous alkali carbonate solution and said aqueous alkali hydroxide solution with said aqueous ferrous salt solution, thereby obtaining a suspension containing an Fe-containing precipitate, (b) aging the resultant suspension containing an Fe-containing precipitate from step (a) in a non-oxidizing atmosphere at a temperature of 40 to 60° C. for 2 to 7 hours while stirring said suspension, and (c) oxidizing the aged suspension of step (b) by introducing an oxygen-containing gas into said suspension to complete oxidation, wherein a Co compound of 1.0 to 50.0 atm %, calculated as Co based on the total Fe in an aqueous ferrous salt solution, is added to an aqueous ferrous salt solution, into said suspension containing an Fe-containing precipitate, or is added to said suspension in the aging process of step (b), and wherein a compound of at least one element selected from the group consisting of Al, Si, Ca, Mg, Ba, Sr, Nd, Y, La, Ce, Pr and Tb of 0.1 to 10.0 atm %, calculated as an element, based on the total Fe in said aqueous ferrous salt solution, is added to said aqueous ferrous salt solution in process of oxidation of step (c) when the oxidation fraction, in terms of ferric/total iron percentage in solution in process of said oxidation, is 20 to 90%.

7. A process for producing spindle-shaped goethite particles containing cobalt, which comprises the steps of:
 (a) adding an aqueous alkali hydroxide solution at 0.2 to 1.2 of molar ratio, to an aqueous alkali carbonate solution, and then adding the mixed solution to an aqueous ferrous salt solution so that the ratio of (1/2× alkali hydroxide+alkali carbonate)/iron is 1.3 to 2.5, to react said aqueous alkali carbonate solution and said aqueous alkali hydroxide solution with said aqueous ferrous salt solution, thereby obtaining a suspension containing an Fe-containing precipitate,
 (b) aging the resultant suspension containing an Fe-containing precipitate from step (a) in a non-oxidizing atmosphere at a temperature of 40 to 60° C. for 2 to 7 hours while stirring said suspension, introducing an oxygen-containing gas into said suspension to complete oxidation, and
  wherein a compound of at least one element selected from the group consisting of Si, Nd, Y, La, Ce, Pr and Tb of 0.1 to 1.0 atm %, calculated as said element, based on the total Fe in an aqueous ferrous salt solution, is added to said aqueous ferrous salt solution, or to said aqueous alkali carbonate solution, to said aqueous alkali hydroxide solution, or to said suspension containing an Fe-containing precipitate,
  wherein a Co compound of 8.0 to 50.0 atm %, calculated as Co based on the total Fe in said aqueous ferrous salt solution, is added to said aqueous ferrous salt solution, to said suspension containing an Fe-containing precipitate before aging, or added to said suspension in process of aging (b),
  and wherein a compound of at least one element selected from the group consisting of Al, Si, Nd, Y, La, Ce, Pr and Tb of 0.1 to 10.0 atm %, calculated as an element, based on the total Fe in said aqueous ferrous salt solution, is added to said aqueous ferrous salt solution in the process of oxidation when the oxidation fraction, in terms of ferric/total iron percentage in solution in process of said oxidation, is 20 to 50%.

8. A process for producing spindle-shaped magnetic iron-based alloy particles containing cobalt and iron as the main ingredients, which comprises steps of:
 (a) adding an aqueous alkali hydroxide solution, at 0.2 to 1.2 of molar ratio based on the aqueous alkali carbonate solution, to a suspension containing an Fe-containing precipitate obtained by reacting an aqueous alkali carbonate solution with an aqueous ferrous salt solution so that the ratio of (1/2×alkali hydroxide+alkali carbonate)/iron is 1.3 to 2.5,
 (b) aging said suspension containing an Fe-containing precipitate in a non-oxidizing atmosphere at a temperature of 40 to 60° C. for 2 to 7 hours while stirring said suspension,
 (c) oxidizing the aged suspension of step (b) by introducing an oxygen-containing gas into said suspension to produce spindle-shaped goethite particles,
 (d) optionally heat dehydrating said spindle-shaped goethite particles to produce hematite particles, and
 (e) heat-treating the goethite particles or hematite particles in a reducing gas,
  wherein a Co compound at 1.0 to 50.0 atm %, calculated as Co, based on the total Fe in an aqueous ferrous salt solution, is added to said aqueous ferrous salt solution in step (a), to said suspension containing an Fe-containing precipitate in step (a), or said suspension in the process of aging step (b),
  and wherein a compound of at least one element selected from the group consisting of Al, Si, Ca, Mg, Ba, Sr, Nd, Y, La, Ce, Pr and Tb at 0.1 to 10.0 atm %, calculated as an element, based on the total Fe in said aqueous ferrous salt solution, is added to said aqueous ferrous salt solution in the oxidation step when the oxidation fraction, in terms of ferric/total iron percentage in solution in process of oxidation, is 20 to 90%.

9. A process for producing spindle-shaped magnetic iron-based alloy particles containing cobalt and iron as the main ingredients, which comprises the steps of:
 (a) adding an aqueous alkali hydroxide solution, at 0.2 to 1.2 of molar ratio based on the aqueous alkali carbonate solution, to a suspension containing an Fe-containing precipitate obtained by reacting an aqueous alkali carbonate solution with an aqueous ferrous salt solution so that the ratio of (1/2×alkali hydroxide+alkali carbonate)/iron is 1.3 to 2.5,
 (b) aging the resultant suspension containing an Fe-containing precipitate from step (a) in a non-oxidizing atmosphere at a temperature of 40 to 60° C. for 2 to 7 hours while stirring said suspension,
 (c) oxidizing the aged suspension of step (b) by introducing an oxygen-containing gas into said suspension to produce spindle-shaped goethite particles,
 (d) optionally heat-dehydrating said spindle-shaped goethite particles, and
 (e) heat-treating said goethite particles or hematite particles in a reducing gas,
  wherein a compound of at least one element selected from the group consisting of Si, Nd, Y, La, Ce, Pr and Tb at 0.1 to 1.0 atm %, calculated as said element, based on the total Fe in said aqueous ferrous salt solution, is added to said aqueous ferrous salt solution, to said aqueous alkali carbonate solution, to said aqueous alkali hydroxide solution in step (a), or to said suspension containing an Fe-containing precipitate before aging step (b),
  and wherein a Co compound at 8.0 to 50.0 atm %, calculated as Co, based on the total Fe in said aqueous ferrous salt solution, is added to an aqueous ferrous salt solution, or said suspension containing an Fe-containing precipitate in step (a), or is added to said suspension in the process of aging step (b),
  and wherein a compound of at least one element selected from the group consisting of Al, Si, Nd, Y, La, Ce, Pr and Tb of 0.1 to 10.0 atm %, calculated as an element, based on the total Fe in said aqueous ferrous salt solution, to said aqueous ferrous salt solution in the process of oxidation when the oxidation fraction, in terms of ferric/total iron percentage in solution in process of said oxidation, is 20 to 50%.

10. A process for producing spindle-shaped magnetic iron-based alloy particles containing cobalt and iron as main ingredients, which comprises the steps of:

(a) adding an aqueous alkali hydroxide solution, at 0.2 to 1.0 of molar ratio based on the aqueous alkali carbonate solution, to a suspension containing an Fe-containing precipitate obtained by neutralization of an aqueous alkali carbonate solution with an aqueous ferrous salt solution so that the ratio of (1/2×alkali hydroxide+alkali carbonate)/iron is 1.3 to 2.5, (b) aging the resultant suspension containing an Fe-containing precipitate from step (a) in a non-oxidizing atmosphere at a temperature of 40 to 60° C. for 2 to 7 hours while stirring said suspension, (c) oxidizing the aged suspension of step (b) by introducing an oxygen-containing gas into said suspension at a temperature of 40 to 60° C. to produce spindle-shaped goethite particles, and (d) heat-dehydrating said spindle-shaped goethite particles in a reducing gas, wherein a Co compound of not less than 1.0 and less than 8.0 atm %, calculated as Co, based on the total Fe in said aqueous ferrous salt solution, is added to said aqueous ferrous salt solution, or to said suspension containing an Fe-containing precipitate in step (a) before aging, or is added to the aged suspension containing an Fe-containing precipitate prior to oxidization step (c).

11. A process for producing spindle-shaped magnetic iron-based alloy particles containing cobalt and iron as main ingredients, which comprises the steps of:

(a) adding an aqueous alkali hydroxide solution, at 0.2 to 1.0 of molar ratio based on the aqueous alkali carbonate solution, to a suspension containing an Fe-containing precipitate obtained by reacting an aqueous alkali carbonate solution with an aqueous ferrous salt solution so that the ratio of (1/2×alkali hydroxide+alkali carbonate)/iron is 1.3 to 2.5, (b) aging the resultant suspension containing an Fe-containing precipitate from step (a) in a non-oxidizing atmosphere at a temperature of 40 to 60° C. for 2 to 7 hours while stirring said suspension, (c) oxidizing the aged suspension of step (b) by introducing an oxygen-containing gas into said suspension at a temperature of 40 to 60° C. produce spindle-shaped goethite particles, (d) optionally heat-dehydrating said spindle-shaped goethite particles to produce spindle-shaped hematite particles, and (e) heat-treating said spindle-shaped goethite particles or spindle-shaped hematite particles in a reducing gas, wherein a Co compound at not less than 1.0 and less than 8.0 atm %, calculated as Co, based on the $Fe^{2+}$ in an aqueous ferrous salt solution, is added to an aqueous ferrous salt solution or said suspension containing an Fe-containing precipitate of step (a), or added the aged suspension containing an Fe-containing precipitate of step (b), and wherein an aqueous solution of a compound of at least one element selected from the group consisting of Al, Si, Ca, Mg, Ba, Sr, Nd, Y, La, Ce, Pr and Tb of 0.1 to 5.0 atm %, calculated as the total amount of said element of said compound, based on the total Fe in said aqueous ferrous salt solution, is added to said aqueous ferrous salt solution in the process of oxidation of step (c) when the oxidation fraction, in terms of ferric/total iron percentage in solution in process of said oxidation, is 50 to 90%.

12. A process for producing spindle-shaped magnetic iron-based alloy particles containing cobalt and iron as main ingredients, which comprises the steps of:

(a) adding an aqueous alkali hydroxide solution, at 0.2 to 1.0 of molar ratio based on the aqueous alkali carbonate solution, to a suspension containing an Fe-containing precipitate obtained by reacting an aqueous alkali carbonate solution with an aqueous ferrous salt solution so that the ratio of (1/2×alkali hydroxide+alkali carbonate)/iron is 1.3 to 2.5, (b) aging the resultant suspension containing an Fe-containing precipitate from step (a) in a non-oxidizing atmosphere at a temperature of 40 to 60° C. for 2 to 7 hours while stirring said suspension, (c) oxidizing the aged suspension of step (b) by introducing an oxygen-containing gas into said suspension at a temperature of 40 to 60° C. so as to complete oxidation and form spindle-shaped goethite particles, (d) optionally heat dehydrating said spindle-shaped goethite particles to produce spindle-shaped hematite particles, and (e) heat-treating said spindle-shaped goethite particles or spindle-shaped hematite particles in a reducing gas, wherein a Co compound of not less than 1.0 and less than 8.0 atm %, calculated as Co, based on the total Fe in an aqueous ferrous salt solution, is added to an aqueous ferrous salt solution, or to said suspension containing an Fe-containing precipitate of step (a), or is added to the aged suspension containing an Fe-containing precipitate of step (b), and wherein an aqueous solution of an Al compound and an aqueous solution of a compound of at least one element selected from the group consisting of Si, Ca, Mg, Ba, Sr, Nd, Y, La, Ce, Pr and Tb of 0.1 to 5.0 atm %, calculated as the total amount of said elements of said compound, based on the total Fe in said aqueous ferrous salt solution, are added to said aqueous ferrous salt solution in process of oxidation in step (c) when the oxidation fraction, in terms of ferric/total iron percentage in solution in process of said oxidation, is 50 to 90%.

13. A process for producing spindle-shaped goethite particles containing cobalt, which comprises the steps of:

(a) adding an aqueous alkali hydroxide solution, at 0.2 to 1.2 of molar ratio based on the aqueous alkali carbonate solution, to a suspension containing an Fe-containing precipitate obtained by reacting an aqueous alkali carbonate solution with an aqueous ferrous salt solution so that the ratio of (1/2×alkali hydroxide+alkali carbonate)/iron is 1.3 to 2.5, (b) aging the resultant suspension containing an Fe-containing precipitate from step (a) in a non-oxidizing atmosphere at a temperature of 40 to 60° C. for 2 to 7 hours while stirring said suspension, and (c) oxidizing the aged suspension of step (b) by introducing an oxygen-containing gas into said suspension to complete an oxidation, wherein a Co compound of 1.0 to 50.0 atm %, calculated as Co based on the total Fe in an aqueous ferrous salt solution, is added to an aqueous ferrous salt solution, into said suspension containing an Fe-containing precipitate, or is added to said suspension in the aging process of step (b), and wherein a compound of at least one element selected from the group consisting of Al, Si, Ca, Mg, Ba, Sr, Nd, Y, La, Ce, Pr and Tb of 0.1 to 10.0 atm %, calculated as an element, based on the total Fe in said aqueous ferrous salt solution, is added to said aqueous ferrous salt solution in process of oxidation of step (c) when the oxidation fraction, in terms of ferric/total iron percentage in solution in process of said oxidation, is 20 to 90%.

14. A process for producing spindle-shaped goethite particles containing cobalt, which comprises the steps of:

(a) adding an aqueous alkali hydroxide solution, at 0.2 to 1.2 of molar ratio based on the aqueous alkali carbonate solution, to a suspension containing an Fe-containing precipitate obtained by reacting an aqueous alkali carbonate solution with an aqueous ferrous salt solution so that the ratio of (1/2×alkali hydroxide+alkali carbonate)/iron is 1.3 to 2.5, (b) aging the resultant suspension containing an Fe-containing precipitate from step (a) in a non-oxidizing atmosphere at a temperature of 40 to 60° C. for 2 to 7 hours while stirring said suspension, introducing an oxygen-containing gas into said suspension to complete an oxidation, and wherein a compound of at least one element selected from the group consisting of Si, Nd, Y, La, Ce, Pr and Tb of 0.1 to 1.0 atm %, calculated as said element, based on the total Fe in an aqueous ferrous salt solution, is added to said aqueous ferrous salt solution, or to said aqueous alkali carbonate solution, to said aqueous alkali hydroxide solution, or to said suspension containing an Fe-containing precipitate, wherein a Co compound of 8.0 to 50.0 atm %, calculated as Co based on the total Fe in said aqueous ferrous salt solution, is added to said aqueous ferrous salt solution, to said suspension containing an Fe-containing precipitate before aging, or added to said suspension in process of aging (b), and wherein a compound of at least one element selected from the group consisting of Al, Si, Nd, Y, La, Ce, Pr and Tb of 0.1 to 10.0 atm %, calculated as an element, based on the total Fe in said aqueous ferrous salt solution, is added to said aqueous ferrous salt solution in the process of oxidation when the oxidation fraction, in terms of ferric/total iron percentage in solution in process of said oxidation, is 20 to 50%.

* * * * *